(12) United States Patent
Wang et al.

(10) Patent No.: US 7,776,770 B2
(45) Date of Patent: Aug. 17, 2010

(54) MOLDED FABRIC ARTICLES OF OLEFIN BLOCK INTERPOLYMERS

(75) Inventors: Jerry Chien Ting Wang, Taichung (TW); Fabio D'ottaviano, Cambrils (ES); Shih-Yaw Lai, Pearland, TX (US); Hongyu Chen, Lake Jackson, TX (US); Yuen-Yuen D. Chiu, Pearland, TX (US); Rio Aditya Akbar, Singapore (SG); Beverly Selle, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 192 days.

(21) Appl. No.: 11/948,756

(22) Filed: Nov. 30, 2007

(65) Prior Publication Data

US 2008/0176473 A1 Jul. 24, 2008

Related U.S. Application Data

(60) Provisional application No. 60/868,031, filed on Nov. 30, 2006.

(51) Int. Cl.
*D04B 1/18* (2006.01)
*D04B 11/12* (2006.01)

(52) U.S. Cl. ...................... 442/306; 442/329

(58) Field of Classification Search ............ 442/306, 442/329
See application file for complete search history.

(56) References Cited

U.S. PATENT DOCUMENTS

| | | | |
|---|---|---|---|
| 2,973,344 A | 2/1961 | Fasce | |
| 2,997,432 A | 8/1961 | Koble et al. | |
| 3,039,895 A | 6/1962 | Yuk | |
| 3,296,063 A | 1/1967 | Chandler | |
| 3,981,310 A | 9/1976 | Donaghy | |
| 4,146,492 A | 3/1979 | Cusano et al. | |
| 4,299,931 A | 11/1981 | Coran et al. | |
| 4,322,027 A | 3/1982 | Reba | |
| 4,340,563 A | 7/1982 | Appel et al. | |
| 4,413,110 A | 11/1983 | Kavesh et al. | |
| 4,429,079 A | 1/1984 | Shibata et al. | |
| 4,510,031 A | 4/1985 | Matsumura et al. | |
| 4,551,892 A | 11/1985 | Patel et al. | |

(Continued)

FOREIGN PATENT DOCUMENTS

EP 0 877 050 11/1998

(Continued)

OTHER PUBLICATIONS

Markovich et al. "Development of gel-permeation chromatography-Fourier transform infrared spectroscopy for characterization of ethylene-based polyolefin copolymers". 65 Pol. Mater. Sci. and Eng. (1991), pp. 98-100.

(Continued)

*Primary Examiner*—Norca L Torres-Velazquez
(74) *Attorney, Agent, or Firm*—Whyte Hirschboeck Dudek SC

(57) ABSTRACT

Knit fabric compositions have now been discovered that often have a balanced combination of desirable properties. Said fibric compositions comprise fibers of olefin block interpolymers or homogeneous branched ethylene polymers or a combination thereof. The fibers are characterized by an amount of crosslinking such that the fabric is capable of being molded.

25 Claims, 11 Drawing Sheets

U.S. PATENT DOCUMENTS

| | | | |
|---|---|---|---|
| 4,663,220 A | 5/1987 | Wisneski et al. |
| 4,668,566 A | 5/1987 | Braun |
| 4,762,890 A | 8/1988 | Strait et al. |
| 4,780,228 A | 10/1988 | Gardiner et al. |
| 4,798,081 A | 1/1989 | Hazlitt et al. |
| 4,927,888 A | 5/1990 | Strait et al. |
| 4,950,541 A | 8/1990 | Tabor et al. |
| 4,999,120 A | 3/1991 | Seemuth |
| 5,068,047 A | 11/1991 | Chung et al. |
| 5,108,820 A | 4/1992 | Kaneko et al. |
| 5,266,626 A | 11/1993 | Hert et al. |
| 5,322,728 A | 6/1994 | Davey et al. |
| 5,336,552 A | 8/1994 | Strack et al. |
| 5,382,400 A | 1/1995 | Pike et al. |
| 5,391,629 A | 2/1995 | Turner et al. |
| 5,597,881 A | 1/1997 | Winter et al. |
| 5,624,991 A | 4/1997 | Harada et al. |
| 5,783,531 A | 7/1998 | Andrew et al. |
| 5,868,984 A | 2/1999 | Winter et al. |
| 5,892,076 A | 4/1999 | Nickias |
| 5,916,953 A | 6/1999 | Jacoby et al. |
| 5,919,988 A | 7/1999 | Pazos et al. |
| 5,994,255 A | 11/1999 | Nickias et al. |
| 6,008,262 A | 12/1999 | McKay et al. |
| 6,025,448 A | 2/2000 | Swindoll et al. |
| 6,030,917 A | 2/2000 | Weinberg et al. |
| 6,096,668 A | 8/2000 | Abuto et al. |
| 6,121,402 A | 9/2000 | Machida et al. |
| 6,136,937 A | 10/2000 | Lai et al. |
| 6,140,442 A | 10/2000 | Knight et al. |
| 6,147,180 A | 11/2000 | Markel et al. |
| 6,160,029 A | 12/2000 | Chaudhary et al. |
| 6,187,424 B1 | 2/2001 | Kjellqvist et al. |
| 6,197,404 B1 | 3/2001 | Varona |
| 6,225,243 B1 | 5/2001 | Austin |
| 6,248,540 B1 | 6/2001 | Weinberg et al. |
| 6,268,444 B1 | 7/2001 | Klosin et al. |
| 6,306,658 B1 | 10/2001 | Turner et al. |
| 6,316,663 B1 | 11/2001 | Guram et al. |
| 6,362,252 B1 | 3/2002 | Prutkin |
| 6,362,309 B1 | 3/2002 | Lund et al. |
| 6,395,671 B2 | 5/2002 | LaPointe |
| 6,455,638 B2 | 9/2002 | Laughner et al. |
| 6,537,472 B2 | 3/2003 | Masubuchi |
| 6,566,446 B1 | 5/2003 | Parikh et al. |
| 6,652,599 B1 | 11/2003 | Inuzuka et al. |
| 6,667,351 B2 | 12/2003 | Langohr et al. |
| 6,803,014 B2 | 10/2004 | Ho et al. |
| 6,815,023 B1 | 11/2004 | Tatarka et al. |
| 6,953,763 B2 | 10/2005 | Vempati et al. |
| 7,005,395 B2 | 2/2006 | Zafiroglu et al. |
| 7,355,089 B2 | 4/2008 | Chang et al. |
| 7,504,347 B2 | 3/2009 | Poon et al. |
| 7,514,517 B2 | 4/2009 | Hoenig et al. |
| 7,524,911 B2 | 4/2009 | Karjala et al. |
| 2003/0004286 A1 | 1/2003 | Klosin et al. |
| 2003/0024052 A1 | 2/2003 | Azuse et al. |
| 2003/0027954 A1 | 2/2003 | Becke et al. |
| 2003/0055162 A1* | 3/2003 | Sen et al. .................... 525/30 |
| 2003/0195128 A1 | 10/2003 | Deckman et al. |
| 2003/0204017 A1 | 10/2003 | Stevens et al. |
| 2003/0216518 A1 | 11/2003 | Tau et al. |
| 2004/0010103 A1 | 1/2004 | Boussie et al. |
| 2004/0082750 A1 | 4/2004 | Tau et al. |
| 2004/0092662 A1 | 5/2004 | Goto et al. |
| 2004/0158011 A1 | 8/2004 | Jain et al. |
| 2004/0192147 A1 | 9/2004 | Smith et al. |
| 2005/0009993 A1 | 1/2005 | Morioka et al. |
| 2005/0142360 A1 | 6/2005 | Klein |
| 2006/0030667 A1 | 2/2006 | Yalvac et al. |
| 2006/0198983 A1 | 9/2006 | Patel |
| 2006/0199030 A1 | 9/2006 | Liang et al. |
| 2006/0199744 A1 | 9/2006 | Walton et al. |
| 2006/0199872 A1 | 9/2006 | Prieto et al. |
| 2006/0199887 A1 | 9/2006 | Liang et al. |
| 2006/0199896 A1 | 9/2006 | Walton et al. |
| 2006/0199905 A1 | 9/2006 | Hughes et al. |
| 2006/0199906 A1 | 9/2006 | Walton et al. |
| 2006/0199908 A1 | 9/2006 | Cheung et al. |
| 2006/0199910 A1 | 9/2006 | Walton et al. |
| 2006/0199911 A1 | 9/2006 | Markovich et al. |
| 2006/0199912 A1 | 9/2006 | Fuchs et al. |
| 2006/0199914 A1 | 9/2006 | Harris et al. |
| 2006/0199930 A1 | 9/2006 | Li Pi Shan et al. |
| 2006/0199931 A1 | 9/2006 | Poon et al. |
| 2006/0205833 A1 | 9/2006 | Martinez et al. |
| 2006/0211819 A1 | 9/2006 | Hoenig et al. |
| 2007/0010616 A1 | 1/2007 | Kapur et al. |
| 2008/0299857 A1 | 12/2008 | Harding et al. |

FOREIGN PATENT DOCUMENTS

| | | |
|---|---|---|
| EP | 1 026 184 | 8/2000 |
| EP | 1 262 498 A2 | 12/2002 |
| JP | 2004-204058 | 7/2004 |
| WO | WO 01/85843 A1 | 11/2001 |
| WO | WO 02/079322 | 10/2002 |
| WO | WO 03/040195 | 5/2003 |
| WO | WO 03/078705 A1 | 9/2003 |
| WO | WO 2004/024740 | 3/2004 |
| WO | WO 01/81443 | 11/2004 |
| WO | WO 2005/090425 | 9/2005 |
| WO | WO 2005/090426 | 9/2005 |
| WO | WO 2005/090426 A1 | 9/2005 |
| WO | WO 2005/090427 | 9/2005 |
| WO | WO 2006/102149 A2 | 9/2006 |

OTHER PUBLICATIONS

Deslauriers et al.; "Quantifying short chain branching microstructures in ethylene-1-olefin copolymers using size exclusion chromatography and Fourier transform infrared spectroscopy (SEC-FTIR)", 43 Polymer (2002), pp. 59-170.

Williams et al., The Construction of a Polyethylene Calibration Curve for Gel permeation Chromotography Using Polystyr, 6 J. Polym. Sci., Polym. Let., (1968), pp. 621-624.

Wilde et al., "Determination of Branching Distributions in Polyethylene and Ethylene Copolymers" 20 J. Polym. Sci., (1982), pp. 441-455.

Randall, "A Review of High Resolution Liquid 13 Carbon Nuclear Magnetic Resonance Characterizations . . . " C29 (2&3) JMS-Rev. Macromol. Chem. Phys. (1989), pp. 201-317.

Iyer et al., "Circular Knitting: Technology, Process, Structures, Yarns, Quality ", Bamberg Meisenbach (Pub.), Bamberg, Germany (1995).

U.S. Appl. No. 60/662,937, filed Mar. 17, 2005.
U.S. Appl. No. 60/662,939, filed Mar. 17, 2005.
U.S. Appl. No. 60/662,938, filed Mar. 17, 2005.
International Search Report (PCT/US2007/086116), dated Nov. 5, 2008.

* cited by examiner

MOLDED FABRIC ARTICLES OF OLEFIN BLOCK INTERPOLYMERS

CROSS-REFERENCE TO RELATED APPLICATIONS

For purposes of United States patent practice, the contents of U.S. Provisional Application No. 60/868,031 filed on Nov. 30, 2006 and PCT Application No. PCT/US2005/008917 (Dow 63558D) filed on Mar. 17, 2005, U.S. application Ser. No. 11/376,873 (Dow 64405B) filed on Mar. 15, 2006, and U.S. Provisional Application No. 60/553,906, filed Mar. 17, 2004, are herein incorporated by reference in their entirety.

FIELD OF THE INVENTION

This invention relates to improved fabrics that are capable of being molded.

BACKGROUND AND SUMMARY OF THE INVENTION

Many different materials have been used in making knit fabrics for use in, for example, garments. It is often desirable that such fabrics have a combination of desirable properties including one or more of the following: dimensional stability, heat-set properties, capability to be made stretchable in one or both dimensions, chemical, heat resistant, abrasion resistant, tenacity, etc. It is also often important that such fabrics be able to withstand hand or machine washing without significantly degrading one or more of the aforementioned properties. Further, increased throughput with reduced defects, e.g. fiber breakage, is sometimes desirable. For some clothing applications, e.g. garments such as bras, swimsuits, intimate apparel, and the like, it is beneficial if the knitted fabric is capable of being molded i.e., become set into a shape conforming to a three-dimensional mold when subjected to heat without substantial distension of the structure of the fabric. Unfortunately, the prior materials often suffer from one or more deficiencies in the aforementioned properties. In addition, the prior materials may limit the knit process in some way, e.g., production may be limited to a pulley feeding system as opposed to an eyelet system.

Improved fabrics have now been discovered which often have a balanced combination of desirable properties including moldability. These compositions may also allow for improved processability in some applications. The fabric of the present invention is typically a knit fabric comprising elastic Fibers. The elastic fibers comprise the reaction product of at least one ethylene polymer and at least one crosslinking agent. The fibers are characterized by an amount of crosslinking, such that the fabric is capable of being molded. The ethylene polymer is (A) an ethylene/α-olefin interpolymer, wherein the ethylene/α-olefin interpolymer has one or more of the following characteristics:

(1) an average block index greater than zero and up to about 1.0 and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1; or (3) an Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2; \text{ or}$$

(4) an Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.: or (5) an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ or}$$

(6) a molecular fraction which elutes between 40° C. and 130° C. when fractionated using TREF characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (7) a storage modulus at 25° C., G'(25° C.), and a storage modulus at 100° C., G'(100° C.), wherein the ratio of G'(25° C.) to G'(100° C.) is in the range of about 1:1 to about 9:1; or (B) a homogeneously branched ethylene polymer; or (C) a mixture thereof.

The ethylene/α-olefin interpolymer characteristics (1) through (7) above are given with respect to the ethylene/α-olefin interpolymer before any significant crosslinking, i.e., before crosslinking. The ethylene/α-olefin interpolymers useful in the present invention are usually crosslinked to a degree to obtain the desired properties. By using characteristics (1) through (7) as measured before crosslinking is not meant to suggest that the interpolymer is not required to be crosslinked—only that the characteristic is measured with respect to the interpolymer without significant crosslinking. Crosslinking may or may not change each of these properties depending upon the specific polymer and degree of crosslinking.

DETAILED DESCRIPTION OF THE INVENTION

General Definitions

Figure 1:
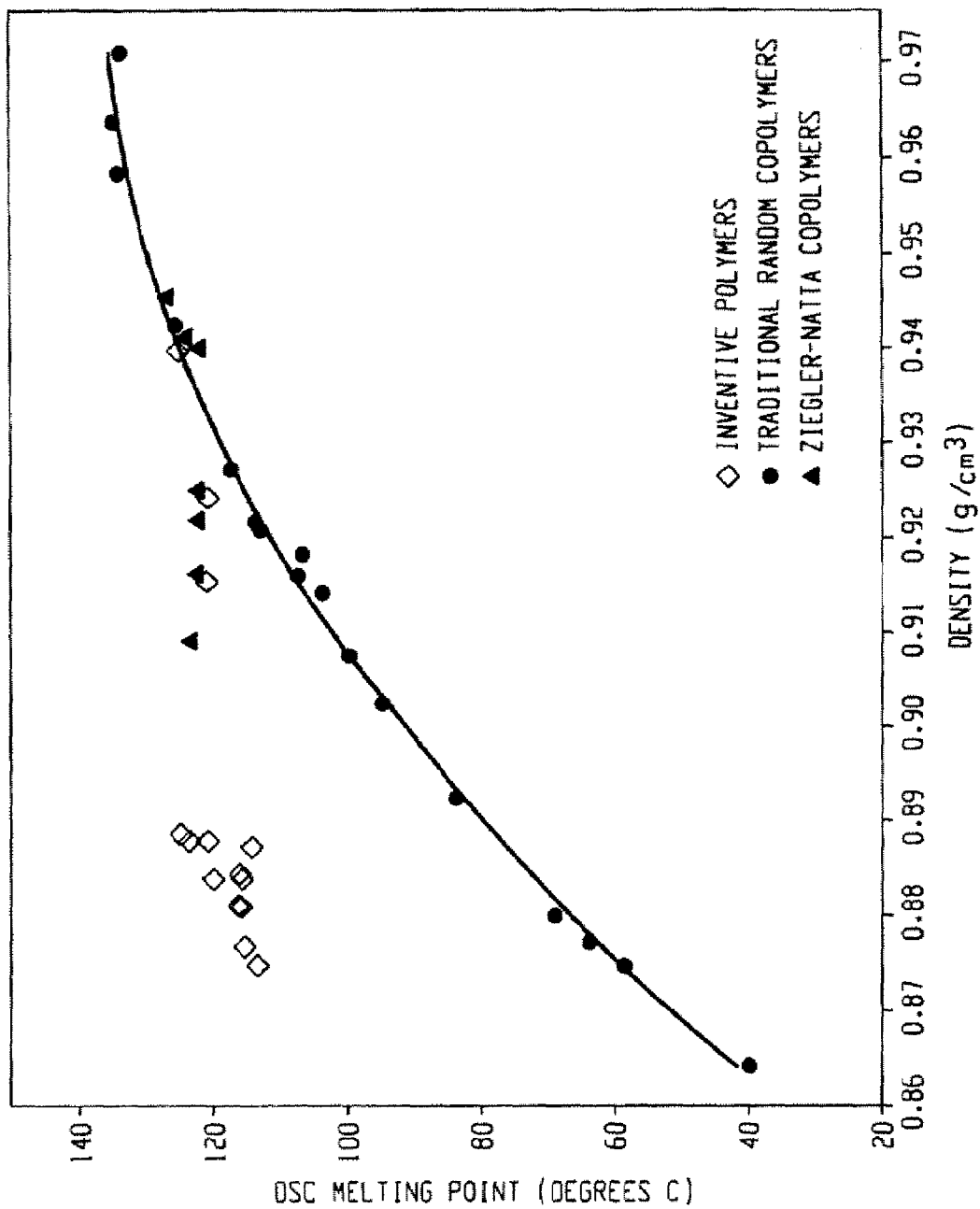
FIG. 1 shows the melting point/density relationship for the inventive polymers (represented by diamonds) as compared to traditional random copolymers (represented by circles) and Ziegler-Natta copolymers (represented by triangles).

"Fiber" means a material in which the length to diameter ratio is greater than about 10. Fiber is typically classified according to its diameter. Filament fiber is generally defined as having an individual fiber diameter greater than about 15 denier, usually greater than about 30 denier per filament. Fine denier fiber generally refers to a fiber having a diameter less than about 15 denier per filament. Microdenier fiber is generally defined as fiber having a diameter less than about 100 microns denier per filament.

"Filament fiber" or "monofilament fiber" means a continuous strand of material of indefinite (i.e., not predetermined) length, as opposed to a "staple fiber" which is a discontinuous strand of material of definite length (i.e. a strand which has been cut or otherwise divided into segments of a predetermined length).

"Elastic" means that a fiber will recover at least about 50 percent of its stretched length after the first pull and after the fourth to 100% strain (doubled the length). Elasticity can also be described by the "permanent set" of the fiber. Permanent set is the converse of elasticity. A fiber is stretched to a certain point and subsequently released to the original position before stretch, and then stretched again. The point at which the fiber begins to pull a load is designated as the percent permanent set. "Elastic materials" are also referred to in the art as "elastomers" and "elastomeric". Elastic material (sometimes referred to as an elastic article) includes the copolymer itself as well as, but not limited to, the copolymer in the form of a fiber, film, strip, tape, ribbon, sheet, coating, molding and the like. The preferred elastic material is fiber. The elastic material can be either cured or uncured, radiated or un-radiated, and/or crosslinked or uncrosslinked.

"Nonelastic material" means a material, e.g., a fiber, that is not elastic as defined above.

"Homofil fiber" means a fiber that has a single polymer region or domain, and that does not have any other distinct polymer regions (as do bicomponent fibers).

"Bicomponent fiber" means a fiber that has two or more distinct polymer regions or domains, Bicomponent fibers are also know as conjugated or multicomponent fibers. The polymers are usually different from each other although two or more components may comprise the same polymer. The polymers are arranged in substantially distinct zones across the cross-section of the bicomponent fiber, and usually extend continuously along the length of the bicomponent fiber. The configuration of a bicomponent fiber can be, for example, a sheath/tore arrangement (in which one polymer is surrounded by another), a side by side arrangement, a pie arrangement or an "islands-in-the sea" arrangement. Bicomponent fibers are further described in U.S. Pat. Nos. 6,225,243, 6,140,442, 5,382,400, 5,336,552 and 5,108,820.

"Meltblown fibers" are fibers formed by extruding a molten thermoplastic polymer composition through a plurality of fine, usually circular, die capillaries as molten threads or filaments into converging high velocity gas streams (e.g. air) which function to attenuate the threads or filaments to reduced diameters. The filaments or threads are carried by the high velocity gas streams and deposited on a collecting surface to form a web of randomly dispersed fibers with average diameters generally smaller than 10 microns.

"Meltspun fibers" are fibers formed by melting at least one polymer and then drawing the fiber in the melt to a diameter (or other cross-section shape) less than the diameter (or other cross-section shape) of the die.

"Spunbond fibers" are fibers formed by extruding a molten thermoplastic polymer composition as filaments through a plurality of fine, usually circular, die capillaries of a spinneret. The diameter of the extruded filaments is rapidly reduced, and then the filaments are deposited onto a collecting surface to form a web of randomly dispersed fibers with average diameters generally between about 7 and about 30 microns.

"Nonwoven" means a web or fabric having a structure of individual fibers or threads which are randomly interlaid, but not in an identifiable manner as is the case of a knitted fabric. The elastic fiber in accordance with embodiments of the invention can be employed to prepare nonwoven structures as well as composite structures of elastic nonwoven fabric in combination with nonelastic materials.

"Yarn" means a continuous length of twisted or otherwise entangled filaments which can be used in the manufacture of woven or knitted fabrics and other articles. Composite yarn is typically a conventional covered yarn or a core spun yarn. A covered yarn is a type of composite yarn which is made by wrapping a filament or a spun yarn comprising, for example, cotton or wool, around a fiber or another yarn core. A core spun yarn is made by twisting fibers around a filament core or a previously spun yarn core in order to conceal the core.

"Polymer" means a polymeric compound prepared by polymerizing monomers, whether of the same or a different type. The generic term "polymer" embraces the terms "homopolymer," "copolymer," "terpolymer" as well as "interpolymer."

"interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

The ethylene/α-olefin interpolymers comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and "copolymer" are used interchangeably herein. In some embodiments, the multi-block copolymer can be represented by the following formula:

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

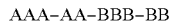

In still other embodiments, the block copolymers do not usually have a third type of block, which comprises different comonomer(s). In yet other embodiments each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The multi-block polymers typically comprise various amounts of "hard" and "soft" segments. "Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprises all or substantially all ethylene. "Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in a concurrently filed U.S. patent application Ser. No. 11/376, 835, entitled "Ethylene/α-Olefins Block Interpolymers", filed on Mar. 15, 2006, in the name of Colin L. P. Shan, Lonnie Hazlitt. et. al. and assigned to Dow Global Technologies Inc., the disclosure of which is incorporated by reference herein in its entirety.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment. i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Ethylene/α-Olefin Interpolymers

The ethylene/α-olefin interpolymers used in embodiments of the invention (also referred to as "inventive interpolymer") or "inventive polymer") comprise ethylene and one or more copolymerizable α-olefin comonomers in polymerized form, characterized by multiple blocks or segments of two or more polymerized monomer units differing in chemical or physical properties (block interpolymer), preferably a multi-block copolymer. The ethylene/α-olefin interpolymers are characterized by one or more of the aspects described as follows.

In one aspect, the ethylene/α-olefin interpolymers used in embodiments of the invention have a $M_w/M_n$ from about 1.7 to about 3.5 and at least one melting point, $T_m$, in degrees Celsius and density, d, in grams/cubic centimeter, wherein the numerical values of the variables correspond to the relationship:

$$T_m > -2002.9 + 4538.5(d) - 2422.2(d)^2, \text{ and preferably}$$

$$T_m \geq -6288.1 + 13141(d) - 6720.3(d)^2, \text{ and more preferably}$$

$$T_m \geq 858.91 - 1825.3(d) + 1112.8(d)^2.$$

Figure 2:
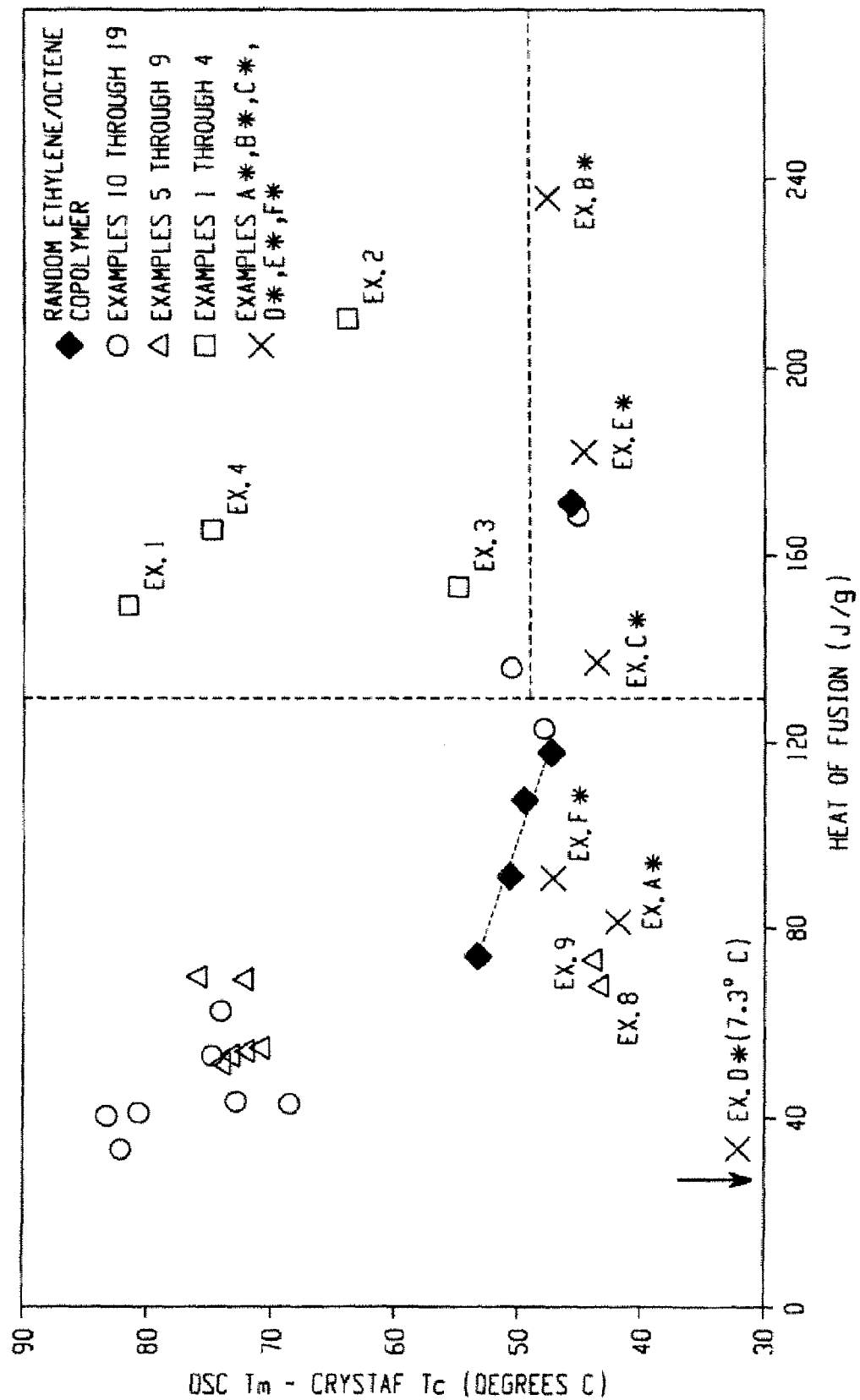
FIG. 2 shows plots of delta DSC-CRYSTAF as a function of DSC Melt Enthalpy for various polymers. The diamonds represent random ethylene/octene copolymers; the squares represent polymer examples 1-4; the triangles represent polymer examples 5-9; and the circles represent polymer examples 10-19. The "X" symbols represent polymer examples A*-F*.

Such melting point/density relationship is illustrated in FIG. 1. Unlike the traditional random copolymers of ethylene/α-olefins whose melting points decrease with decreasing densities, the inventive interpolymers (represented by diamonds) exhibit melting points substantially independent of the density, particularly when density is between about 0.87 g/cc to about 0.95 g/cc. For example, the melting point of such polymers are in the range of about 110° C. to about 130° C. when density ranges from 0.875 g/cc to about 0.945 g/cc. In some embodiments, the melting point of such polymers are in the range of about 115° C. to about 125° C. when density ranges from 0.875 g/cc to about 0.945 g/cc In another aspect, the ethylene α-olefin interpolymers comprise, in polymerized form, ethylene and one or more α-olefins and are characterized by a ΔT, in degree Celsius, defined as the temperature for the tallest Differential Scanning Calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$$\Delta T > -0.1299(\Delta H) + 62.81, \text{ and preferably}$$

$$\Delta T \geq -0.1299(\Delta H) + 64.38, \text{ and more preferably}$$

$$\Delta T \geq -0.1299(\Delta H) + 65.95,$$

for ΔH up to 130 J/g, Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer. FIG. 2 shows plotted data for inventive polymers as well as comparative examples. Integrated peak areas and peak temperatures are calculated by the computerized drawing program supplied by the instrument maker. The diagonal line shown for the random ethylene octene comparative polymers corresponds to the equation ΔT=−0.1299 (ΔH)+62.81.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ and preferably}$$

$$Re \geq 1491 - 1629(d); \text{ and more preferably}$$

$$Re \geq 1501 - 1629(d); \text{ and even more preferably}$$

$$Re \geq 1511 - 1629(d).$$

Figure 3:
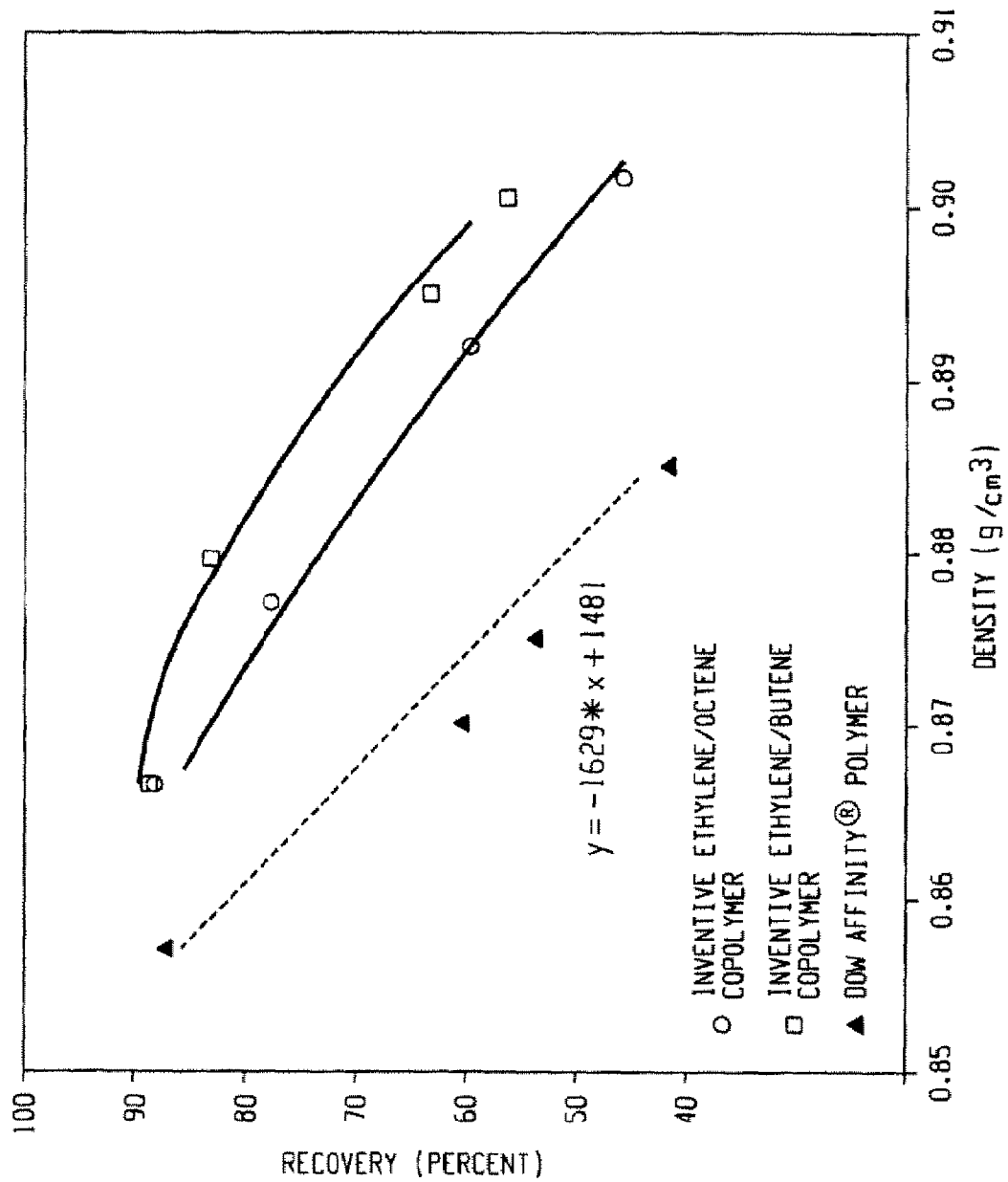
FIG. 3 shows the effect of density on elastic recovery for unoriented films made from inventive interpolymers (represented by the squares and circles) and traditional copolymers (represented by the triangles which are various AFFINITY™ polymers (available from The Dow Chemical Company)). The squares represent inventive ethylene/butene copolymers; and the circles represent inventive ethylene octene copolymers.

FIG. 3 shows the effect of density on elastic recovery for unoriented films made from certain inventive interpolymers and traditional random copolymers. For the same density, the inventive interpolymers have substantially higher elastic recoveries.

In some embodiments, the ethylene/α-olefin interpolymers have a tensile strength above 10 MPa, preferably a tensile strength ≧11 MPa, more preferably a tensile strength≧13 MPa and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G'(25° C.)/G'(100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of 0 percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin interpolymers have a heat of fusion of less than 85 J/g and/or a pellet blocking strength of equal to or less than 100 pounds/foot$^2$ (4800 Pa), preferably equal to or less than 50 lb/ft$^2$ (2400 Pa), especially equal to or less than 5 lbs/ft$^2$ (240 Pa), and as low as 0 lbs/ft$^2$ (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close to zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

Comonomer content may be measured using any suitable technique, with techniques based on nuclear magnetic resonance ("NMR") spectroscopy preferred. Moreover, for polyers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the inventive polymer is an olefin interpolymer preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl: methylene area ratio [$CH_3/CH_2$] of the TREF peak.

Comonomer content may be measured using any suitable technique, with techniques based on nuclear magnetic resonance (NMR) spectroscopy preferred. Using this technique, said blocked interpolymer has higher molar comonomer content than a corresponding comparable interpolymer.

Preferably, for interpolymers of ethylene and 1-octene, the block interpolymer has a comonomer content of the TREF fraction eluting between 40 and 30° C., greater than or equal to the quantity (−0.2013) T+20.07, more preferably greater than or equal to the quantity (−0.2013) T+21.07, where T is the numerical value of the peak elution temperature of the TREF fraction being compared, measured in ° C.

Figure 4:
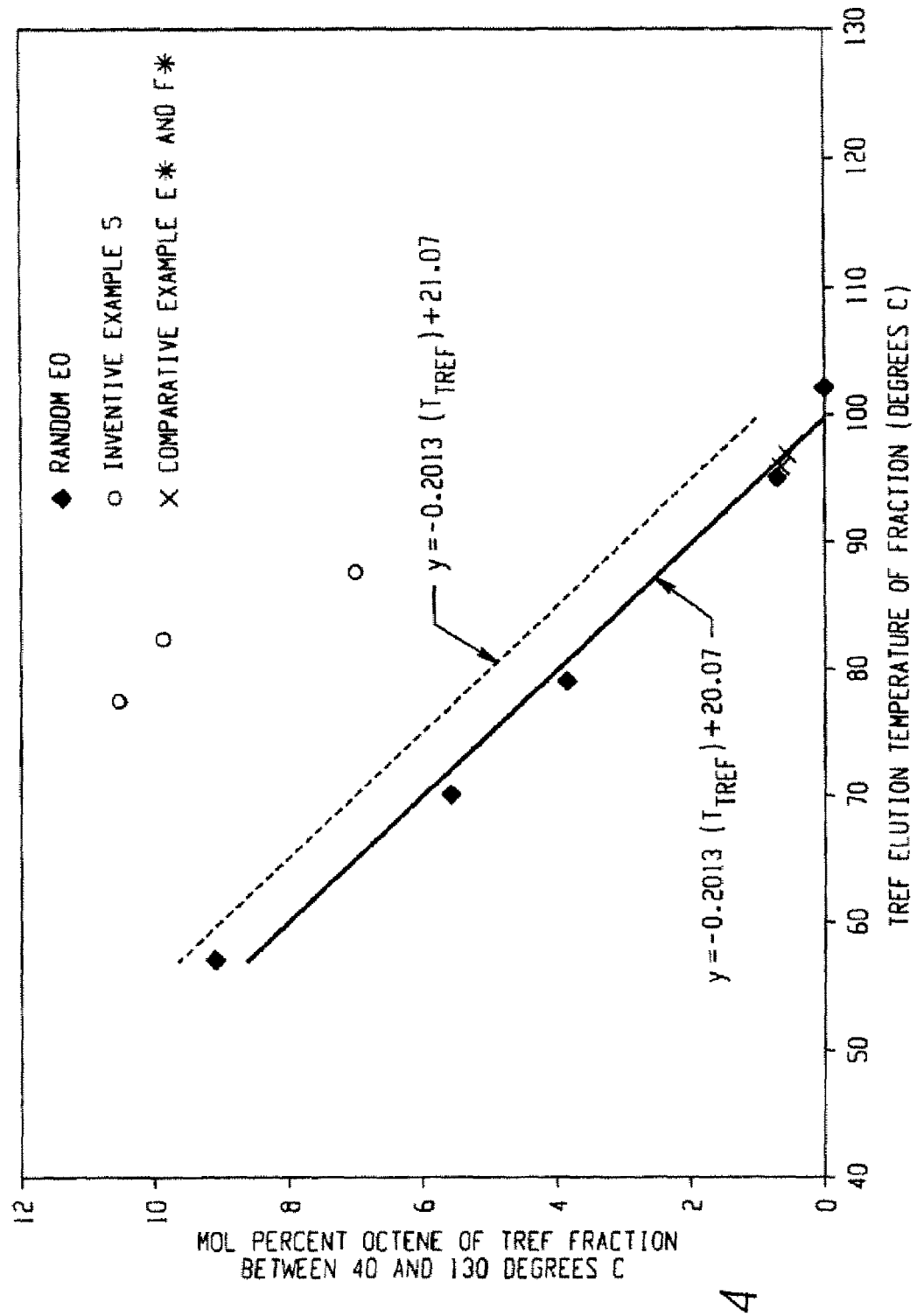
FIG. 4 is a plot of octene content of TREF fractionated ethylene/1-octene copolymer fractions versus TREF elution temperature of the fraction for the polymer of Example 5 (represented by the circles) and comparative polymers E and F (represented by the "X" symbols). The diamonds represent traditional random ethylene/octene copolymers.

FIG. 4 graphically depicts an embodiment of the block interpolymers of ethylene and 1-octene where a plot of the comonomer content versus TREF elution temperature for several comparable ethylene/1-octene interpolymers (random copolymers) are fit to a line representing (−0.2013) T+20.07 (solid line). The line for the equation (−0.2013) T+21.07 is depicted by a dotted line. Also depicted are the comonomer contents for fractions of several block ethylene/1-octene interpolymers of the invention (multi-block copolymers). All of the block interpolymer fractions have significantly higher 1-octene content than either line at equivalent elution temperatures. This result is characteristic of the inventive interpolymer and is believed to be due to the presence of differentiated blocks within the polymer chains, having both crystalline and amorphous nature.

Figure 5:
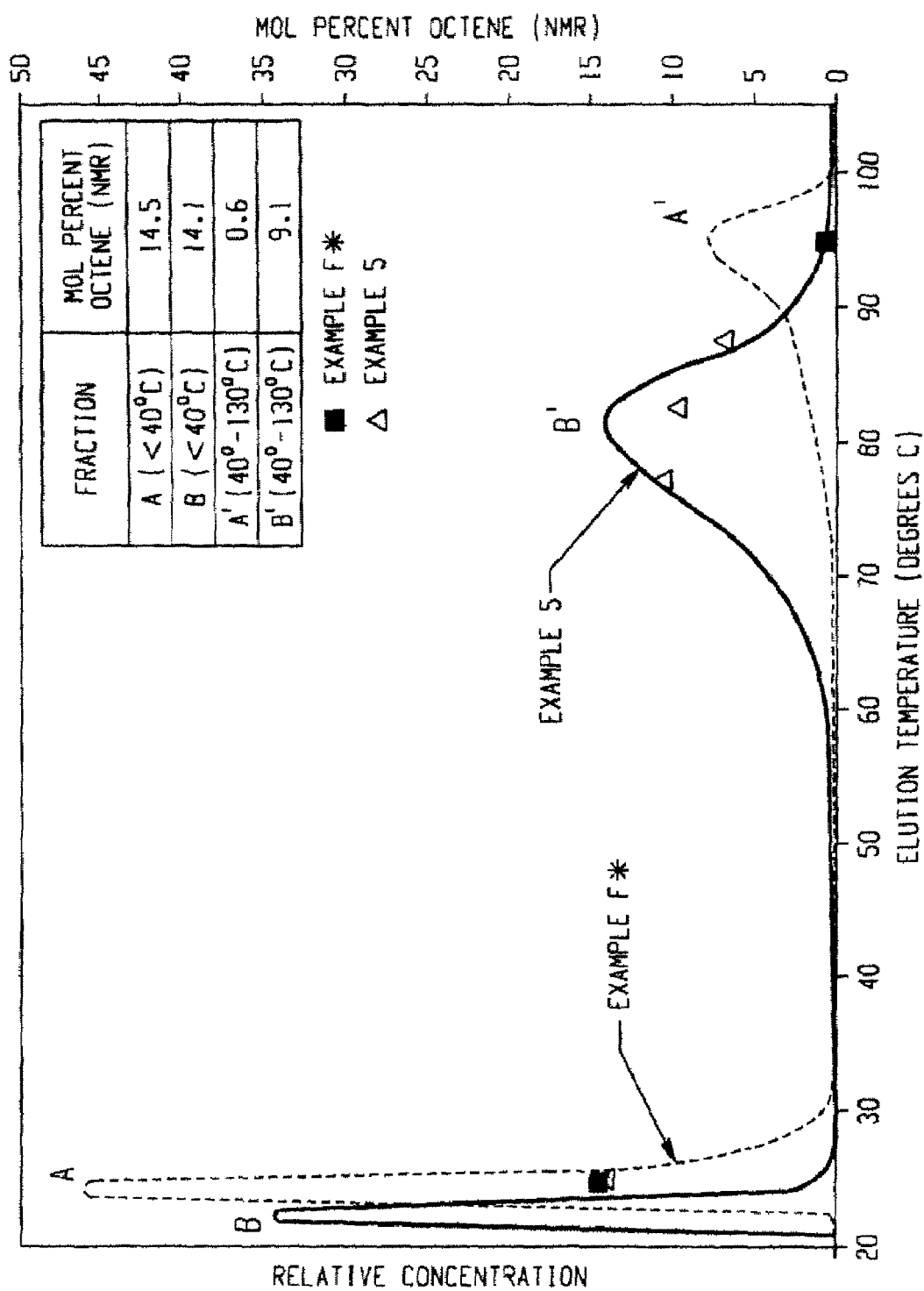
FIG. 5 is a plot of octene content of TREF fractionated ethylene, 1-octene copolymer fractions versus TREE elution temperature of the fraction for the polymer of Example 5 (curve 1) and for comparative F (curve 2). The squares represent Example F*; and the triangles represent Example

FIG. 5 graphically displays the TREF curve and comonomer contents of polymer fractions for Example 5 and Comparative F discussed below. The peak eluting from 40 to 1130° C., preferably from 60° C. to 95° C. for both polymers is fractionated into three parts, each part eluting over a temperature range of less than 10° C. Actual data for Example 5 is represented by triangles. The skilled artisan can appreciate that an appropriate calibration curve may be constructed for interpolymers containing different comonomers and a line used as a comparison fitted to the TREF values obtained from comparative interpolymers of the same monomers, preferably random copolymers made using a metallocene or other homogeneous catalyst composition. Inventive interpolymers are characterized by a molar comonomer content greater than the value determined from the calibration curve at the same TREF elution temperature, preferably at least 5 percent greater, more preferably at least 10 percent greater.

In addition to the above aspects and properties described herein, the inventive polymers can be characterized by one or more additional characteristics. In one aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one α-olefin, especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C., greater than or equal to the quantity (−0.1356) T+13.89, more preferably greater than or equal to the quantity (−0.1356) T+14.93, and most preferably greater than or equal to the quantity (−0.2013)T+21.07, where T is the numerical value of the peak ATREF elution temperature of the TREF fraction being compared, measured in ° C.

Preferably, for the above interpolymers of ethylene and at least one alpha-olefin especially those interpolymers having a whole polymer density from about 0.855 to about 0.935 g/cm$^3$, and more especially for polymers having more than about 1 mole percent comonomer the blocked interpolymer has a comonomer content of the TREF fraction eluting between 40 and 130° C. greater than or equal to the quantity (−0.2013)T+20.07, more preferably greater than or equal to the quantity (−0.2013)T+21.07, where T is the numerical value of the peak elution temperature of the TREF fraction being compared, measured in ° C.

In still another aspect, the inventive polymer is an olefin interpolymer preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C. when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mole percent comonomer, has a DSC melting point that corresponds to the equation:

$$T_m \geq (-5.5926)(\text{mole percent comonomer in the fraction}) + 135.90.$$

In yet another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

$$\text{Heat of fusion}(J/gm) \leq (3.1718)(ATREF \text{ elution temperature in Celsius}) - 136.58,$$

The inventive block interpolymers have a molecular fraction which elutes between 40° C. and 130° C., when fractionated using TREF increments, characterized in that every fraction that has an ATREF elution temperature between 40° and less than about 76°, has a melt enthalpy (heat of fusion) as measured by DSC, corresponding to the equation:

$$\text{Heat of fusion}(J/gm) \leq (1.1312)(ATREF \text{ elution temperature in Celsius}) + 22.97.$$

ATREF Peak Comonomer Composition Measurement by Infra-Red Detector

The comonomer composition of the TREF peak can be measured using an IR4 infra-red detector available from Polymer Char, Valencia. Spain (http://www.polymerchar.com/).

The "composition mode" of the detector is equipped with a measurement sensor ($CH_2$) and composition sensor ($CH_3$) that are fixed narrow band infra-red filters in the region of 2800-3000 cm$^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by, applying a the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170, both of which are incorporated by reference herein in their entirety.

In other embodiments, the inventive ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREE from 20° C. and 110° C. with an increment of 5° C.:

$$ABI = \Sigma(w_i BI_i)$$

where $BI_i$ is the block index for the ith fraction of the inventive ethylene α-olefin interpolymer obtained in preparative TREF, and $w_i$ is the weight percentage of the ith fraction.

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the preparative ATREF elution temperature for the ith fraction (preferably expressed in Kelvin), $P_X$ is the ethylene mole fraction for the ith fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372° K, $P_A$ is 1.

$T_{AB}$ is the ATREF temperature for a random copolymer of the same composition and having an ethylene mole fraction of $P_{AB}$. $T_{AB}$ can be calculated from the following equation:

$$Ln P_{AB} = \alpha/T_{AB} + \beta$$

where α and β are two constants which can be determined by calibration using a number of known random ethylene copolymers. It should be noted that α and β may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges such effect would be essentially negligible. In some embodiments, random ethylene copolymers satisfy the following relationship:

$$Ln P = -237.83/T_{ATREF} + 0.639$$

$T_{XO}$ is the ATREF temperature for a random copolymer of the same composition and having an ethylene mole fraction of $P_X$. $T_{XO}$ can be calculated from $Ln P_X = \alpha/T_{XO} + \beta$. Conversely, $P_{XO}$ is the ethylene mole fraction for a random copolymer of the same composition and having an ATREF temperature of $T_X$, which can be calculated from $Ln P_{XO} = \alpha/T_X + \beta$.

Once the block index (BI) for each preparative TREF fraction is obtained, the weight average block index, ABI, for the whole polymer can be calculated. In some embodiments, ABI is greater than zero but less than about 0.3 or from about 0.1 to about 0.3. In other embodiments, ABI is greater than about 0.3 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0 from about 0.8 to about 1.0, or from about 0.9 to about 1.0.

Another characteristic of the inventive ethylene/α-olefin interpolymer is that the inventive ethylene/α-olefin interpolymer comprises at least one polymer fraction which can be obtained by preparative TREF, wherein the fraction has a block index greater than about 0.1 and up to about 1.0 and a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent, (4) a glass transition temperature, $T_g$, of less than −25° C., more preferably less than −30° C.; and or (5) one and only one $T_m$.

Figure 6:
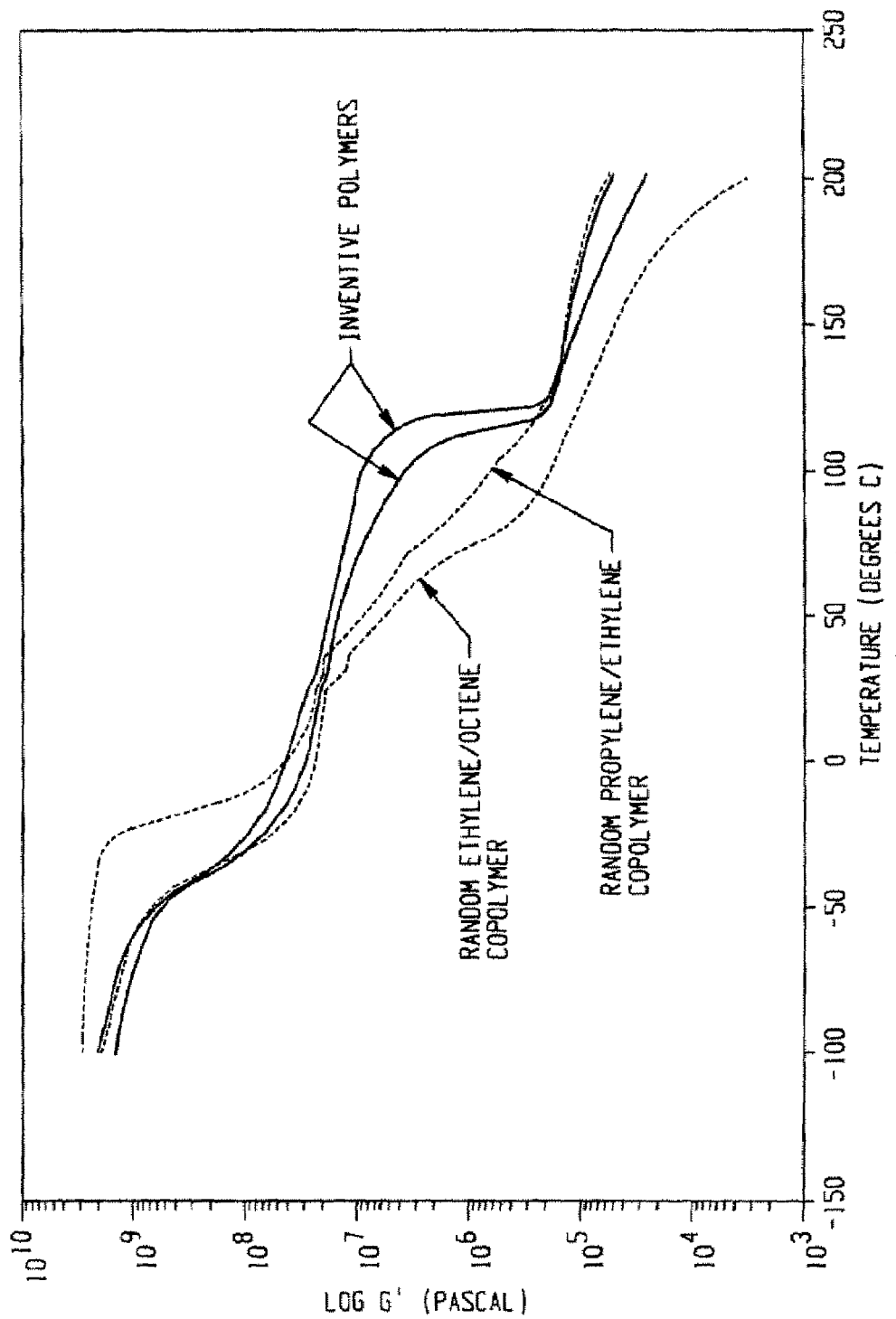
FIG. 6 is a graph of the log of storage modulus as a function of temperature for comparative ethylene/1-octene copolymer (curve 2) and propylene/ethylene-copolymer (curve 3) and for two ethylene/1-octene block copolymers of the invention made with differing quantities of chain shuttling agent (curves 1).

Further the inventive polymers can have, alone or in combination with any other properties disclosed herein, a storage modulus, G', such that log (G') is greater than or equal to 400 kPa, preferably greater than or equal to 1.0 MPa, at a temperature of 100° C. Moreover, the inventive polymers possess a relatively, flat storage modulus as a function of temperature in the range from 0 to 100° C. (illustrated in FIG. 6) that is characteristic of block copolymers, and heretofore unknown for an olefin copolymer, especially a copolymer of ethylene and one or more $C_{3-8}$ aliphatic α-olefins. (By the term "relatively flat" in this context is meant that log G' (in Pascals) decreases by less than one order of magnitude between 50 and 100° C., preferably between 0 and 100° C.).

Figure 7:
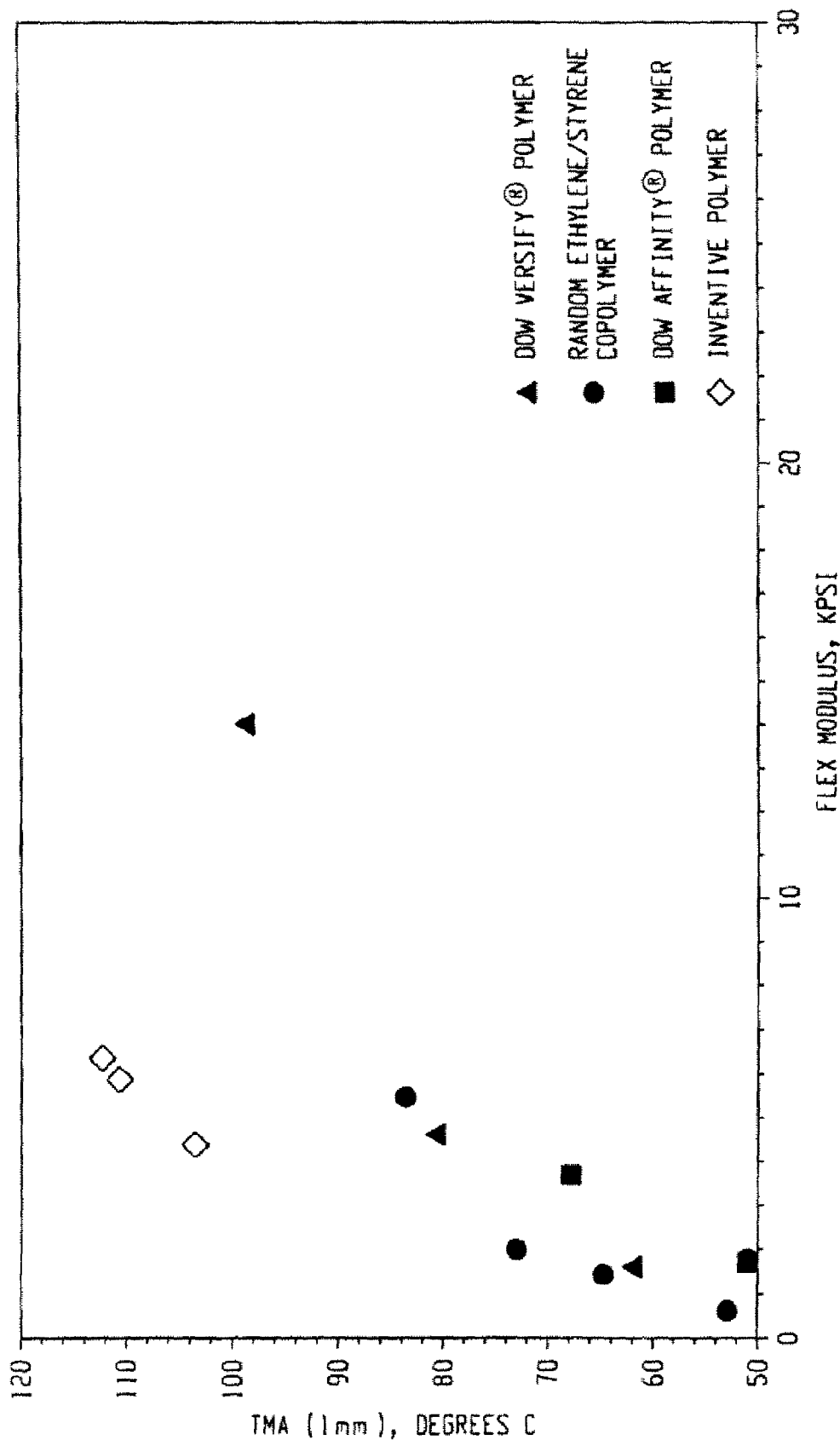
FIG. 7 shows a plot of TMA (1 mm) versus flex modulus for some inventive polymers (represented by the diamonds), as compared to some known polymers. The triangles represent various Dow VERSIFY™ polymers (available from The Dow Chemical Company); the circles represent various random ethylene/styrene copolymers; and the squares represent various Dow AFFINITY™ polymers (available from The Dow Chemical Company).

The inventive interpolymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the inventive interpolymers can have a thermomechanical analysis penetration depth of 1 mm at a temperature of at least 104° C. as well as a flexural, modulus of at least 3 kpsi (20 MPa). They may be characterized as having an abrasion resistance (or volume loss) of less than 90 mm$^3$. FIG. 7 shows the TMA (1 mm) versus flex modulus for the inventive polymers, as compared to other known polymers. The inventive polymers have significantly better flexibility-heat resistance balance than the other polymers.

Additionally, the ethylene/α-olefin interpolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 61 g/0 minutes or from 0.3 to 10 g/0 minutes. In certain embodiments, the melt index for the ethylene/α-olefin polymers is 1 g/10 minutes, 3 g/10 minutes or 5 g/10 minutes.

The polymers can have molecular weights, M, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the inventive polymers can be from 0.80 to 0.99 g/cm$^3$ and preferably for ethylene containing polymers from 0.85 g/cm$^3$ to 0.97 g/cm$^3$. In certain embodiments, the density of the ethylene/α-olefin polymers ranges from 0.860 to 0.925 g/cm$^3$ or 0.867 to 0.910 g/cm$^3$.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/662,938, filed Mar. 17, 2005; PCT Application No. PCT/US2005/008916, filed Mar. 17, 2005; PCT Application No. PCT/US2005/008915, filed Mar. 17, 2005, and PCT Application No. PCT/US2005/008917, filed Mar. 17, 2005, all of which are incorporated by reference herein in their entirety. For example, one such method comprises contacting ethylene and optionally one or more addition polymerizable monomers other than ethylene under addition polymerization conditions with a catalyst composition comprising:

the admixture or reaction product resulting from combining:

(A) a first olefin polymerization catalyst having a high comonomer incorporation index, (B) a second olefin polymerization catalyst having a comonomer incorporation index less than 90 percent preferably less than 50 percent, most preferably less than 5 percent of the comonomer incorporation index of catalyst (A), and (C) a chain shuttling agent.

Representative catalysts and chain shuttling agent are as follows.

Catalyst (A1) is [N-(2,6-di(1-methylethyl)phenyl)amido)(2-isopropylphenyl)(α-naphthalen-2-diyl(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

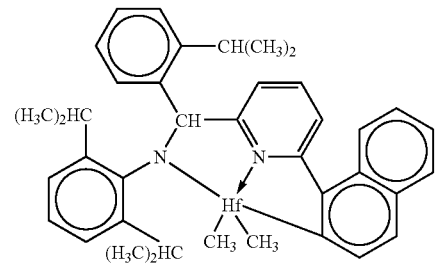

Catalyst (A2) is [N-(2,6-di(1-methylethyl)phenyl)amido)(2-methylphenyl)(1,2-phenylene-(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

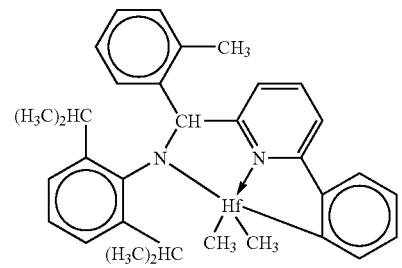

Catalyst (A3) is bis[N,N'''-(2,4,6-tri(methylphenyl)amido)ethylenediamine]hafnium dibenzyl.

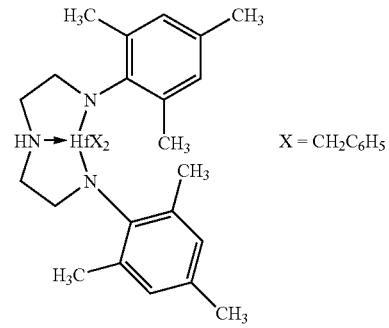

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

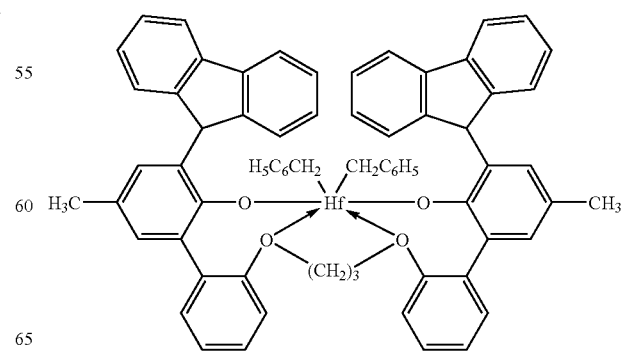

Catalyst (B1) is 1,2-bis-(3,5-di-t-butylphenylene)(1-(N-(1-methylethyl)immino)methyl)(2-oxoyl) zirconium dibenzyl

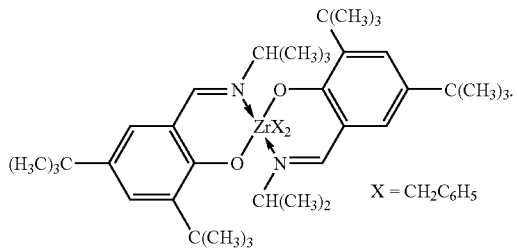

Catalyst (B12) is 1,2-bis-(3,5-di-t-butylphenylene)(1-(N-(2-methylcyclohexyl)immino)methyl)(2-oxoyl) zirconium dibenzyl

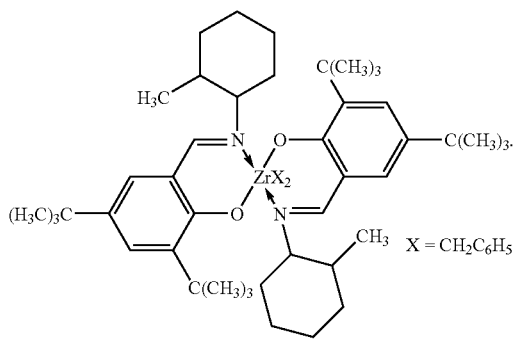

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

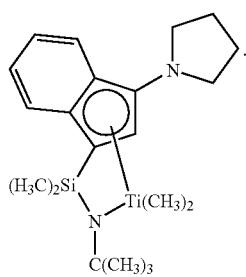

Catalyst (C2) is (t-butylamido)di(4-methylphenyl)(2-methyl-1,2,3,3a,7a-η-inden-1-yl)silanetitanium dimethyl prepared substantially according to the teachings of US-A-2003/004286:

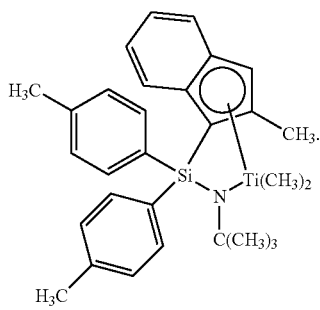

Catalyst (C3) is (t-butylamido)di(4-methylphenyl)(2-methyl-1,2,3,3a,8a-η-s-indacen-1-yl)silanetitanium dimethyl prepared substantially according to the teachings of US-A-2003/004286:

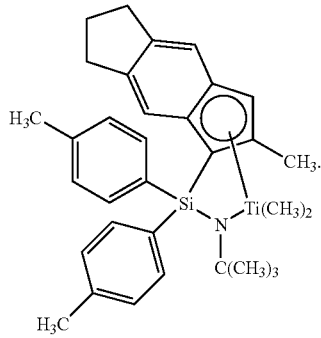

Catalyst (D1) is bis(dimethyldisiloxane)(indene-1-yl)zirconium dichloride available from Sigma-Aldrich:

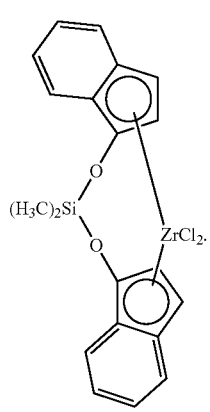

Shuttling Agents The shuttling agents employed include diethylzinc di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzine (2,6-diphenylphenoxide), and ethylzinc (t-butoxide).

Preferably, the foregoing process takes the for of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

The inventive interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the inventive interpolymers have better (higher) heat resistance as measured by melting point, higher TMA penetration temperature, higher high-temperature tensile strength, and/or higher high-temperature torsion storage modulus as determined by dynamic mechanical analysis. Compared to a random copolymer containing the same monomers and monomer content, the inventive interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

The inventive interpolymers also exhibit a unique crystallization and branching distribution relationship. That is, the inventive interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the inventive interpolymers is due to the unique distribution of the comonomer in blocks within the polymer backbone. In particular, the inventive interpolymers may comprise alternating blocks of differing comonomer content (including homopolymer blocks). The inventive interpolymers may also comprise a distribution in number and/or block size of polymer blocks of differing density or comonomer content, which is a Schultz-Flory type of distribution. In addition, the inventive interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the inventive interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene α-olefin interpolymers used in the embodiments of the invention are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{70}$ diene, having improved properties can be prepared.

Suitable non-conjugated diene monomers can be a straight chain branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene: 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multiring alicyclic fused and bridged ring dienes, such as tetrahydroindene, methyl tetrahydroindene, dicyclopentadiene, bicyclo-(2,2,1)-hepta-2.5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2$=CHR*, where R* is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is malic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

Testing Methods

In the examples that follow, the following analytical techniques are employed:

GPC Method for Samples 1-4 and A-C

An automated liquid-handling robot equipped with a heated needle set to 160° C. is used to add enough 1,2,4-trichlorobenzene stabilized with 300 ppm Ionol to each dried polymer sample to give a final concentration of 30 mg/mL. A small glass stir rod is placed into each tube and the samples are heated to 160° C. for 2 hours on a heated, orbital-shaker rotating at 250 rpm. The concentrated polymer solution is then diluted to 1 mg/ml using the automated liquid-handling robot and the heated needle set to 160° C.

A Symyx Rapid GPC system is used to determine the molecular weight data for each sample. A Gilson 350 pump set at 2.0 ml/min flow rate is used to pump helium-purged 1,2-dichlorobenzene stabilized with 300 ppm Ionol as the mobile phase through three Plgel 10 micrometer (μm) Mixed B 300 mm×7.5 mm columns placed in series and heated to 160° C. A Polymer Labs ELS 1000 Detector is used with the Evaporator set to 250° C., the Nebulizer set to 165° C., and the nitrogen flow rate set to 1.8 SLM at a pressure of 60-80 psi (400–600 kPa) $N_2$. The polymer samples are heated to 160° C. and each sample injected into a 250 μl loop using the liquid-handling robot and a heated needle. Serial analysis of the polymer samples using two switched loops and overlapping injections are used. The sample data is collected and analyzed using Symyx Epoch™ software. Peaks are manually integrated and the molecular weight information reported uncorrected against a polystyrene standard calibration curve.

Standard CRYSTAF Method

Branching distributions are determined by crystallization analysis fractionation (CRYSTAF) using a CRYSTHAF 200 unit commercially available from PolymerChar, Valencia, Spain. The samples are dissolved in 1,2,4 trichlorobenzene at 160° C. 0.66 mg/mL) for 1 hour and stabilized at 95° C. for 45 minutes. The sampling temperatures ran-e from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method (Excluding Samples 1-4 and A-C)

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disks accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

GPC Method (Excluding Samples 1-4 and A-C)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci. Polym. Let.*, 6, 621 (1968)): $M_{polyethylene}=0.431 (M_{polystyrene})$.

Polyethylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 minutes at 190° C., followed by 86 MPa for minutes at 190° C., followed by cooling inside the press with cold running water at 86 MPa.

Density

Samples for density measurement are prepared according to ASTM D 1928. Measurements are made within one hour of sample pressing using ASTM. D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

Optical Properties

Films of 0.4 mm thickness are compression molded using a hot press (Carver Model #4095-4PR1001R). The pellets are placed between polytetrafluoroethylene sheets, heated at 190° C. at 55 psi (380 kPa) for 3 minutes, followed by 11.3 MPa for 3 minutes, and then 2.6 MPa for 3 minutes. The film is then cooled in the press with running cold water at 1.3 MPa for 1 minute. The compression molded films are used for optical measurements, tensile behavior, recovery and stress relaxation.

Clarity is measured using BYK Gardner Haze-gard as specified in ASTM D 1746.

45° gloss is measured using BYK Gardner Glossmeter Microgloss 45° as specified in ASTM D-2457.

Internal haze is measured using BYK Gardner Haze-gard based on ASTM D 1003 Procedure A. Mineral oil is applied to the film surface to remove surface scratches.

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C. 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min$^{-1}$. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min$^{-1}$ at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30 mm diameter×3.3 mm thick, compression molded discs, formed at 180° C. and 10 mPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

Melt Index

Melt index, or $I_2$, is measured in accordance with ASTM D 1238, Condition 190° C./2.16 kg. Melt index, or $I_{10}$ is also measured in accordance with ASTM D 1238. Condition 190° C./10 kg.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peats I. R.; *Determination of Branching Distributions in Polyethylene and Ethylene copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 110° C. at a rate of 1.5° C./min.

$^{13}$C NMR Analysis

The samples are prepared by adding approximately 3 g of a 5050 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum, signal-to-noise for quantitative analysis multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 µm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 µm polytetrafluoroethylene coated filter paper (available from Osmonics Inc., Cat# Z50WP04750). The filtrated fractions are dried overnight in a vacuum oven at 60° C. and weighed on an analytical balance before further testing.

Melt Strength

Melt Strength (MS) is measured by using a capillary rheometer fitted with a 2.1 mm diameter, 20:1 die with an entrance angle of approximately 45 degrees. After equilibrating the samples at 190° C. for 10 minutes, the piston is run at a speed of 1 inch/minute (2.54 cm/minute). The standard test temperature is 190° C. The sample is drawn uniaxially to a set of accelerating nips located 100 mm below the die with an acceleration of 2.4 mm/sec$^2$. The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength. The melt strength is recorded in centiNewtons ("cN").

Catalysts

The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from ExxonMobil Chemical Company. In the event the name of a compound herein does not conform to the structural representation thereof, the structural representation shall control. The synthesis of all metal complexes and the preparation of all screening experiments were carried out in a dry nitrogen atmosphere using dry box techniques. All solvents used were HPLC grade and were dried before their use.

MMAO refers to modified methylalumoxane, a triisobutylaluminum modified methylalumoxane available commercially from Akzo-Noble Corporation.

The preparation of catalyst (B1) is conducted as follows.

a) Preparation of (1-methylethyl)(2-hydroxy-3,5-di(t-butyl)phenyl)methylimine 3,5-Di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of 1,2-bis-(3,5-di-t-butylphenylene) (1-(N-(1-methylethyl)imino methyl)(2-oxoyl) zirconium dibenzyl A solution of (1-methylethyl)(2-hydroxy-3,5-di(t-butyl)phenyl)imine (605 mg, 2.2 mmol) in 5 mL toluene is slowly added to a solution of $Zr(CH_2Ph)_4$ (500 mg, 1.1 mmol) in 50 mL toluene. The resulting dark yellow solution is stirred for 30 minutes. Solvent is removed under reduced pressure to yield the desired product as a reddish-brown solid.

The preparation of catalyst (B2) is conducted as follows.

a) Preparation of (1-(2-methylcyclohexyl)ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added, the reaction mixture is stirred for three hours and then cooled to −25° C. for 12 hours. The resulting yellow solid precipitate is collected by filtration and washed with cold methanol (2×15 mL), and then dried under reduced pressure. The yield is 11.17 g of a yellow solid. $^1$H NMR is consistent with the desired product as a mixture of isomers.

b) Preparation of bis-(1-(2-methylcyclohexyl)ethyl) (2-oxoyl-3,5-di(t-butyl)phenyl) immino)zirconium dibenzyl A solution of (1-(2-methylcyclohexyl)ethyl)(2-oxoyl-3,5-di(t-butyl)phenyl)imine ((7.63 g, 23.2 mmol) in 200 mL toluene is slowly added to a solution of $Zr(CH_2Ph)_4$ (5.28 g 11.6 mmol) in 600 mL toluene. The resulting dark yellow solution is stirred for 1 hour at 25° C. The solution is diluted further with 680 mL toluene to give a solution having a concentration of 0.00783 M.

Cocatalyst 1 A mixture of methyldi($C_{14-18}$alkyl)ammonium salts of tetrakis(pentafluorophenyl)borate (here-in-after armeenium borate), prepared by reaction of a long chain trialkylamine (Armeen™ M2HT, available from Akzo-Nobel, Inc). HCl and Li[B($C_6F_5)_4$], substantially as disclosed in U.S. Pat. No. 5,919,9883, Ex. 2.

Cocatalyst 2 Mixed $C_{14-18}$ alkyldimethylammonium salt of bis(tris(pentafluorophenyl)-alumane)-2-undecylimidazolide, prepared according to U.S. Pat. No. 6,395,671, Ex. 16.

Shuttling Agents The shuttling agents employed include diethylzinc (DEZ, SA1), di(1-butyl)zinc (SA2), di(n-hexyl)zinc (SA3), triethylaluminum (TEA, SA4), trioctylaluminum (SA5), triethylgallium (SA6), i-butylaluminum bis(dimethyl(t-butyl)siloxane) (SA7), i-butylaluminum bis(di(trimethylsilyl)amide) (SA8), n-octylaluminum di(pyridine-2-methoxide) (SA9), bis(n-octadecyl)i-butylaluminum (SA10), i-butylaluminum bis(di(n-pentyl)amide) (SA11), n-octylaluminum bis(2,6-di-t-butylphenoxide) (SA12) n-octylaluminum di(ethyl(1-naphthyl)amide) (SA13), ethylaluminum bis(t-butyldimethylsiloxide) (SA14), ethylaluminum di(bis (trimethylsilyl)amide) (SA15), ethylaluminum bis(2,3,6,7-dibenzo-1-azacycloheptaneamide) (SA16), n-octylaluminum bis(2,3,6,7-dibenzo-1-azacycloheptaneamide) (SA17), n-octylaluminum bis(dimethyl(t-butyl)siloxide) (SA18), ethylzinc (2,6-diphenylphenoxide) (SA19), and ethylzinc (t-butoxide) (SA20).

Examples 1-4

Comparative A-C

General High Throughput Parallel Polymerization Conditions contained in Table 1. In Table 1 and elsewhere in the application, comparative compounds are indicated by an asterisk (*).

Examples 1-4 demonstrate the synthesis of linear block copolymers by the present invention as evidenced by the formation of a very narrow MWD, essentially monomodal copolymer when DEZ is present and a bimodal, broad molecular weight distribution product (a mixture of separately produced polymers) in the absence of DEZ. Due to the fact that Catalyst (A1) is known to incorporate more octene than Catalyst (B1), the different blocks or segments of the resulting copolymers of the invention are distinguishable based on branching or density.

TABLE 1

| Ex. | Cat. (A1) (μmol) | Cat (B1) (μmol) | Cocat (μmol) | MMAO (μmol) | shuttling agent (μmol) | Yield (g) | Mn | Mw/Mn | hexyls[1] |
|---|---|---|---|---|---|---|---|---|---|
| A* | 0.06 | — | 0.066 | 0.3 | — | 0.1363 | 300502 | 3.32 | — |
| B* | — | 0.1 | 0.110 | 0.5 | — | 0.1581 | 36957 | 1.22 | 2.5 |
| C* | 0.06 | 0.1 | 0.176 | 0.8 | — | 0.2038 | 45526 | 5.30[2] | 5.5 |
| 1 | 0.06 | 0.1 | 0.192 | — | DEZ (8.0) | 0.1974 | 28715 | 1.19 | 4.8 |
| 2 | 0.06 | 0.1 | 0.192 | — | DEZ (80.0) | 0.1468 | 2161 | 1.12 | 14.4 |
| 3 | 0.06 | 0.1 | 0.192 | — | TEA (8.0) | 0.208 | 22675 | 1.71 | 4.6 |
| 4 | 0.06 | 0.1 | 0.192 | — | TEA (80.0) | 0.1879 | 3338 | 1.54 | 9.4 |

[1]$C_6$ or higher chain content per 1000 carbons
[2]Bimodal molecular weight distribution Polymerizations are conducted using a high throughput, parallel polymerization reactor (PPR) available from Symyx Technologies, Inc. and operated substantially according to U.S. Pat. Nos. 6,248,540, 6,030,917, 6,362.309, 6,306,658, and 6,316,663. Ethylene copolymerizations are conducted at 130° C. and 200 psi (1.4 MPa) with ethylene on demand using 1.2 equivalents of cocatalyst 1 based on total catalyst used (1.1 equivalents when MMAO is present). A series of polymerizations are conducted in a parallel pressure reactor (PPR) contained of 48 individual reactor cells in a 6×8 array that are fitted with a pre-weighed glass tube. The working volume in each reactor cell is 6000 μL. Each cell is temperature and pressure controlled with stirring provided by individual stirring paddles. The monomer gas and quench gas are plumbed directly into the PPR unit and controlled by automatic valves. Liquid reagents are robotically added to each reactor cell by syringes and the reservoir solvent is mixed alkanes. The order of addition is mixed alkanes solvent (4 ml), ethylene, 1-octene comonomer (1 ml), cocatalyst 1 or cocatalyst 1/MMAO mixture, shuttling agent, and catalyst or catalyst mixture. When a mixture of cocatalyst 1 and MMAO or a mixture of two catalysts is used, the reagents are premixed in a small vial immediately prior to addition to the reactor. When a reagent is omitted in an experiment, the above order of addition is otherwise maintained. Polymerizations are conducted for approximately 1-2 minutes, until predetermined ethylene consumptions are reached. After quenching with CO, the reactors are cooled and the glass tubes are unloaded. The tubes are transferred to a centrifuge/vacuum drying unit, and dried for 12 hours at 60° C. The tubes containing dried polymer are weighed and the difference between this weight and the tare weight gives the net yield of polymer. Results are It may be seen the polymers produced according to the invention have a relatively narrow polydispersity (Mw/Mn) and larger block-copolymer content (trimer, tetramer, or larger) than polymers prepared in the absence of the shuttling agent.

Further characterizing data for the polymers of Table 1 are determined by reference to the figures. More specifically DISC and ATREF results show the following:

The DSC curve for the polymer of example 1 shows a 115.7° C. melting point (Tm) with a heat of fusion of 158.1 J/g. The corresponding CRYSTAF curve shows the tallest peak at 34.5° C. with a peak area of 52.9 percent. The difference between the DSC Tm and the Tcrystaf is 81.2° C.

The DSC curve for the polymer of example 2 shows a peak with a 109.7° C. melting point (Tm) with a heat of fusion of 214.0 J/g. The corresponding CRYSTAF curve shows the tallest peak at 46.2° C. with a peak area of 57.0 percent. The difference between the DSC Tm and the Tcrystaf is 63.5° C.

The DSC curve for the polymer of example 3 shows a peak with a 120.7° C. melting point (Tm) with a heat of fusion of 160.1 J/g. The corresponding CRYSTAF curve shows the tallest peak at 66.1° C. with a peak area of 71.8 percent. The difference between the DSC Tm and the Tcrystaf is 54.6° C.

The DSC curve for the polymer of example 4 shows a peak with a 104.5° C. melting point (Tm) with a heat of fusion of 170.7 J/g. The corresponding CRYSTAF curve shows the tallest peak at 30° C. with a peak area of 18.2 percent. The difference between the DSC Tin and the Tcrystaf is 74.5° C.

The DSC curve for comparative A shows a 90.0° C. melting point (Tim) with a heat of fusion of 86.7 J/g. The corresponding CRYSTAF curve shows the tallest peak at 48.5° C. with a peak area of 29.4 percent. Both of these values are consistent with a resin that is low in density. The difference between the DSC Tm and the Tcrystaf is 41.8° C.

The DSC curve for comparative B shows a 129.8° C. melting point (Tm) with a heat of fusion of 237.0 J/g. The corresponding CRYSTAF curve shows the tallest peak at 82.4° C. with a peak area of 83.7 percent. Both of these values are consistent with a resin that is high in density. The difference between the DSC Tm and the Tcrystaf is 47.4° C.

The DSC curve for comparative C shows a 12-5.3° C. melting point (Tm) with a heat of fusion of 143.0 J/g. The corresponding CRYSTAF curve shows the tallest peak at 81.8° C. with a peak area of 34.7 percent as well as a lower crystalline peak at 52.4° C. The separation between the two peaks is consistent with the presence of a high crystalline and a low crystalline polymer. The difference between the DSC Tm and the Tcrystaf is 43.5° C.

Examples 5-19

Comparatives D-F

Continuous Solution Polymerization, Catalyst A1/B2+DEZ

Continuous solution polymerizations are carried out in a computer controlled autoclave reactor equipped with an internal stirrer. Purified mixed alkanes solvent (Isopar™ E available from ExxonMobil Chemical Company), ethylene at 2.70 lbs, hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

TABLE 2

Process details for preparation of exemplary polymers

| Ex. | $C_8H_{16}$ kg/hr | Solv. kg/hr | $H_2$ sccm[1] | T °C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | $[C_2H_4]/[DEZ]^4$ | Poly Rate[5] kg/hr | Conv %[6] | Solids % | Eff.[7] |
|---|---|---|---|---|---|---|---|---|---|---|---|---|---|---|---|---|---|
| D* | 1.63 | 12.7 | 29.90 | 120 | 142.2 | 0.14 | — | — | 0.19 | 0.32 | 820 | 0.17 | 536 | 1.81 | 88.8 | 11.2 | 95.2 |
| E* | " | 9.5 | 5.00 | " | — | — | 109 | 0.10 | 0.19 | " | 1743 | 0.40 | 485 | 1.47 | 89.9 | 11.3 | 126.8 |
| F* | " | 11.3 | 251.6 | " | 71.7 | 0.06 | 30.8 | 0.06 | — | — | " | 0.11 | — | 1.55 | 88.5 | 10.3 | 257.7 |
| 5 | " | " | — | " | " | 0.14 | 30.8 | 0.13 | 0.17 | 0.43 | " | 0.26 | 419 | 1.64 | 89.6 | 11.1 | 118.3 |
| 6 | " | " | 4.92 | " | " | 0.10 | 30.4 | 0.08 | 0.17 | 0.32 | " | 0.18 | 570 | 1.65 | 89.3 | 11.1 | 172.7 |
| 7 | " | " | 21.70 | " | " | 0.07 | 30.8 | 0.06 | 0.17 | 0.25 | " | 0.13 | 718 | 1.60 | 89.2 | 10.6 | 244.1 |
| 8 | " | " | 36.90 | " | " | 0.06 | " | " | " | 0.10 | " | 0.12 | 1778 | 1.62 | 90.0 | 10.8 | 261.1 |
| 9 | " | " | 78.43 | " | " | " | " | " | " | 0.04 | " | " | 4596 | 1.63 | 90.2 | 10.8 | 267.9 |
| 10 | " | " | 0.00 | 123 | 71.1 | 0.12 | 30.3 | 0.14 | 0.34 | 0.19 | 1743 | 0.08 | 415 | 1.67 | 90.31 | 11.1 | 131.1 |
| 11 | " | " | " | 120 | 71.1 | 0.16 | " | 0.17 | 0.80 | 0.15 | 1743 | 0.10 | 249 | 1.68 | 89.56 | 11.1 | 100.6 |
| 12 | " | " | " | 121 | 71.1 | 0.15 | " | 0.07 | " | 0.09 | 1743 | 0.07 | 396 | 1.70 | 90.02 | 11.3 | 137.0 |
| 13 | " | " | " | 122 | 71.1 | 0.12 | " | 0.06 | " | 0.05 | 1743 | 0.05 | 653 | 1.69 | 89.64 | 11.2 | 161.9 |
| 14 | " | " | " | 120 | 71.1 | 0.05 | " | 0.29 | " | 0.10 | 1743 | 0.10 | 395 | 1.41 | 89.42 | 9.3 | 114.1 |
| 15 | 2.45 | " | " | " | 71.1 | 0.14 | " | 0.17 | " | 0.14 | 1743 | 0.09 | 282 | 1.80 | 89.33 | 11.3 | 121.3 |
| 16 | " | " | " | 122 | 71.1 | 0.10 | " | 0.13 | " | 0.07 | 1743 | 0.07 | 485 | 1.78 | 90.11 | 11.2 | 159.7 |
| 17 | " | " | " | 121 | 71.1 | 0.10 | " | 0.14 | " | 0.08 | 1743 | " | 506 | 1.75 | 89.08 | 11.0 | 155.6 |
| 18 | 0.69 | " | " | 121 | 71.1 | " | " | 0.22 | " | 0.11 | 1743 | 0.10 | 331 | 1.25 | 89.93 | 8.8 | 90.2 |
| 19 | 0.32 | " | " | 122 | 71.1 | 0.06 | " | " | " | 0.09 | 1743 | 0.08 | 367 | 1.16 | 90.74 | 8.4 | 106.0 |

*Comparative, not an example of the invention

[1] standard $cm^3$/min

[2] [N-(2,6-di(1-methylethyl)phenyl)amido)(2-isopropylphenyl)(α-naphthalen-2-diyl(6-pyridin-2-diyl)methane)]hafnium dimethyl

[3] bis-(1-(2-methylcyclohexyl)ethyl)(2-oxoyl-3,5-di(t-butyl)phenyl)immino) zirconium dibenzyl

[4] molar ratio in reactor

[5] polymer production rate

[6] percent ethylene conversion in reactor

[7] efficiency, kg polymer/g M where g M = g Hf + g Zr

TABLE 3

Properties of exemplary polymers

| Ex. | Density (g/cm³) | I₂ | I₁₀ | I₁₀/I₂ | Mw (g/mol) | Mn (g/mol) | Mw/Mn | Heat of Fusion (J/g) | T_m (° C.) | T_c (° C.) | T_CRYSTAF (° C.) | T_m − T_CRYSTAF (° C.) | CRYSTAF Peak Area (percent) |
|---|---|---|---|---|---|---|---|---|---|---|---|---|---|
| D* | 0.8627 | 1.5 | 10.0 | 6.5 | 110,000 | 55,800 | 2.0 | 32 | 37 | 45 | 30 | 7 | 99 |
| E* | 0.9378 | 7.0 | 39.0 | 5.6 | 65,000 | 33,300 | 2.0 | 183 | 124 | 113 | 79 | 45 | 95 |
| F* | 0.8895 | 0.9 | 12.5 | 13.4 | 137,300 | 9,980 | 13.8 | 90 | 125 | 111 | 78 | 47 | 20 |
| 5 | 0.8786 | 1.5 | 9.8 | 6.7 | 104,600 | 53,200 | 2.0 | 55 | 120 | 101 | 48 | 72 | 60 |
| 6 | 0.8785 | 1.1 | 7.5 | 6.5 | 109600 | 53300 | 2.1 | 55 | 115 | 94 | 44 | 71 | 63 |
| 7 | 0.8825 | 1.0 | 7.2 | 7.1 | 118,500 | 53,100 | 2.2 | 69 | 121 | 103 | 49 | 72 | 29 |
| 8 | 0.8828 | 0.9 | 6.8 | 7.7 | 129,000 | 40,100 | 3.2 | 68 | 124 | 106 | 80 | 43 | 13 |
| 9 | 0.8836 | 1.1 | 9.7 | 9.1 | 129600 | 28700 | 4.5 | 74 | 125 | 109 | 81 | 44 | 16 |
| 10 | 0.8784 | 1.2 | 7.5 | 6.5 | 113,100 | 58,200 | 1.9 | 54 | 116 | 92 | 41 | 75 | 52 |
| 11 | 0.8818 | 9.1 | 59.2 | 6.5 | 66,200 | 36,500 | 1.8 | 63 | 114 | 93 | 40 | 74 | 25 |
| 12 | 0.8700 | 2.1 | 13.2 | 6.4 | 101,500 | 55,100 | 1.8 | 40 | 113 | 80 | 30 | 83 | 91 |
| 13 | 0.8718 | 0.7 | 4.4 | 6.5 | 132,100 | 63,600 | 2.1 | 42 | 114 | 80 | 30 | 81 | 8 |
| 14 | 0.9116 | 2.6 | 15.6 | 6.0 | 81,900 | 43,600 | 1.9 | 123 | 121 | 106 | 73 | 48 | 92 |
| 15 | 0.8719 | 6.0 | 41.6 | 6.9 | 79,900 | 40,100 | 2.0 | 33 | 114 | 91 | 32 | 82 | 10 |
| 16 | 0.8758 | 0.5 | 3.4 | 7.1 | 148,500 | 74,900 | 2.0 | 43 | 117 | 96 | 48 | 69 | 65 |
| 17 | 0.8757 | 1.7 | 11.3 | 6.8 | 107,500 | 54,000 | 2.0 | 43 | 116 | 96 | 43 | 73 | 57 |
| 18 | 0.9192 | 4.1 | 24.9 | 6.1 | 72,000 | 37,900 | 1.9 | 136 | 120 | 106 | 70 | 50 | 94 |
| 19 | 0.9344 | 3.4 | 20.3 | 6.0 | 76,800 | 39,400 | 1.9 | 169 | 125 | 112 | 80 | 45 | 88 |

The resulting polymers are tested by DSC and ATREF as with previous examples. Results are as follows:

The DSC curve for the polymer of example 5 shows a peak with a 119.6° C. melting point (Tm) with a heat of fusion of 60.0 J/g. The corresponding CRYSTAF curve shows the tallest peak at 47.6° C. with a peak area of 59.5 percent. The delta between the DSC Tm and the Tcrystaf is 72.0° C.

The DSC curve for the polymer of example 6 shows a peak with a 15.2 AC melting point (Tm) with a heat of fusion of 60.4 J/g. The corresponding CRYSTAF curve shows the tallest peak at 44.2° C. with a peak area of 62.7 percent. The delta between the DSC Tm and the Tcrystaf is 71.0° C.

The DSC curve for the polymer of example 7 shows a peak with a 121.3° C. melting point with a heat of fusion of 69.1 J/g. The corresponding CRYSTAF curve shows the tallest peak at 49.2° C. with a peak area of 29.4 percent. The delta between the DSC Tm and the Tcrystaf is 72.1° C.

The DSC curve for the polymer of example 8 shows a peak with a 123.5° C. melting point (Tm) with a heat of fusion of 67.9 J/g. The corresponding CRYSTAF curve shows the tallest peak at 80.1° C. with a peak area of 12.7 percent. The delta between the DSC Tm and the Tcrystaf is 43.4° C.

The DSC curve for the polymer of example 9 shows a peak with a 124.6° C. melting point (Tm) with a heat of fusion of 73.5 J/g. The corresponding CRYSTAF curve shows the tallest peak at 80.8° C. with a peak area of 16.0 percent. The delta between the DSC Tm and the Tcrystaf is 43.8° C.

The DSC curve for the polymer of example 10 shows a peak with a 115.6° C. melting point (Tm) with a heat of fusion of 60.7 J/g. The corresponding CRYSTAF curve shows the tallest peak at 40.9° C. with a peak area of 52.4 percent. The delta between the DSC Tm and the Tcrystaf is 74.7° C.

The DSC curve for the polymer of example 11 shows a peak with a 113.6° C. melting point (Tm) with a heat of fusion of 70.4 J/g. The corresponding CRYSTAF curve shows the tallest peak at 39.6° C. with a peak area of 25.2 percent. The delta between the DSC Tm and the Tcrystaf is 74.1° C.

The DSC curve for the polymer of example 12 shows a peak with a 113.2° C. melting point (Tm) with a heat of fusion of 48.9 J/g. The corresponding CRYSTAF curve shows no peak equal to or above 30° C. (Tcrystaf for purposes of further calculation is therefore set at 30° C.). The delta between the DSC Tm and the Tcrystaf is 83.2° C.

The DSC curve for the polymer of example 13 shows a peak with a 114.4° C. melting point (Tm) with a heat of fusion of 49.4 J/g. The corresponding CRYSTAF curve shows the tallest peak at 33.8° C. with a peak area of 7.7 percent. The delta between the DSC Tm and the Tcrystaf is 84.4° C.

The DSC for the polymer of example 14 shows a peak with a 120.8° C. melting point (Tm) with a heat of fusion of 127.9 J/g. The corresponding CRYSTAF curve shows the tallest peak at 72.9° C. with a peak area of 92.2 percent. The delta between the DSC Tm and the Tcrystaf is 47.9° C.

The DSC curve for the polymer of example 15 shows a peak with a 114.3° C. melting point (Tm) with a heat of fusion of 36.2 J/g. The corresponding CRYSTAF curve shows the tallest peak at 32.3° C. with a peak area of 9.8 percent. The delta between the DSC Tm and the Tcrystaf is 82.0° C.

The DSC curve for the polymer of example 16 shows a peak with a 116.6° C. melting point (Tm) with a heat of fusion of 44.9 J/g. The corresponding CRYSTAF curve shows the tallest peak at 48.0° C. with a peak area of 65.0 percent. The delta between the DSC Tm and the Tcrystaf is 68.6° C.

The DSC curve for the polymer of example 17 shows a peak with a 116.0° C. melting point (Tm) with a heat of fusion of 47.0 J/g. The corresponding CRYSTAF curve shows the tallest peak at 43.1° C. with a peak area of 56.8 percent. The delta between the DSC Tm and the Tcrystaf is 72.9° C.

The DSC curve for the polymer of example 18 shows a peak with a 120.5° C. melting point (Tm) with a heat of fusion of 141.8 J/g. The corresponding CRYSTAF curve shows the tallest peak at 70.0° C. with a peak area of 94.0 percent. The delta between the DSC Tm and the Tcrystaf is 50.5° C.

The DSC curve for the polymer of example 19 shows a peak with a 124.8° C. melting point (Tm) with a heat of fusion of 141.8 J/g The corresponding CRYSTAF curve shows the tallest peak at 79.9° C. with a peak area of 87.9 percent. The delta between the DSC Tm and the Tcrystaf is 45.0° C.

The DSC curve for the polymer of comparative U shows a peak with a 37.3° C. melting point (Tm) with a heat of fusion of 31.6 J/g. The corresponding CRYSTAF curve shows no peak equal to and above 30° C. Both of these values are consistent with a resin that is low in density. The delta between the DSC Tm and the Tcrystaf is 7.3° C.

The DSC curve for the polymer of comparative E shows a peak with a 124.0° C. melting point (Tm) with a heat of fusion of 179.3 J/g. The corresponding CRYSTAF curve shows the tallest peak at 79.3° C. with a peak area of 94.6 percent. Both of these values are consistent with a resin that is high in density. The delta between the DSC Tm and the Tcrystaf is 44.6° C.

The DSC curve for the polymer of comparative F shows a peak with a 124.8° C. melting point (Tm) with a heat of fusion of 90.4 J/g. The corresponding CRYSTAF curve shows the tallest peak at 77.6° C. with a peak area of 19.5 percent. The separation between the two peaks is consistent with the presence of both a high crystalline and a low crystalline polymer. The delta between the DSC Tm and the Tcrystaf is 47.2° C.

Physical Property Testing

Polymer samples are evaluated for physical properties such as high temperature resistance properties, as evidenced by TMA temperature testing, pellet blocking strength, high temperature recovery, high temperature compression set and storage modulus ratio. $G'(25° C.)/G'(100° C.)$. Several commercially available polymers are included in the tests: Comparative G* is a substantially linear ethylene/1-octene copolymer (AFFINITY®, available from The Dow Chemical Company), Comparative H* is an elastomeric, substantially linear ethylene/1-octene copolymer (AFFINITY® EG8100, available from The Dow Chemical Company), Comparative 1 is a substantially linear ethylene 1-octene copolymer (AFFINITY® PL1840, available from The Dow Chemical Company), Comparative J is a hydrogenated styrene/butadiene/styrene triblock copolymer (KRATON™ G1652, available from KRATON Polymers), Comparative K is a thermoplastic vulcanizate (TPV, a polyolefin blend containing dispersed therein a crosslinked elastomer). Results are presented in Table 4.

TABLE 4

High Temperature Mechanical Properties

| Ex. | TMA-1 mm penetration (° C.) | Pellet Blocking Strength lb/ft² (kPa) | $G'(25° C.)/G'(100° C.)$ | 300% Strain Recovery (80° C.) (percent) | Compression Set (70° C.) (percent) |
|---|---|---|---|---|---|
| D* | 51 | — | 9 | Failed | — |
| E* | 130 | — | 18 | — | — |
| F* | 70 | 141 (6.8) | 9 | Failed | 100 |
| 5 | 104 | 0 (0) | 6 | 81 | 49 |
| 6 | 110 | — | 5 | — | 52 |
| 7 | 113 | — | 4 | 84 | 43 |
| 8 | 111 | — | 4 | Failed | 41 |
| 9 | 97 | — | 4 | — | 66 |
| 10 | 108 | — | 5 | 81 | 55 |
| 11 | 100 | — | 8 | — | 68 |
| 12 | 88 | — | 8 | — | 79 |
| 13 | 95 | — | 6 | 84 | 71 |
| 14 | 125 | — | 7 | — | — |
| 15 | 96 | — | 5 | — | 58 |
| 16 | 113 | — | 4 | — | 42 |
| 17 | 108 | 0 (0) | 4 | 82 | 47 |
| 18 | 125 | — | 10 | — | — |
| 19 | 133 | — | 9 | — | — |
| G* | 75 | 463 (22.2) | 89 | Failed | 100 |
| H* | 70 | 213 (10.2) | 29 | Failed | 100 |
| I* | 111 | — | 11 | — | — |
| J* | 107 | — | 5 | Failed | 100 |
| K* | 152 | — | 3 | — | 40 |

In Table 4, Comparative F (which is a physical blend of the two polymers resulting from simultaneous polymerizations using catalyst A1 and B1) has a 1 mm penetration temperature of about 70° C., while Examples 5-9 have a 1 mm penetration temperature of 100° C. or greater. Further, examples 10-19 all have a 1 mm penetration temperature of greater than 85° C., with most having 1 min TMA temperature of greater than 90° C. or even greater than 100° C. This shows that the novel polymers have better dimensional stability at higher temperatures compared to a physical blend. Comparative J (a commercial SEBS) has a good 1 mm TMA temperature of about 107° C. but it has very poor (high temperature 70° C.) compression set of about 100 percent and it also failed to recover (sample broke) during a high temperature (80° C.) 300 percent strain recovery. Thus the exemplified polymers have a unique combination of properties unavailable even in some commercially available high performance thermoplastic elastomers.

Similarly, Table 4 shows a low (good) storage modulus ratio. $G'(25° C.)/G'(100° C.)$ for the inventive polymers of 6 or less, whereas a physical blend (Comparative F) has a storage modulus ratio of 9 and a random ethylene/octene copolymer (Comparative G) of similar density has a storage modulus ratio an order of magnitude greater (89). It is desirable that the storage modulus ratio of a polymer be as close to 1 as possible. Such polymers will be relatively unaffected by temperature, and fabricated articles made from such polymers can be usefully employed over a broad temperature range. This feature of low storage modulus ratio and temperature independence is particularly useful in elastomer applications such as in pressure sensitive adhesive formulations.

The data in Table 4 also demonstrate that the polymers of the invention possess improved pellet blocking strength. In particular, Example 5 has a pellet blocking strength of 0 MPa, meaning it is free flowing under the conditions tested, compared to Comparatives F and G which show considerable blocking. Blocking strength is important since bulk shipment of polymers having large blocking strengths can result in product clumping or sticking together upon storage or shipping, resulting in poor handling properties.

High temperature (70° C.) compression set for the inventive polymers is generally good, meaning generally less than about 80 percent, preferably less than about 70 percent and especially less than about 60 percent. In contrast, Comparatives F, G, H and J all have a 70° C. compression set of 100 percent (the maximum possible value, indicating no recovery). Good high temperature compression set (low numerical values) is especially needed for applications such as gaskets, window profiles, o-rings, and the likes

TABLE 5

Ambient Temperature Mechanical Properties

| Ex. | Flex Modulus (MPa) | Tensile Modulus (MPa) | Tensile Strength (MPa)[1] | Elongation at Break[1] (%) | Tensile Strength (MPa) | Elongation at Break (%) | Abrasion: Volume Loss (mm³) | Tensile Notched Tear Strength (mJ) | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain[2] |
|---|---|---|---|---|---|---|---|---|---|---|---|---|---|
| D* | 12 | 5 | — | — | 10 | 1074 | — | — | 91 | 83 | 760 | — | — |
| E* | 895 | 589 | — | — | 31 | 1029 | — | — | — | — | — | — | — |
| F* | 57 | 46 | — | — | 12 | 824 | 93 | 339 | 78 | 65 | 400 | 42 | — |
| 5 | 30 | 24 | 14 | 951 | 16 | 1116 | 48 | — | 87 | 74 | 790 | 14 | 33 |
| 6 | 33 | 29 | — | — | 14 | 938 | — | — | — | 75 | 861 | 13 | — |
| 7 | 44 | 37 | 15 | 846 | 14 | 854 | 39 | — | 82 | 73 | 810 | 20 | — |
| 8 | 41 | 35 | 13 | 785 | 14 | 810 | 45 | 461 | 82 | 74 | 760 | 22 | — |
| 9 | 43 | 38 | — | — | 12 | 823 | — | — | — | — | — | 25 | — |
| 10 | 23 | 23 | — | — | 14 | 902 | — | — | 86 | 75 | 860 | 12 | — |
| 11 | 30 | 26 | — | — | 16 | 1090 | — | 976 | 89 | 66 | 510 | 14 | 30 |
| 12 | 20 | 17 | 12 | 961 | 13 | 931 | — | 1247 | 91 | 75 | 700 | 17 | — |
| 13 | 16 | 14 | — | — | 13 | 814 | — | 691 | 91 | — | — | 21 | — |
| 14 | 212 | 160 | — | — | 29 | 857 | — | — | — | — | — | — | — |
| 15 | 18 | 14 | 12 | 1127 | 10 | 1573 | — | 2074 | 89 | 83 | 770 | 14 | — |
| 16 | 23 | 20 | — | — | 12 | 968 | — | — | 88 | 83 | 1040 | 13 | — |
| 17 | 20 | 18 | — | — | 13 | 1252 | — | 1274 | 13 | 83 | 920 | 4 | — |
| 18 | 323 | 239 | — | — | 30 | 808 | — | — | — | — | — | — | — |
| 19 | 706 | 483 | — | — | 36 | 871 | — | — | — | — | — | — | — |
| G* | 15 | 15 | — | — | 17 | 1000 | — | 746 | 86 | 53 | 110 | 27 | 50 |
| H* | 16 | 15 | — | — | 15 | 829 | — | 569 | 87 | 60 | 380 | 23 | — |
| I* | 210 | 147 | — | — | 29 | 697 | — | — | — | — | — | — | — |
| J* | — | — | — | — | 32 | 609 | — | — | 93 | 96 | 1900 | 25 | — |
| K* | — | — | — | — | — | — | — | — | — | — | — | 30 | — |

[1]Tested at 51 cm/minute
[2]measured at 38° C. for 12 hours

Table 5 shows results for mechanical properties for the new polymers as well as for various comparison polymers at ambient temperatures. It may be seen that the inventive polymers have very good abrasion resistance when tested according to ISO 4649, generally showing a volume loss of less than about 90 mm³, preferably less than about 80 mm³, and especially less than about 50 mm³. In this test, higher numbers indicate higher volume loss and consequently lower abrasion resistance.

Tear strength as measured by tensile notched tear strength of the inventive polymers is generally 1000 mJ or higher as shown in Table 5. Tear strength for the inventive polymers can be as high as 3000 mJ, or even as high as 1000 mJ. Comparative polymers generally have tear strengths no higher than 750 mJ.

Table 5 also shows that the polymers of the invention have better retractive stress at 150 percent strain (demonstrated by higher retractive stress values) than some of the comparative samples. Comparative Examples F, G and H, have retractive stress value at 150 percent strain of 400 kPa or less, while the inventive polymers have retractive stress values at 150 percent strain of 500 kPa (Ex. 11) to as high as about 1100 kPa (Ex. 17). Polymers having higher than 150 percent retractive stress values would be quite useful for elastic applications, such as elastic fibers and fabrics, especially nonwoven fabrics. Other applications include diaper, hygiene, and medical garment waistband applications, such as tabs and elastic bands.

Table 5 also shows that stress relaxation (at 50 percent strain) is also improved (less) for the inventive polymers as compared to, for example Comparative G. Lower stress relaxation means that the polymer retains its force better in applications such as diapers and other garments where retention of elastic properties over long time periods at body temperatures is desired.

Optical Testing

TABLE 6

Polymer Optical Properties

| Ex. | Internal Haze (percent) | Clarity (percent) | 45° Gloss (percent) |
|---|---|---|---|
| F* | 84 | 22 | 49 |
| G* | 5 | 73 | 56 |
| 5 | 13 | 72 | 60 |
| 6 | 33 | 69 | 53 |
| 7 | 28 | 57 | 59 |
| 8 | 20 | 65 | 62 |
| 9 | 61 | 38 | 49 |
| 10 | 15 | 73 | 67 |
| 11 | 13 | 69 | 67 |
| 12 | 8 | 75 | 72 |
| 13 | 7 | 74 | 69 |
| 14 | 59 | 15 | 62 |
| 15 | 11 | 74 | 66 |
| 16 | 39 | 70 | 65 |
| 17 | 29 | 73 | 66 |
| 18 | 61 | 22 | 60 |
| 19 | 74 | 11 | 52 |
| G* | 5 | 73 | 56 |
| H* | 12 | 76 | 59 |
| I* | 20 | 75 | 59 |

The optical properties reported in Table 6 are based on compression molded films substantially lacking in orientation. Optical properties of the polymers may be varied over wide ranges, due to variation in crystallite size, resulting from variation in the quantity of chain shuttling agent employed in the polymerization.

Extractions of Multi-Block Copolymers

Extraction studies of the polymers of examples 5, 7 and Comparative F are conducted. In the experiments, the polymer sample is weighed into a glass fritted extraction thimble and fitted into a Kumagawa type extractor. The extractor with sample is purged with nitrogen, and a 500 mL round bottom flask is charged with 350 mL of diethyl ether. The flask is then fitted to the extractor. The ether is heated while being stirred. Time is noted when the ether begins to condense into the thimble, and the extraction is allowed to proceed under nitrogen for 24 hours. At this time, heating is stopped and the solution is allowed to cool. Any ether remaining in the extractor is returned to the flask. The ether in the flask is evaporated under vacuum at ambient temperature, and the resulting solids are purged dry with nitrogen. Any residue is transferred to a weighed bottle using successive washes of hexane. The combined hexane washes are then evaporated with another nitrogen purge, and the residue dried under vacuum overnight at 40° C. Any remaining ether in the extractor is purged dry with nitrogen.

A second clean round bottom flask charged with 350 mL of hexane is then connected to the extractor. The hexane is heated to reflux with stirring and maintained at reflux for 24 hours after hexane is first noticed condensing into the thimble. Heating is then stopped and the flask is allowed to cool. Any hexane remaining in the extractor is transferred back to the flask. The hexane is removed by evaporation under vacuum at ambient temperature, and any residue remaining in the flask is transferred to a weighed bottle using successive hexane washes. The hexane in the flask is evaporated by a nitrogen purge, and the residue is vacuum dried overnight at 40° C.

The polymer sample remaining in the thimble after the extractions is transferred from the thimble to a weighed bottle and vacuum dried overnight at 40° C. Results are contained in Table 7.

post reactor solution is then heated in preparation for a two-stage devolatization. The solvent and unreacted monomers are removed during the devolatization process. The polymer melt is pumped to a die for underwater pellet cutting.

Example 19J

Continuous solution polymerizations are carried out in a computer controlled autoclave reactor equipped with an internal stirrer. Purified mixed alkanes solvent (Isopar™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent teed to the reactor is measured by a mass-flow controller. A variable speed diaphragm pump controls the solvent flow rate and pressure to the reactor. At the discharge of the pump, a side stream is taken to provide flush flows for the catalyst and cocatalyst injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent monomer solution is controlled by use of a heat exchanger before entering the reactor. This stream enters the bottom of the

TABLE 7

| Sample | wt. (g) | ether soluble (g) | ether soluble (percent) | $C_8$ mole percent[1] | hexane soluble (g) | hexane soluble (percent) | $C_8$ mole percent[1] | residue $C_8$ mole percent[1] |
|---|---|---|---|---|---|---|---|---|
| Comp. F* | 1.097 | 0.063 | 5.69 | 12.2 | 0.245 | 22.35 | 13.6 | 6.5 |
| Ex. 5 | 1.006 | 0.041 | 4.08 | — | 0.040 | 3.98 | 14.2 | 11.6 |
| Ex. 7 | 1.092 | 0.017 | 1.59 | 13.3 | 0.012 | 1.10 | 11.7 | 9.9 |

[1]Determined by $^{13}$C NMR

Additional Polymer Examples 19A-J

Continuous Solution Polymerization, Catalyst A1/B2+DEZ

For Examples 19A-I

Continuous solution polymerizations are carried out in a computer controlled well-mixed reactor. Purified mixed alkanes solvent (Isopar™ E available from Exxon Mobil, Inc.), ethylene, 1-octene, and hydrogen (where used) are combined and fed to a 27 gallon reactor. The feeds to the reactor are measured by mass-flow controllers. The temperature of the feed stream is controlled by use of a glycol cooled heat exchanger before entering the reactor. The catalyst component solutions are metered using pumps and mass flow meters. The reactor is run liquid-full at approximately 550 psig pressure. Upon exiting the reactor, water and additive are injected in the polymer solution. The water hydrolyzes the catalysts, and terminates the polymerization reactions. The reactor. The catalyst component solutions are metered using pumps and mass flow meters and are combined with the catalyst flush solvent and introduced into the bottom of the reactor. The reactor is run liquid-frill at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer.

Process details and results are contained in Table 8. Selected polymer properties are provided in Tables 9A-C.

In Table 9B, inventive examples 19F and 19G show low immediate set of around 65-70% strain after 500% elongation.

TABLE 8

Polymerization Conditions

| Ex. | C₂H₄ lb/hr | C₈H₁₆ lb/hr | Solv. lb/hr | H₂ sccm[1] | T °C. | Cat A1[2] Conc. ppm | Cat A1 Flow lb/hr | Cat B2[3] Conc. ppm | Cat B2 Flow lb/hr | DEZ Conc wt % | DEZ Flow lb/hr |
|---|---|---|---|---|---|---|---|---|---|---|---|
| 19A | 55.29 | 32.03 | 323.03 | 101 | 120 | 600 | 0.25 | 200 | 0.42 | 3.0 | 0.70 |
| 19B | 53.95 | 28.96 | 325.3 | 577 | 120 | 600 | 0.25 | 200 | 0.55 | 3.0 | 0.24 |
| 19C | 55.53 | 30.97 | 324.37 | 550 | 120 | 600 | 0.216 | 200 | 0.609 | 3.0 | 0.69 |
| 19D | 54.83 | 30.58 | 326.33 | 60 | 120 | 600 | 0.22 | 200 | 0.63 | 3.0 | 1.39 |
| 19E | 54.95 | 31.73 | 326.75 | 251 | 120 | 600 | 0.21 | 200 | 0.61 | 3.0 | 1.04 |
| 19F | 50.43 | 34.80 | 330.33 | 124 | 120 | 600 | 0.20 | 200 | 0.60 | 3.0 | 0.74 |
| 19G | 50.25 | 33.08 | 325.61 | 188 | 120 | 600 | 0.19 | 200 | 0.59 | 3.0 | 0.54 |
| 19H | 50.15 | 34.87 | 318.17 | 58 | 120 | 600 | 0.21 | 200 | 0.66 | 3.0 | 0.70 |
| 19I | 55.02 | 34.02 | 323.59 | 53 | 120 | 600 | 0.44 | 200 | 0.74 | 3.0 | 1.72 |
| 19J | 7.46 | 9.04 | 50.6 | 47 | 120 | 150 | 0.22 | 76.7 | 0.36 | 0.5 | 0.19 |

| Ex. | Cocat 1 Conc. ppm | Cocat 1 Flow lb/hr | Cocat 2 Conc. ppm | Cocat 2 Flow lb/hr | Zn[4] in polymer ppm | Poly Rate[5] lb/hr | Conv[6] wt % | Polymer wt % | Eff.[7] |
|---|---|---|---|---|---|---|---|---|---|
| 19A | 4500 | 0.65 | 525 | 0.33 | 248 | 83.94 | 88.0 | 17.28 | 297 |
| 19B | 4500 | 0.63 | 525 | 0.11 | 90 | 80.72 | 88.1 | 17.2 | 295 |
| 19C | 4500 | 0.61 | 525 | 0.33 | 246 | 84.13 | 88.9 | 17.16 | 293 |
| 19D | 4500 | 0.66 | 525 | 0.66 | 491 | 82.56 | 88.1 | 17.07 | 280 |
| 19E | 4500 | 0.64 | 525 | 0.49 | 368 | 84.11 | 88.4 | 17.43 | 288 |
| 19F | 4500 | 0.52 | 525 | 0.35 | 257 | 85.31 | 87.5 | 17.09 | 319 |
| 19G | 4500 | 0.51 | 525 | 0.16 | 194 | 83.72 | 87.5 | 17.34 | 333 |
| 19H | 4500 | 0.52 | 525 | 0.70 | 259 | 83.21 | 88.0 | 17.46 | 312 |
| 19I | 4500 | 0.70 | 525 | 1.65 | 600 | 86.63 | 88.0 | 17.6 | 275 |
| 19J | — | — | — | — | — | — | — | — | — |

[1]standard cm³/min
[2][N-(2,6-di(1-methylethyl)phenyl)amido)(2-isopropylphenyl)(α-naphthalen-2-diyl)(6-pyridin-2-diyl)methane)]hafnium dimethyl
[3]bis-(1-(2-methylcyclohexyl)ethyl)(2-oxoyl-3,5-di(t-butyl)phenyl)immino) zirconium dimethyl
[4]ppm in final product calculated by mass balance
[5]polymer production rate
[6]weight percent ethylene conversion in reactor
[7]efficiency, kg polymer/g M where g M = g Hf + g Z

TABLE 9A

Polymer Physical Properties

| Ex. | Density (g/cc) | I2 | I10 | I10/I2 | Mw (g/mol) | Mn (g/mol) | Mw/Mn | Heat of Fusion (J/g) | Tm (°C.) | Tc (°C.) | TCRYSTAF (°C.) | Tm − TCRYSTAF (°C.) | CRYSTAF Peak Area (wt %) |
|---|---|---|---|---|---|---|---|---|---|---|---|---|---|
| 19A | 0.8781 | 0.9 | 0.4 | 6.9 | 123700 | 61000 | 2.0 | 56 | 119 | 97 | 46 | 73 | 40 |
| 19B | 0.8749 | 0.9 | 7.3 | 7.8 | 133000 | 44300 | 3.0 | 52 | 122 | 100 | 30 | 92 | 76 |
| 19C | 0.8753 | 5.6 | 38.5 | 6.9 | 81700 | 37300 | 2.2 | 46 | 122 | 100 | 30 | 92 | 8 |
| 19D | 0.8770 | 4.7 | 31.5 | 6.7 | 80700 | 39700 | 2.0 | 52 | 119 | 97 | 48 | 72 | 5 |
| 19E | 0.8750 | 4.9 | 33.5 | 6.8 | 81800 | 41700 | 2.0 | 49 | 121 | 97 | 36 | 84 | 12 |
| 19F | 0.8652 | 1.1 | 7.5 | 6.8 | 124900 | 60700 | 2.1 | 27 | 119 | 88 | 30 | 89 | 89 |
| 19G | 0.8649 | 0.9 | 6.4 | 7.1 | 135000 | 64800 | 2.1 | 26 | 120 | 92 | 30 | 90 | 90 |
| 19H | 0.8654 | 1.0 | 7.0 | 7.1 | 131600 | 66900 | 2.0 | 26 | 118 | 88 | — | — | — |
| 19I | 0.8774 | 11.2 | 75.2 | 6.7 | 66400 | 33700 | 2.0 | 49 | 119 | 99 | 40 | 79 | 13 |
| 19J | 0.8995 | 5.6 | 39.4 | 7.0 | 75500 | 29900 | 2.5 | 101 | 122 | 106 | — | — | — |

TABLE 9B

Polymer Physical Properties of Compression Molded Film

| Example | Density (g/cm³) | Melt Index (g/10 min) | Immediate Set after 100% Strain (%) | Immediate Set after 300% Strain (%) | Immediate Set after 500% Strain (%) | Recovery after 100% (%) | Recovery after 300% (%) | Recovery after 500% (%) |
|---|---|---|---|---|---|---|---|---|
| 19A | 0.878 | 0.9 | 15 | 63 | 131 | 85 | 79 | 74 |
| 19B | 0.877 | 0.88 | 14 | 49 | 97 | 86 | 84 | 81 |
| 19F | 0.865 | 1 | — | — | 70 | — | 87 | 86 |

TABLE 9B-continued

Polymer Physical Properties of Compression Molded Film

| Example | Density (g/cm$^3$) | Melt Index (g/10 min) | Immediate Set after 100% Strain (%) | Immediate Set after 300% Strain (%) | Immediate Set after 500% Strain (%) | Recovery after 100% (%) | Recovery after 300% (%) | Recovery after 500% (%) |
|---|---|---|---|---|---|---|---|---|
| 19G | 0.865 | 0.9 | — | — | 66 | — | — | 87 |
| 19H | 0.865 | 0.92 | — | 39 | — | — | 87 | — |

TABLE 9C

Average Block Index For exemplary polymers[1]

| Example | Zn/C$_2$[2] | Average BI |
|---|---|---|
| Polymer F | 0 | 0 |
| Polymer 8 | 0.56 | 0.59 |
| Polymer 19a | 1.3 | 0.62 |
| Polymer 5 | 2.4 | 0.52 |
| Polymer 19b | 0.56 | 0.54 |
| Polymer 19h | 3.15 | 0.59 |

[1]Additional information regarding the calculation of the block indices for various polymers is disclosed in U.S. patent application Ser. No. 11/376,835, entitled "Ethylene/α-Olefin Block Interpolymers", filed on Mar. 15, 2006, in the name of Colin E. P. Shan, Lonnie Hazlitt, et. al. and assigned to Dow Global Technologies Inc., the disclose of which is incorporated by reference herein in its entirety.
[2]Zn/C$_2$ *1000 = (Zn feed flow*Zn concentration/1000000/Mw of Zn)/(Total Ethylene feed flow*(1-fractional ethylene conversion rate)/Mw of Ethylene)*1000. Please note that "Zn" in "Zn/C$_2$*1000" refers to the amount of zinc in diethyl zinc ("DEZ") used in the polymerization process, and "C2" refers to the amount of ethylene used in the polymerization process.

Examples 20 and 21

The ethylene/α-olefin interpolymer of Examples 20 and 21 were made in a substantially similar manner as Examples 19A-I above with the polymerization conditions shown in Table 11 below. The polymers exhibited the properties shown in Table 10. Table 10 also shows any additives to the polymer.

TABLE 10

Properties and Additives of Examples 20-21

| | Example 20 | | Example 21 | |
|---|---|---|---|---|
| Density (g/cc) | 0.8800 | | 0.8800 | |
| MI | 1.3 | | 1.3 | |
| Additives | DI Water | 100 | DI Water | 75 |
| | Irgafos 168 | 1000 | Irgafos 168 | 1000 |
| | Irganox 1076 | 250 | Irganox 1076 | 250 |
| | Irganox 1010 | 200 | Irganox 1010 | 200 |
| | Chimmasorb 2020 | 100 | Chimmasorb 2020 | 80 |
| Hard segment split (wt %) | 35% | | 35% | |

Irganox 1010 is Tetrakismethylene(3,5-di-t-butyl-4-hydroxyhydrocinnamate)methane. Irganox 1076 is Octadecyl-3-(3',5'-di-t-butyl-4'-hydroxyphenyl)propionate. Irgafos 168 is Tris(2,4-di-t-butylphenyl)phosphite. Chimasorb 2020 is 1,6-Hexanediamine, N,N'-bis(2,2,6,6-tetramethyl-4-piperidinyl)-polymer with 2,3,6-trichloro-1,3,5-triazine, reaction products with, N-butyl-1-butanamine and N-butyl-2,2,6,6-tetramethyl-4-piperidinamine.

TABLE 11

Polymerization Conditions for Examples 20-21

| Ex. | C$_2$H$_4$ lb/hr | C$_8$H$_{16}$ lb/hr | Solv. lb/hr | H$_2$ sccm[1] | T °C. | Cat A1[2] Conc. ppm | Cat A1 Flow lb/hr | Cat B2[3] Conc. ppm | Cat B2 Flow lb/hr | DEZ Conc wt % |
|---|---|---|---|---|---|---|---|---|---|---|
| 20 | 130.7 | 196.17 | 712.68 | 1767 | 120 | 499.98 | 1.06 | 298.89 | 0.57 | 4.809423 |
| 21 | 132.13 | 199.22 | 708.23 | 1572 | 120 | 462.4 | 1.71 | 298.89 | 0.6 | 4.999847 |

| Ex. | DEZ Flow lb/hr | Cocat 1 Conc. ppm | Cocat 1 Flow lb/hr | Cocat 2 Conc. ppm | Cocat 2 Flow lb/hr | Zn[4] in polymer ppm | Poly Rate[5] lb/hr | Conv[6] wt % | Polymer wt % | Eff.[7] |
|---|---|---|---|---|---|---|---|---|---|---|
| 20 | 0.48 | 5634.36 | 1.24 | 402.45 | 0.478 | 131 | 177 | 89.25 | 16.94 | 252.04 |
| 21 | 0.47 | 5706.4 | 1.61 | 289.14 | 1.36 | 129 | 183 | 89.23 | 17.52 | 188.11 |

*Comparative, not an example of the invention
[1]standard cm$^3$/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dibenzyl
[4]ppm Zinc in final product calculated by mass balance
[5]polymer production rate
[6]weight percent ethylene conversion in reactor
[7]efficiency, kg polymer/g M where g M = g Hf + g Z Fibers Suitable for Moldable Fabrics and Textile Articles The present invention relates to fabrics suitable for molding. Such fabrics are often useful as textile articles or garments such as bras, swimwear, intimate apparel, shoe uppers, sockliners, automotive parts, sports equipment such as diving suits, and protective gear for soccer, hockey and football, e.g. shinguards. In regard to, for example, bras, the inventive fabric may be employed similar to conventional fabrics as described in, for example, U.S. Pat. Nos. 3,981,310; 4,551,892 incorporated herein by reference.

The fabrics are comprised of elastic fibers wherein the elastic fibers comprise the reaction product of at least one ethylene polymer and at least one suitable cross-linking agent. As used herein, "cross-linking agent" is any means which cross-links one or more, preferably a majority, of the fibers. Thus, cross-linking agents may be chemical compounds but are not necessarily so. Cross-linking agents as used herein also include electron-beam irradiation, beta irradiation, gamma irradiation, corona irradiation, silanes, peroxides allyl compounds and UV radiation with or without crosslinking catalyst. U.S. Pat. Nos. 6,803,014 and 6,667,351 disclose electron-beam irradiation methods that can be used in embodiments of the invention. Typically, enough fibers are crosslinked in an amount such that the fabric is capable of being molded. This amount varied depending upon the specific polymer and the degree of moldability desired. However, in some embodiments, the percent of cross-linked polymer is at least about 5 percent, preferably at least about 10, more preferably at least about 15 weight percent to about at most 65, preferably at most about 50 percent, more preferably at most about 40 percent as measured by the weight percent of gels formed according to the method described in Example 28.

The fibers typically have a filament elongation to break of said fiber is greater than about 200%, preferably greater than about 210%, preferably greater than about 220%, preferably greater than about 230%, preferably greater than about 240%, preferably greater than about 250%, preferably greater than about 260%, preferably greater than about 270%, preferably greater than about 280%, and may be as high as 600% according to ASTM D2653-01 (elongation at first filament break test). The fibers of the present invention are further characterized by having (1) ratio of load at 200% elongation/load at 100% elongation of greater than or equal to about 1.5, preferably greater than or equal to about 1.6, preferably greater than or equal to about 1.7, preferably greater than or equal to about 1.8, preferably greater than or equal to about 1.9, preferably greater than or equal to about 2.0, preferably greater than or equal to about 2.1, preferably greater than or equal to about 2.2, preferably greater than or equal to about 2.3, preferably greater than or equal to about 2.4, and may be as high as 4 according to ASTM D-2731-01 (under force at specified elongation in the finished fiber form).

The polyolefin may be selected from any suitable polyolefin or blend of polyolefins. Such polymers include, for example, random ethylene homopolymers and copolymers, ethylene block homopolymers and copolymers, polypropylene homopolymers and copolymers, ethylene/vinyl alcohol copolymers, and mixtures thereof. A particularly preferable polyolefin is a homogeneously branched ethylene polymer such as those sold by The Dow Chemical Company called Affinity™. Another particularly preferable polyolefin is an ethylene/α-olefin interpolymer, wherein the ethylene/α-olefin interpolymer has one or more of the following characteristics before crosslinking:

(1) an average block index greater than zero and up to about 1.0 and a molecular weight distribution, Mw/Mn, greater than about 1.3; or
(2) at least one molecular fraction which elutes between 40° C. and 130° C. when fractionated using TREF, characterized in that the fraction has a block index of at least 0.5 and up to about 1; or
(3) an Mw/Mn from about 1.7 to about 3.5, at least one melting point, Tm, in degrees Celsius, and a density, d, in grams/Cubic centimeter, wherein the numerical values of Tm and d correspond to the relationship:

$T_m > -2002.9 + 4538.5(d) - 2422.2(d)^2$; or (4) an Mw/Mn from about 1.7 to about 3.54 and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$\Delta T > -0.1299(\Delta H) + 62.81$ for ΔH greater than zero and up to 130 J/g, $\Delta T \geq 48°$ C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.: or (5) an elastic recovery. Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re > 1481 - 1629(d)$; or (6) a molecular fraction which lutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or
(7) a storage modulus at 25° C., G (25° C.), and a storage modulus at 100° C., G'(100° C.), wherein the ratio of G'(25° C.) to G'(100° C.) is in the range of about 1:1 to about 9:1.

The fibers may be made into any desirable size and cross-sectional shape depending upon the desired application. For many applications approximately round cross-section is desirable due to its reduced friction. However, other shapes such as a trilobal shape, or a flat (i.e., "ribbon" like) shape can also be employed. Denier is a textile term which is defined as the grams of the fiber per 9000 meters of that fiber's length. Preferred sizes include a denier from at least about 1, preferably at least about 20, preferably at least about 50, to at most about 180, preferably at most about 150, preferably at most about 100 denier, preferably at most about 90 denier.

Depending upon the application the fiber may take any suitable form including a staple fiber or binder fiber. Typical examples may include a homofil fiber, a bicomponent fiber, a meltblown fiber, a meltspun fiber, or a spunbond fiber, In the case of a bicomponent fiber it may have a sheath-core structure; a sea-island structure: a side-by-side structure; a matrixfibril stricture; or a segmented pie structure. Advantageously, conventional fiber forming processes may be employed to make the aforementioned fibers. Such processes include those described in, for example, U.S. Pat. Nos. 4,340,563; 4,663,220; 4,668,566; 4,322,027; and 4,413,110).

Depending upon their composition, the fibers may be made to facilitate processing and unwind the same as or better from a spool than other fibers. Ordinary fibers when in round cross section often fail to provide satisfactory unwinding performance due to their base polymer excessive stress relaxation. This stress relaxation is proportional to the age of the spool and causes filaments located at the very surface of the spool to lose grip on the surface, becoming loose filament strands. Later, when such a spool containing conventional fibers is placed over the rolls of positive feeders, i.e. Memminger-IRO, and starts to rotate to industrial speeds, i.e. 100 to 300 rotations/minute, the loose fibers are thrown to the sides of the spool surface and ultimately fall off the edge of the spool. This failure is known as derails which denotes the tendency of conventional fibers to slip off the shoulder or edge of the package which disrupts the unwinding process and ultimately causes machine stops. The above fibers may exhibit derailing to the same or a much less significant degree which possibly allows greater throughput.

Another advantage of the fibers is that defects such as fabric faults and elastic filament or fiber breakage may be equivalent or reduced as compared to conventional fibers. That is, use of the above fibers may reduce buildup of fiber fragments on a needle bed—a problem that often occurs in circular knit machines when polymer residue adheres to the needle surface. Thus, the fibers may reduce the corresponding fabric breaks caused by the residue when the fibers are being made into. e.g. fabrics on a circular knitting machine.

Another advantage is that the fibers may be knitted in circular machines where the elastic guides that drive the filament all the way from spool to the needles are stationary such as ceramic and metallic eyelets. In contrast, some conventional elastic olefin fibers require that these guides be made of rotating elements such as pulleys as to minimize friction as machine parts, such as eyelets, are heated up so that machine stops or filament breaks could be avoided during the circular knitting process. That is, the friction against the guiding elements of the machine is reduced by using the inventive fibers. Further information concerning circular knitting is found in, for example, Bamberg Meisenbach, "Circular Knitting: Technology Process, Structures, Yarns, Quality", 1995, incorporated herein by reference in its entirety.

Additives

Antioxidants, e.g., IRGAFOS® 168, IRGANOX® 1010, IRGANOX® 3790, and CHIMIVASSORB® 944 made by Ciba Geigy Corp., may be added to the ethylene polymer to protect against undo degradation during shaping or fabrication operation and/or to better control the extent of grafting, or crosslinking (i.e., inhibit excessive gelation). In-process additives, e.g. calcium stearate, water, fluoropolymers, etc., may also be used for purposes such as for the deactivation of residual catalyst and/or improved processability. TINUVIN® 770 (from Ciba-Geigy) can be used as a light stabilizer.

The copolymer can be filled or unfilled. If filled, then the amount of filler present should not exceed an amount that would adversely affect either heat-resistance or elasticity at an elevated temperature. If present, typically the amount of filter is between 0.01 and 80 wt % based on the total weight of the copolymer (or if a blend of a copolymer and one or more other polymers, then the total weight of the blend). Representative filters include kaolin clay, magnesium hydroxide, zinc oxide, silica and calcium carbonate. In a preferred embodiment, in which a filler is present, the filler is coated with a material that will prevent or retard any tendency that the filler might otherwise have to interfere with the crosslinking reactions. Stearic acid is illustrative of such a filler coating.

To reduce the friction coefficient of the fibers, various spin finish formulations can be used, such as metallic soaps dispersed in textile oils (see for example U.S. Pat. No. 3,039,895 or U.S. Pat. No. 6,652,599), surfactants in a base oil (see for example US publication 2003/0024052) and polyalkylsiloxanes (see for example U.S. Pat. No. 3,296,063 or U.S. Pat. No. 4,999,120). U.S. patent application Ser. No. 10/933,721 (published as US20050142360) discloses spin finish compositions that can also be used.

Knitted Fabrics

The present invention is directed to improved knit textile articles comprising a polyolefin polymer. For purposes of the present inventions "textile articles" includes fabric as well as articles, i.e., garments, made from the fabric including, for example, bras and other items in need of moldability. By knitting it is meant t intertwining yarn or thread in a series of connected loops either by hand, with knitting needles, or on a machine. The present invention may be applicable to any type of knitting including, for example warp or weft knitting, flat knitting, and circular knitting. Particularly preferred warp knits include tricot, raschel powernet and lacing while preferred weft knits include circular, flat, as well as, seamless which is usually considered a subset of circular knits. However, the invention is particularly advantageous when employed in circular knitting i.e., knitting in the round, in which a circular needle is employed.

The knit fabrics of the present invention preferably comprise:

(A) an ethylene/α-olefin interpolymer, wherein the ethylene/α-olefin interpolymer has one or more of the following characteristics:

(1) an average block index greater than zero and up to about 1.0 and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1; or (3) an Mw/Mn from about 1.7 to about 3.5, at least one melting point. Tm, in degrees Celsius, and a density, d, in grams/cubic centimeter, wherein the numerical values of Tm and d correspond to the relationship:

$$T_m > -2002.9 + 4538.5(d) - 2422.2(d)^2;\ or$$

(4) an Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81\ \text{for}\ \Delta H\ \text{greater than zero and up to 130 J/g,}$$

$$\Delta T \geq 48°\ C.\ \text{for}\ \Delta H\ \text{greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (5) an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ or}$$

(6) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (7) a storage modulus at 25' C., G'(25° C.), and a storage modulus at 100° C., G'(100° C.), wherein the ratio of G (25° C.) to G'(100° C.) is in the range of about 1:1 to about 9:1; or (B) a homogeneously branched ethylene polymer.

The amount of polymer in the knit fabric varies depending upon the polymer, the application and the desired properties. The fabrics typically comprises at least about 1, preferably at least about 2, preferably at least about 5, preferably at least about 7 weight percent ethylene/α-olefin interpolymer. The fabrics typically comprise less than about 50, preferably less than about 40, preferably less than about 30, preferably less than about 20, more preferably less than about 10 weight percent ethylene/α-olefin interpolymer. The ethylene/α-olefin interpolymer may be in the form of a fiber and may be blended with another suitable polymer e.g. polyolefins such as random ethylene copolymers, HDPE, LLDPE, LDPE, ULDPE, polypropylene homopolymers, copolymers, plastomers and elastomers, lastol, a polyamide, etc.

The ethylene/α-olefin interpolymer of the fabric may have any density but is usually at least about 0.85 and preferably at least about 0.865 g/cm3 (ASTM D 792). Correspondingly, the density is usually less than about 0.93, preferably less than about 0.92 g/cm3 (ASTM D 792). The ethylene/α-olefin interpolymer of the fabric is characterized by an uncrosslinked melt index of from about 0.1 to about 10 g/10 minutes. If crosslinking is desired, then the percent of crosslinked polymer is often at least 10 percent, preferably at least about 20, more preferably at least about 25 weight percent to about at most 90, preferably at most about 75, as measured by the weight percent of gels formed.

The fibers may be direct knit into, or covered by a hard yarn and knit into, fabrics which may then be molded. When covered, it is typically covered by a material selected from the group consisting of rayon, viscose, polyester polyamide, polypropylene, other synthetic fibers, and mixtures thereof. The elastic fiber (covered or bare) may be knit with the synthetic fibers previously listed, as well as, possibly further comprising fibers of another material selected from the group consisting of cellulose cotton, flax, ramie, hemp, wool, silk, linen, bamboo, tencel, mohair, other natural fibers, and mixtures thereof. Often the other material comprises the majority of the fabric. In such case it is preferred that the other material comprise from at least about 50, preferably at least about 60, preferably at least about 70, preferably at last about 80, sometimes as much as 90-95, percent by weight of the fabric.

The ethylene/α-olefin interpolymer, the other material or both may be in the form of a fiber. Preferred sizes include a denier from at least about 1, preferably at least about 20, preferably at least about 50, to at most about 180, preferably at most about 150, preferably at most about 100, preferably at most about 80 denier.

If desired an additional stretch material may be employed in addition to the ethylene/α-olefin interpolymer. For example, the ethylene/α-olefin interpolymer fiber may be employed with a second stretch material. Suitable additional stretch materials may include elastic fibers comprised of a polymer selected from the group consisting of polybutylene terephthalate, spandex, poly(ethylene terephthalate), poly(trimethylene terephthalate), or mixtures thereof. Such mixtures include bicomponent fibers like poly(ethylene terephthalate)/poly(trimethylene terephthalate) such as, for example, T-400™ fibers. Other bicomponent fibers may include bicomponent polyester and bicomponent polyamide. For wovens, the ethylene/α-olefin interpolymer fibers may be employed in either the warp or weft direction while the additional stretch material is employed in either the warp or the weft direction.

Particularly preferred circular knit fabrics comprise ethylene/α-olefin interpolymer in the form of a fiber in an amount of from about 5 to about 20 percent (by weight) of the fabric. Particularly preferred warp knit fabrics comprise ethylene/α-olefin interpolymer in the form of a fiber in an amount of from about 10 to about 30 percent (by weight) of the fabric in the form of a fiber. Often such warp knit and circular knit fabrics also comprise polyesters, polyamides, polypropylenes, cottons, or mixtures thereof.

The knit fabric typically has less than about 5, preferably less than 4, preferably less than 3, preferably less than 2 preferably less than 1, preferably less than 0.5, preferably less than 0.25, percent shrinkage after wash according to AATCC 135 in either the horizontal direction, the vertical direction, or both. More specifically, the fabric (after heat setting) often has a dimensional stability before any molding of from about 7% to about +7%, preferably −5% to about +5%, preferably from about −3% to about +3%, preferably −2% to about +2%, more preferably −1% to about +1% in the lengthwise direction, the widthwise direction, or both according to AATCC135 IVAi. In addition, the fabrics often have less shrinkage after wash according to AATCC 135 IVAi than a comparable fabric of elastic fibers with a higher amount of crosslinking.

The knit fabric can be made more or less stretchable in their two dimensions if desired by controlling the type and amount of ethylene/α-olefin interpolymer and other materials. Similarly, the fabric can be made such that the growth can be controlled. The controlled growth, among other things, allows the fabrics of the invention to be heat set at temperatures from less than about 180, preferably less than about 170, preferably less than about 160, preferably less than about 150° C. while still controlling size.

Advantageously, the knit fabrics of the present invention can be made without substantial number of breaks and using a knitting machine comprising an eyelet feeder system, a pulley system, or a combination thereof. Thus, the circular knitted stretch fabrics having improved moldability while having acceptable dimensional stability (lengthwise and widthwise), acceptable growth and shrinkage, the ability to be heat set at low temperatures while controlling size, low moisture regain can be made without significant breaks, with high throughput, and without derailing in a wide variety of circular knitting machines.

Advantageously, the fabrics of the present invention are capable of being molded i.e., become set into a shape conforming to a three-dimensional mold when subjected to heat without substantial distension of the structure of the fabric. Conventional fabric molding equipment may be employed.

As stated in WO 2001081443, "Typical heat-setting temperatures used in commercial operations are 195C for fabrics containing spandex and 6,6-nylon, 190C when the fabric contains 6 nylon, and 180C when the fabric contains cotton. It is desirable to heat-set fabrics containing cotton and spandex, but if the spandex has adequate heat-set efficiency only at temperatures used for nylon-containing fabrics, the spandex cannot be properly heat-set in cotton-containing fabrics, which will be damaged by exposure to the required high temperatures." Fortunately the fabrics of the present invention may be molded at lower temperatures. This often results in lower energy consumption and/or reduced time in the mold. The molded fabrics of the present invention also often have less discoloration, i.e., loss of whiteness due to yellowing or scorching, than conventional molded fabrics comprising spandex. Other benefits of the molded fabrics of the present invention often include colorfastness and washfastness of any applied dye. In that respect, it has been found that the molded fabrics of the present invention often exhibit a b value within 4, preferably within 3, more preferably within 2 b units as used in CIELAB units, of the b value of the fabric before molding wherein the b value is determined as described in Examples 30-31 below.

Contrary to prior art fabrics consisting only of spandex the fabrics of the present invention that comprise cross-linked fibers of elastic ethylene/α-olefin interpolymer may be processed at temperatures as high as 220C with harsher chemical treatments without substantial degradation of the fabric's properties. While higher temperatures may be employed, for molding of most fabrics of the present invention, the molding may be done at lower than conventional spandex molding temperatures. The specific molding times and temperatures will vary depending upon the specific fabric, molding equipment, and desired properties. However, typically the fabrics may be molded at a temperature of less than about 220, preferably less than about 210, preferably less than about 200, preferably less than about 190, preferably less than about 180, more preferably below about 170C. Correspondingly, the temperature is usually at least about 120, preferably at least about 130C. A molding apparatus that allows for rapid cooling of the molded fabric while the fabric is stretched or soon thereafter is often advantageous. The amount of molding residence time varies but is usually less than about 3 minutes, preferably less than about 2 minutes, preferably less than about 1 minute. Correspondingly, the amount of molding residence time at the increased temperature is usually at least about 3, in some cases at least about 10, and in some cases at least about 30 seconds.

EXAMPLES

Example 22

Fibers of Elastic Ethylene/α-Olefin Interpolymer with Higher Crosslinking

The elastic ethylene/ca-olefin interpolymer of Example 20 was used to make monofilament fibers of 40 denier having an approximately round cross-section. Before the fiber was made the following additives were added to the polymer: 7000 ppm PDMSO (polydimethyl siloxane), 3000 ppm CYANOX 1790 (1,3,5-tris-(4-t-butyl-3-hydroxy-2,6-dimethylbenzyl)-1,3,5-triazine-2,4,6-(1H,3H,5H)-trione, and 3000 ppm CHIMASORB 944 Poly-[[6-(1,11,33-tetramethylbutyl)amino]-s-triazine-2,4-diyl][2,2,6,6-tetramethyl-4-piperidyl)imino]hexamethylene[(2,2,6,6-tetramethyl-4-piperidyl)imino]] and 0.5% by weight $TiO_2$. During the melt spinning of the fibers, a particular spin pack melt filter was used and consisted of three (3) screen components: (1) 10-layer POROSTFAR® XL filter at 500 microns (2) nonwoven at 100 microns nominal dimension and (3) 10-layer POROSTAR XL at 100 microns. The initial clean filter dP was typically 45 bar and would increase into the 90 to 100 bar range during the course of the run at which point the filter elements were changed out with clean filters and the cycle repeated over again. This arrangement gave good performance with respect to minimizing fiber breaks and maximizing time interval between shutdowns to install clean spin packs. The fibers were produced using a die profile with circular 0.8 mm diameter, a spin temperature of 299° C., a winder speed of 1000 m/minute, a spin finish of 2%, a cold draw of 6%, and a spool weight of 150 g. The fibers were then crosslinked using a total of 176.4 kGy irradiation as the crosslinking agent while maintaining the temperature of the spool below about 30C.

Example 23

Fibers of Elastic Ethylene/α-Olefin Interpolymer with Lower Crosslinking

The elastic ethylene/α-olefin interpolymer of Example 20 was used to make monofilament fibers of 40 denier having an approximately round cross-section. Before the fiber was made the following additives were added to the polymer: 7000 ppm PDMSO (polydimethyl siloxane), 3000 ppm CYANOX 1790 (1,3,5-tris-(4-t-butyl-3-hydroxy-2,6-dimethylbenzyl)-1,3,5-triazine-2,4,6-(1H,3H,5H)-trione, and 3000 ppm CHIMASORB 944 Poly-[[6-(1,1,3,3-tetramethylbutyl)amino]-s-triazine-2,4-diyl][2,2,6,6-tetramethyl-4-piperidyl)imino]hexamethylene((2,6,6-tetramethyl-4-piperidyl)imino]] and 0.5% by weight $TiO_2$. The fibers were produced using a die profile with circular 0.8 mm diameter, a spin temperature of 299° C. a winder speed of 1000 m/minute, a spin finish of 2%, a cold draw of 2%, and a spool weight of 150 g. The fibers were then crosslinked using a total of 70.4 kGy irradiation as the crosslinking agent while maintaining the temperature of the spool below about 30C.

Example 24

Fabrics of Fibers of Elastic Ethylene/α-Olefin Interpolymer and Polyester

Two circular knitted fabrics were produced from the fibers of Example 22 (Fabric 22-A and Fabric 22-B) and two circular knitted fabrics were produced from the fibers of Example 23 (Fabric 23-A and Fabric 23-B). The hard yarn employed was a polyester of 150 denier, 96 filament. A summary of the fabric content, knitting conditions, finishing steps, and finished fabric properties is as follows:

Knitting Machine Type

|  | San Da Single jersey 4F |
| --- | --- |
| Structure | Platting |
| Needle Gauge | 24G; 2260T |
| Cylinder | 30 in |

-continued

|  | San Da Single jersey 4F |
|---|---|
| Feeder | 96F |
| Feeder guide | pulley |

The greige of the four fabrics were dyed and finished in a conventional manner. The scouring process was done in discontinuous jet, 130° C. dyeing temperature was employed. The heat-setting was done at temperature 165° C. and the speed is slowed down to 15 yds/min and 20% overfeed is applied.

The fabric width and weight per yard of greige and dyed fabrics is shown below. Fabric 22-A and Fabric 22-B is extended from 53 inches to 57 inches during heat-setting process on tenter frame. The fabric width is the result in 57 inches after heat-setting.

Fabric Width of Greige and Finished Goods

| Fabric | Greige | After dyeing | Overfed Heat setting |
|---|---|---|---|
| 22-A | 73" × 315 g/y 186 g/m² | 53" × 394 g/y 320 g/m² | 57" × 418 g/y 316 g/m² |
| 22-B | 73" × 310 g/y 183 g/m² | 53" × 403 g/y 327 g/m² | 57" × 434 g/y 328 g/m² |
| 23-A | 72" × 318 g/y 196 g/m² | 62" × 327 g/y 227 g/m² | 69" × 332 g/y 207 g/m² |
| 23-B | 71" × 318 g/y 193 g/m² | 62" × 313 g/y 217 g/m² | 69" × 316 g/y 197 g/m² |

The four fabrics were analyzed by AATCC 20A-2000 based on moisture regain weight to determine the fiber composition of fabric. The moisture regain of polyester is 0.4% and the moisture regain of ethylene/α-olefin interpolymer is 0%.

Fiber Composition of Knitted Fabrics (AATCC 20A-2000)

| Fabric | Polyester (%) | ethylene/α-olefin interpolymer (%) |
|---|---|---|
| 22-A | 90.0% | 10.0% |
| 22-B | 90.9% | 9.1% |
| 23-A | 90.1% | 9.9% |
| 23-B | 91.2% | 8.8% |

In order to measure the dimensional stability after heat setting AATCC 135-2003 IVA was conducted on each of the four fabrics for dimensional change test. The dimensional change ratio in length and width after $3^{rd}$ wash is recorded below.

Result of Dimensional Stability

| Fabric | Length wise | Width wise |
|---|---|---|
| 22-A | −0.5% | −0.5% |
| 22-B | −0.5% | −0.5% |
| 23-A | −0.5% | −0.5% |
| 23-B | −0.5% | −0.5% |

Example 25

Figure 8:
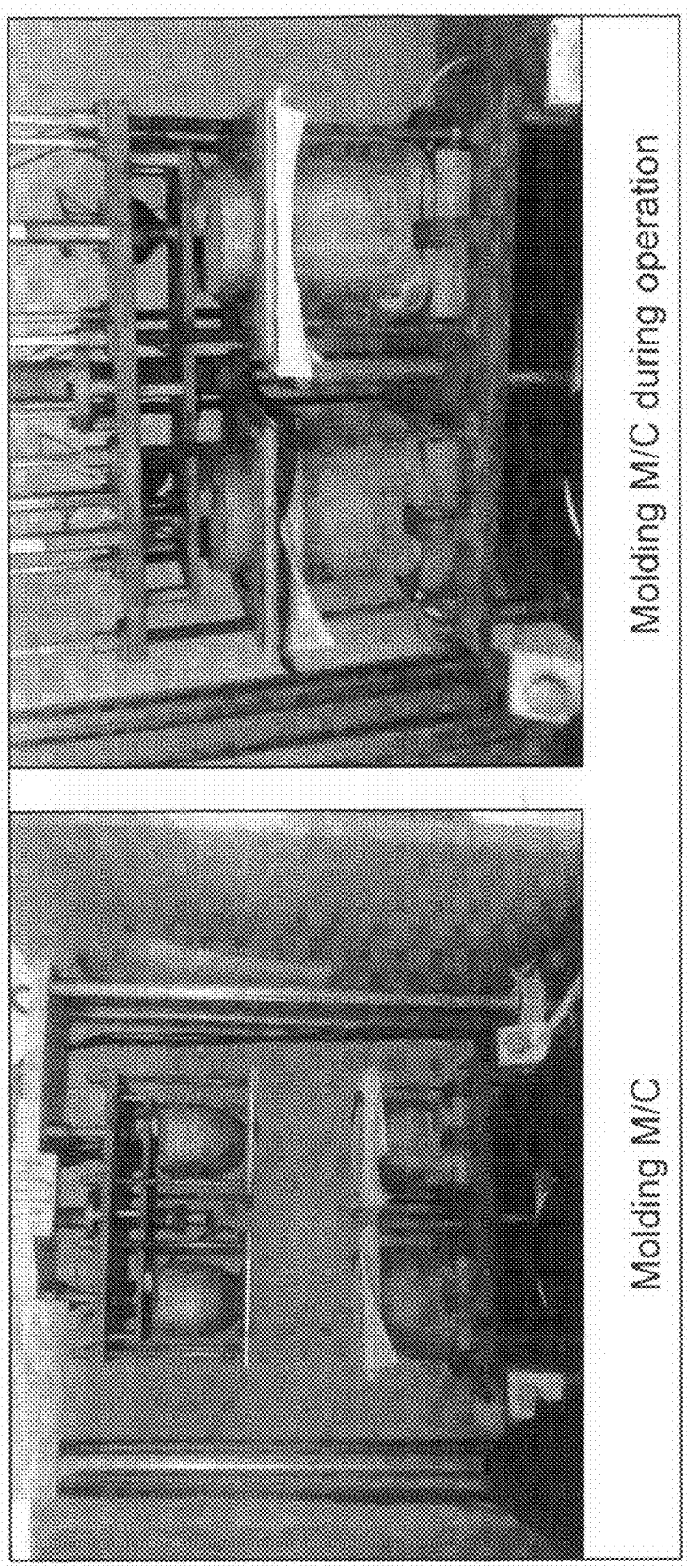
FIG. 8 shows photos of the bra molding machine.
Figure 9:
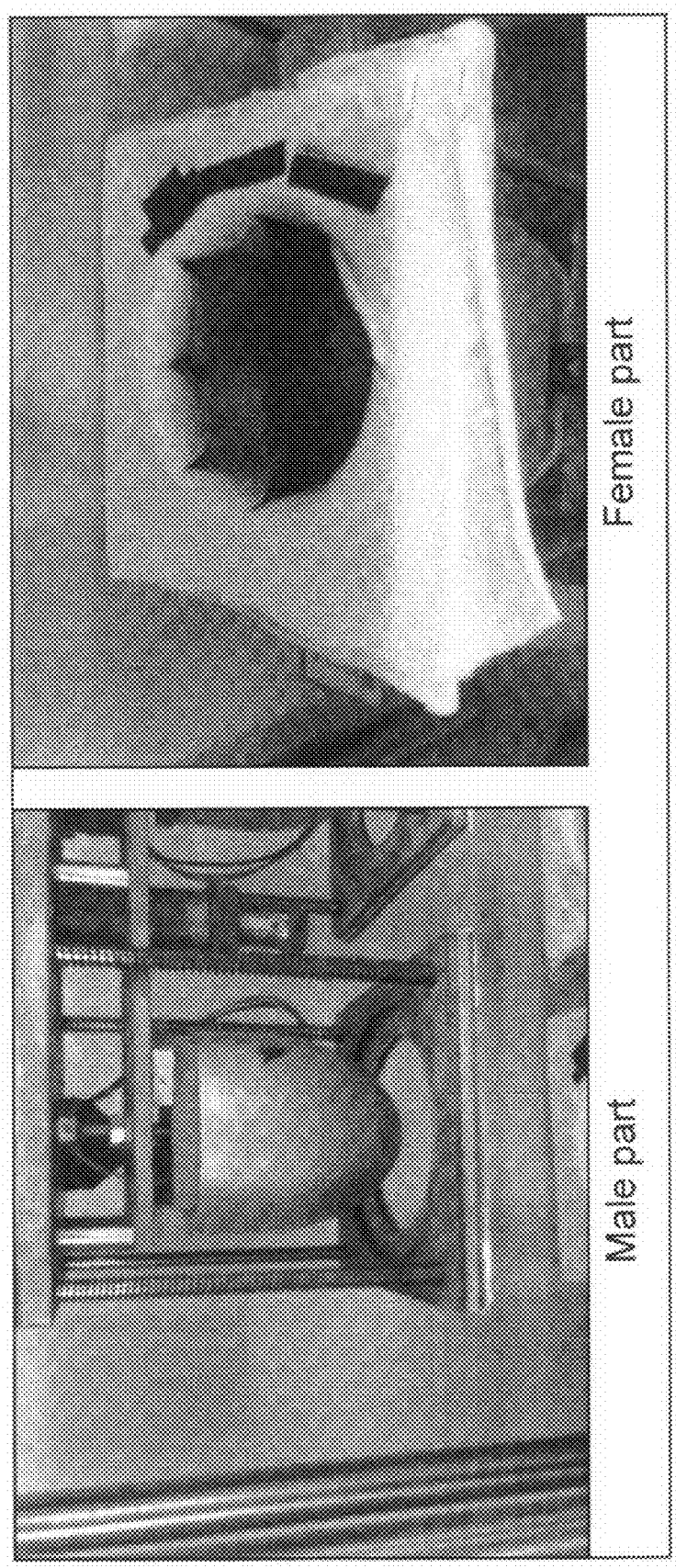
FIG. 9 shows photos of the male and female mold parts.

Molded Bras of Fabrics of Fibers of Elastic Ethylene/α-Olefin Interpolymer and Polyester The four fabrics described in Example 24 were molded to make cups suitable for bras using a New Pad Industry molding machine. FIG. 8 shows the picture of bra molding machine. FIG. 9 shows the mold parts of cup size 36B that male part diameter is 128 mm, female diameter is 129 mm. The table below shows the cup depth after molding on machine, cup depth 20 seconds after releasing from the machine and cup depth after wash and tumble dry. AATCC 135 washing method was applied to this study. The results at molded temperatures of 160° C., 180° C. and 190° C. are close to meet a typical customer's cup depth requirement of 75 mm. While not wishing to be bound to any theory, the 213 g/m² weight fabric used in the molding trial may be too heavy for underwear application as conventional fabrics to mold cups ranges from 130 g/m² to 180 g/m² weight. Thus, a lighter knit fabric may reach 75 mm cup depth.

Cup Depth of Molding, Curing and Wash

| Fabric | Mold temperature (C.) | Molding time (sec) | Cup Depth on Molding Machine (mm) | Cup depth 20 seconds after release (mm) | Cup depth after wash and Tumble dry (mm) |
|---|---|---|---|---|---|
| 22-B | 120 | 40 | 41 | 38 | 28 |
| 22-B | 140 | 40 | 43 | 40 | 30 |
| 22-B | 150 | 40 | 48 | 44 | 32 |
| 22-B | 160 | 40 | 53 | 45 | 42 |
| 22-B | 180 | 40 | 69 | 60 | 51 |
| 22-B | 190 | 40 | 70 | 65 | 53 |
| 23-B | 120 | 40 | 74 | 64 | 49 |
| 23-B | 140 | 40 | 79 | 70 | 60 |
| 23-B | 150 | 20 | 80 | 78 | 56 |
| 23-B | 150 | 40 | 85 | 83 | 60 |
| 23-B | 160 | 40 | 90 | 88 | 69 |

-continued

| Fabric | Mold temperature (C.) | Molding time (sec) | Cup Depth on Molding Machine (mm) | Cup depth 20 seconds after release (mm) | Cup depth after wash and Tumble dry (mm) |
|---|---|---|---|---|---|
| 23-B | 180 | 40 | 92 | 90 | 70 |
| 23-B | 190 | 40 | 93 | 91 | 68 |

Example 26

Fabrics of Fibers of Elastic Ethylene/α-Olefin Interpolymer and Polyamide

A warp knitted fabric (Fabric 22-C) was produced from the fibers of Example 22 and fibers of 40 den/13 fil multifilament polyamide 6.6 supplied by DEFIBER, S.A., Spain. A warp knitted fabric (Fabric 23-C) was produced from the fibers of Example 23 and fibers of 40 den 13 fil multifilament polyamide 6.6 supplied by DEFIBER, S.A., Spain. A warp knitted fabric (Fabric 26) was produced from Affinity™ based 40 denier filament XUS10066.04 (available from The Dow Chemical Company) with 176.4 Kgy crosslinking dose and 40 den/13 fil multifilament: polyamide 6.6 supplied by DEFIBER. S.A., Spain.

The knitting conditions for Fabric 22-C Fabric 27-C and Fabric 26 were as follows, Machine 36G, LIBA Locknit construction Polyamide Stitch Length=1100 mm/rack—a.k.a. feeding rate.

Elastic Stitch Length=54 mm/rack

Run in ratio=1.33

Beam Draft=1.65

Elastic Draft=2.5×; by the following formula: (Beam Draft*mm/rack of PA)/(Run–in*mm/rack of Elastic)

Elastic Content=23.1 by the following formula: ((Elastic Denier*mm rack of Elastic)*100%)/(PA denier*mm/rack of PA*Beam Draft)+(Elastic Denier*mm/rack of Elastic))

The finishing conditions for Fabric 22-C, Fabric 23-C and Fabric 26 were as follows:

Jet Scouring:

Scouring bath at max 70° C.

Duration=40 min

Scouring bath main constituents: Water solution of soap and sodium carbonate (soda Ash)

Pre Heat setting of Polyamide

Stenter frame speed: 16 m/min

Overfeeding: 15%

SetWidth: 155 cm

Max Stenter Frame Set Temperature: max 180° C.

Residence Time Inside Heating Chambers: 60 sec

Beam Dyeing

Process: Disperse Dyeing in beam

Dyeing Cycle: max temperature 105C

Color: Black

Driving

Stenter frame speed: 16 m/min

Overfeeding: 15%

Set Width: 150 cm

Max Stenter Frame Set Temperature: max 160° C.

Residence Time Inside Heating Chambers: 60 sec

The finished fabric properties for Fabric 22-C, Fabric 23-C and Fabric 26 were as follows with the method for specifying elongation: M&S15A (load modified to 36 N instead of 15 N) and the method for specifying dimensional stability ISO05077:1984 (41C wash; 70C 1 h tumble drying).

Fabric 23-C

Width 144 cm

Density 155 μg/m$^2$

Lengthwise Elongation: 106%

Lengthwise Dimensional Stability: −2.7%

Fabric 22-C

Width 143 cm

Density 176 g/m$^2$

Lengthwise Elongation: 107%

Lengthwise Dimensional Stability: −2.1%

Fabric 26

Width 143 cm

Density 155 g/m$^2$

Lengthwise Elongation: 92%

Lengthwise Dimensional Stability: −9.9%

Example 27

Figure 10:
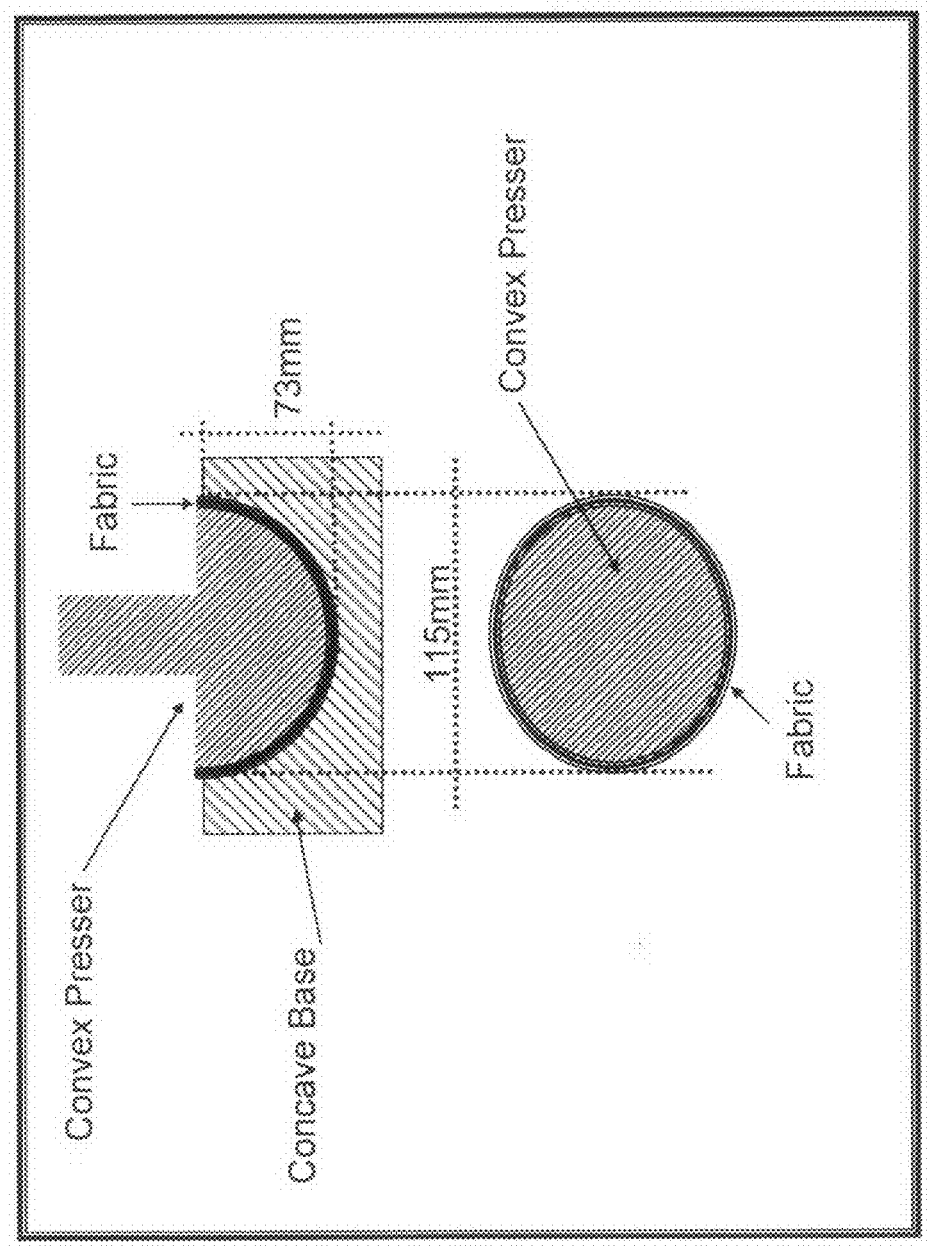
FIG. 10 shows the machine scheme of a molding machine.

Molded Bras of Fabrics of Fibers of Elastic Ethylene/α-Olefin Interpolymer and Polyamide The 3 finished fabrics (Fabric 22-C Fabric 23-C and Fabric 26) were used in a traditional molding machine for the making of cups of bras. The machine scheme is shown in FIG. 10. The molded cup is at least 30 mm.

Both the convex and concave parts of the machine are made of metal and heated. Samples of the 3 finished fabrics specified above where then placed between the parts and pressed at constant temperature 170° C. and varying dwelling time (i.e., time in the mold) inbetween convex/concave parts. Later they were let to cool back to room temperature (~27° C.). After waiting at least 72 hours and before any laundering, the heights of the cups after molding were measured according to each dwelling time (70, 50 & 35 seconds). The results are shown in the table below:

Height Dimensions After Molding (mm)

| Fabric | 70 sec | 50 sec | 35 sec |
|---|---|---|---|
| Fabric 23-C | 34.5 | 32.6 | 30.2 |
| Fabric 22-C | 18.1 | 18.2 | 19.4 |
| Fabric 26 | 22.8 | 20.8 | 20.9 |

This table reveals the difference in height of the cups due to elastic fiber type. Fabric 23-C being made of a fiber of lower crosslinking level can achieve about 50% higher cup heights than those of Fabric 22-C and Fabric 26 made of the other two elastic fibers with higher crosslinking level.

The cups were taken to a dimensional stability test [ISO5077:1984 (41C wash; 70C 1 h tumble drying)] and their heights after the test laundering method were taken as to examine their shape retention. The results are shown in the table below in terms of % change from the original cup height:

Height Shrinkage After Laundering (%)

| Fabric | 70 sec | 50 sec | 35 sec |
|---|---|---|---|
| Fabric 23-C | 18 | 22 | 14 |
| Fabric 22-C | 20 | 31 | 35 |
| Fabric 26 | 34 | 34 | 48 |

Once again, Fabric 23-C outperforms Fabric 22-C and Fabric 26 in the sense that it is about 50% more stable which is likely attributed to its elastic fiber lower crosslinking level.

Example 28

Varying Amounts of Fiber Crosslinking

The elastic ethylene/α-olefin interpolymer of Example 20 was used to make monofilament fibers of 40 denier having an approximately round cross-section. Before the fiber was made the following additives were added to the polymer: 7000 ppm PDMSO (polydimethyl siloxane), 3000 ppm CYANOX 1790 (1,3,5-tris-(4-t-butyl-3-hydroxy-2,6-dimethylbenzyl)-1,3,5-triazine-2,4,6-(1H,3H,5H)-trione, and 3000 ppm CHIMASORB 944 Poly-[[6-(1,1,3,3-tetramethyl butyl)amino]-s-triazine-2,4-diyl][2,2,6,6-tetramethyl-4-piperidyl)imino]hexamethylene[(2,2,6,6-tetramethyl-4-piperidyl)imino]] and 0.5% by weight $TiO_2$. The fibers were produced using a die profile with circular 0.8 mm diameter, a spin temperature of 299° C., a winder speed of 650 m/minute, a spin finish of 2%, a cold draw of 6%, and a spool weight of 150 g. Fibers were then crosslinked using varying amounts of irradiation from an e-beam as the crosslinking agent.

Figure 11:
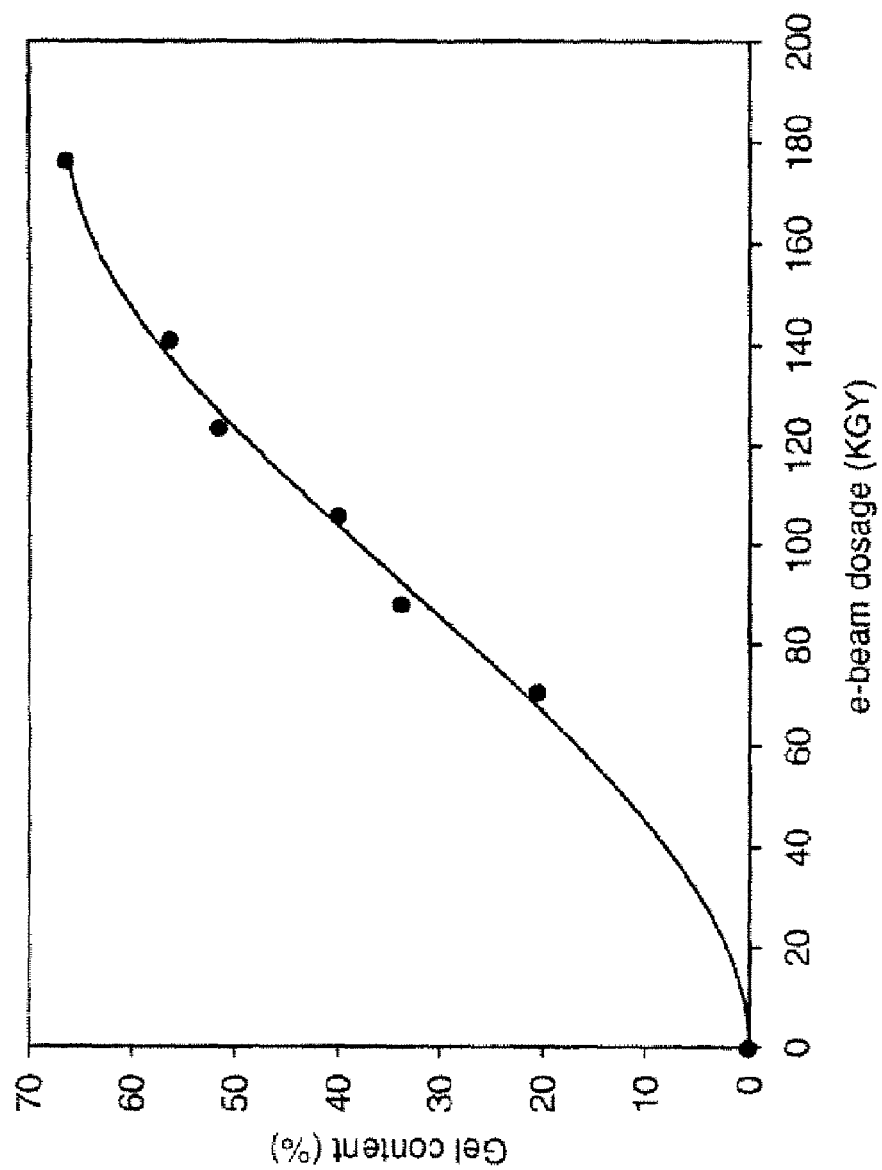
FIG. 11 shows a plot of e-beam radiation versus percent crosslinking for an olefin block copolymer.

The gel content versus the amount of irradiation is shown in FIG. 11. The gel content was determined by weighing out an approximately 25 mg fiber sample to 4 significant figure accuracy. The sample is then combined with 7 ml xylene in a capped 2-dram vial. The vial is heated 90 minutes at 125° C. to 135° C. with inversion mixing (i.e. turning vial upside down) every 15 minutes, to extract essentially all the non-crosslinked polymer. Once the vial has cooled to approximately 25° C., the xylene is decanted from the gel. The gel is rinsed in the vial with a small portion of fresh xylenes. The rinsed gel is transferred to a tared aluminum weighing pan. The tared dish with gel is vacuum dried at 125° C. for 30 minutes to remove the xylene by evaporation. The pan with dried gel is weighed on an analytical balance. The gel content is calculated based on the extracted gel weight and original fiber weight. FIG. 11 shows that as the e-beam dosage increases, the amount of crosslinking (gel content) increases. One skilled in the art will appreciate that the precise relationship between the amount of crosslinking and e-beam dosage may be affected by a given polymer's properties, e.g., molecular weight or melt index.

Example 29

Molding Using Male-Only Molding Machines

Four circular knit finished fabrics (Fabric F1, Fabric F2, Fabric F3 and Fabric F4) were knitted using filament fiber Y1, Y2, Y3, Y4 and Y5 as specified below. Fiber Y5 is present in all fabrics as the hard yarn component, being that Y1, Y2, Y3 and Y4 are the elastic fibers plated with Y5.

The knitting conditions for the above 4 fabrics were as follows:

Fabric F1

Machine 28G, Mayer & Cie Relanit

Plain Single Jersey

Elastic Fiber example Y1

Polyamide Fiber example Y5

Polyamide Feeding=3 mm/needle.

Elastic Feeding Rate=1.1 mm/needle

Elastic Draft=2.7×; by the following formula: (Polyamide Feeding Rate)(Elastic Feeding Rate)

Elastic Content=7.3%; by the following formula: (Elastic Denier/Elastic Draft)/[(Polyamide Draft)+(Elastic Denier/Elastic Draft)]

Fabric F2

Machine 28G, Mayer & Cie Relanit

Plain Single Jersey

Elastic Fiber example Y2

Polyamide=Fiber example Y5

Polyamide Feeding=3 mm/needle.

Elastic Feeding Rate=1.1 mm/needle

Elastic Draft 2.7×; by the following formula: (Polyamide Feeding Rate)/(Elastic Feeding Rate)

Elastic Content=10.0%; by the following formula: (Elastic Denier/Elastic Draft)/[(Polyamide Draft)+(Elastic Denier/Elastic Draft)]

Fabric F3

Machine 28G, Mayer & Cie Relanit

Plain Single Jersey

Elastic Fiber example Y3

Polyamide Fiber example Y5

Polyamide Feeding=3 mm/needle.

Elastic Feeding Rate=1.1 mm/needle

Elastic Draft 2.7×; by the following formula; (Polyamide Feeding Rate)/(Elastic Feeding Rate)

Elastic Content=10.0%; by the following formula: (Elastic Denier/Elastic Draft)/[(Polyamide Draft)+(Elastic Denier/Elastic Draft)]

Fabric F4

Machine 28G Mayer & Cie Relanit

Plain Single Jersey

Elastic Fiber example Y4

Polyamide=Fiber example Y5

Polyamide Feeding=3 mm/needle.

Elastic Feeding Rate=1.1 mm/needle

Elastic Draft 2.7×; by the following formula: (Polyamide Feeding Rate)/(Elastic Feeding Rate)

Elastic Content 9.5%; by the following formula: (Elastic Denier/Elastic Draft)/[(Polyamide Draft)+(Elastic Denier/Elastic Draft)]

The finishing conditions for the above 4 fabrics were the same and were as follows:

Continuous Scouring:

Scouring bath at max 80° C.

Duration=1 min

Scouring bath main constituents: Water solution of soap and sodium carbonate (soda Ash)

Pre Heat setting of Polyamide

Stenter frame speed: 16 m/min

Overfeeding: 30%

Set Width: 170, 170, 160, 160 cm

Max Stenter Frame Set Temperature: max 180° C.

Residence Time Inside Heating Chambers: 60 sec

Process: Jet Dyeing in rope

Dyeing Cycle: max temperature 105C

Color: Black, Acid Dye Stuff

Drying

Stenter frame speed: 16 m/min

Overfeeding: 15%

Set Width: 170, 170, 160, 160 cm

Max Stenter Frame Set Temperature: max 160° C.

Residence Time inside Heating Chambers: 60 sec

Fibers Y1, Y2 and Y3: An elastic ethylene/α-olefin interpolymer similar to that of Example 20 was used to make monofilament fibers of approximately round cross-section. Before the above fibers were made the following additives were added to the polymer: 7000 ppm PDMSO (polydimethyl siloxane), 3000 ppm CYANOX 1790 (1,3,5-tris-(4-t-butyl-3-hydroxy-2,6-dimethylbenzyl)-1,3,5-triazine-2,4,6-(1H,3H,5H)-trione, and 3000 ppm CHIMASORB 944 Poly-[[6-(1,1,3,3-tetramethylbutyl)amino]-s-triazine-2,4-diyl][2,2,6,6-tetramethyl-4-piperidyl)imino]hexamethylene[(2,2,6,6-tetramethyl-4-piperidyl)imino]] and 5000 ppm of Crodamide EBO. The fibers were produced using a die profile with circular 0.8 mm diameter, spin finish content of 2%, cold draw of 0%, and a spool weight of 300 g. Other details of spinning with respect to Y1, Y2 and Y3 are as follows:

| Fiber | Denier | Spin Temperature, ° C. | Spin Speed, m/min | Irradiation, KGy |
|---|---|---|---|---|
| Y1 | 30 | 295 | 675 | 117.6 total |
| Y2 | 42 | 295 | 675 | 117.6 total |
| Y3 | 42 | 295 | 675 | 176.4 total |

Fiber Y4

Type: Creora H250 (Spandex)

Linear Density: 40 den

Source: Hyosung, Korea

Fiber Y5

Type: Polyamide 66

Linear Density: 140 den (70 den/68 filaments/2 ply) textured

Source: Defiber S.A., Spain

Fabrics F1, F2, F3 and F4 presented the following properties in finished form:

| | Density, g/m$^2$ | Dimensional Stability*, % | Widthwise Elongation**, % | Width, cm |
|---|---|---|---|---|
| F1 | 180 | −0.5 | 145 | 160 |
| F2 | 210 | −0.5 | 150 | 158 |
| F3 | 240 | −0.5 | 156 | 155 |
| F4 | 270 | −0.5 | 180 | 150 |

*length and widthwise AATCC135 IVAi
**M&SP15A: load modified to 36N

The 4 fabrics (F1-F4) were taken to a molding machine where only a male mold was present (convex mold part only). Considering the fabric as a plane, once the mold is fully inserted into the fabric bottom-up, it made a circumference of 100 mm diameter and the distance of the fabric plane to the top of the male mold (its depth at use) is 70 mm. The table below documents the tests conducted and results that were observed. The aforementioned data suggests that less crosslinking may result in a better cup depth upon molding.

| Test # | Replication | FABRIC | Temperature of Mold, ° C. | Molding time, sec | Cup Height after molding, mm | Cup Height after AATCC 135IVAI, mm | Cup Depth Shrinkage, % |
|---|---|---|---|---|---|---|---|
| 1 | 1 | F1 | 194 | 30 | 51 | 27 | 46% |
| 1 | 2 | F1 | 194 | 30 | 48 | 28 | 41% |
| 2 | 1 | F1 | 184 | 30 | 44 | 23 | 48% |
| 2 | 2 | F1 | 184 | 30 | 37 | 22 | 40% |
| 3 | 1 | F1 | 165 | 30 | 34 | 19 | 44% |

| Test # | Replication | FABRIC | Temperature of Mold, ° C. | Molding time, sec | Cup Height after molding, mm | Cup Height after AATCC 135IVAI, mm | Cup Depth Shrinkage, % |
|---|---|---|---|---|---|---|---|
| 3 | 2 | F1 | 165 | 30 | 30 | 23 | 23% |
| 4 | 1 | F2 | 194 | 30 | 46 | 29 | 37% |
| 4 | 2 | F2 | 194 | 30 | 52 | 34 | 36% |
| 5 | 1 | F2 | 184 | 30 | 44 | 29 | 34% |
| 5 | 2 | F2 | 184 | 30 | 47 | 33 | 29% |
| 6 | 1 | F2 | 165 | 30 | 26 | 23 | 12% |
| 6 | 2 | F2 | 165 | 30 | 36 | 26 | 32% |
| 7 | 1 | F3 | 194 | 30 | 34 | 27 | 19% |
| 7 | 2 | F3 | 194 | 30 | 30 | 23 | 22% |
| 8 | 1 | F3 | 184 | 30 | 25 | 22 | 12% |
| 8 | 2 | F3 | 184 | 30 | 26 | 19 | 28% |
| 9 | 1 | F3 | 165 | 30 | 19 | 17 | 9% |
| 9 | 2 | F3 | 165 | 30 | 19 | 12 | 36% |
| 10 | 1 | F4 | 194 | 30 | 58 | 50 | 14% |
| 10 | 2 | F4 | 194 | 30 | 52 | 41 | 21% |
| 11 | 1 | F4 | 184 | 30 | 49 | 39 | 20% |
| 11 | 2 | F4 | 184 | 30 | 45 | 38 | 15% |
| 12 | 1 | F4 | 165 | 30 | 30 | 22 | 26% |
| 12 | 2 | F4 | 165 | 30 | 32 | 27 | 14% |

Example 30

Molded Warp Knit Fabrics

Three warp knit fabrics (Warp Knit Fabrics 1, 2 and 3) were produced from three different elastic fibers and 40D textured nylon using a warp knit machine and the following parameters: structure: tricot lockknit, needle gauge 36 G, stitch length 1200, and draft 3.0. Warp knit fabric 1 comprised 68 denier elastic ethylene/α-olefin interpolymer fibers made in a manner similar to fibers Y2 of Example 29 except that the fibers were 68 denier. Warp knit fabric 2 comprised 40 denier elastic polymer fibers made in a manner similar to Example 21 except that a random copolymer having the generic name AFFINITY™ KC8852G (available from The Dow Chemical Company) was employed. AFFINITY™ KC8852G is characterized by having a melt index of 3 g/10 min. and a density of 0.875 g/cm³. Warp knit fabric 3 comprised 55 denier elastic ethylene/α-olefin interpolymer fibers made in a manner similar to fibers Y3 of Example 29.

The three fabrics were analyzed by ASTM D 3776-96 to determine fabric weight. Stretch analyses were performed using a modified Marks and Spencer P15A test method where the fabric was subjected to two consecutive load cycles until 36N' was reached, and unloading at constant speed in the equipment "Universal tester INSTRON 5564. The warp knit fabrics exhibited the following properties:

|  | Warp knit fabric 1 | Warp knit fabric 2 | Warp knit fabric 3 |
|---|---|---|---|
| Weight (g/m²) | 215 | 170 | 214 |
| Cross Direction Maximum Deformation 2nd Cycle (%) | 86.9 | 120.4 | 86.6 |
| Cross Direction Load at 40% 2nd Cycle (cN) | 586.4 | 171.8 | 606.2 |
| Cross Direction Residual Elongation (%) | 9.1 | 19.1 | 9.0 |
| Machine Direction Maximum Deformation 2nd Cycle (%) | 180.7 | 147.3 | 192.8 |
| Machine Direction Load at 40% 2nd Cycle (cN) | 156.7 | 138.7 | 142.4 |
| Machine Direction Residual Elongation (%) | 24.8 | 22.3 | 24.5 |

Samples of the three warp knit fabrics of this example were molded at 160° C. and 205° C. for 60 and 120 seconds using a bullet mold (male only), a Crouzet time set gauge and a Honeywell heat set gauge. Considering the fabric as a plane, once the mold is fully inserted into the fabric bottom-up, it made a circumference of 100 mm diameter and the distance of the fabric plane to the top of the male mold (its depth at use) is 70 mm. The fabric temperature during molding was measured using an IR Minithermometer "Fluke 62" with a temperature range −30° C. to 500° C. and a precision+1.5% available from Fluke Corporation. The temperature measurement ranges are reported.

Various properties of the fabric samples were measured including cup height (before and after washing) and fabric discoloration (before washing). A caliper A-23 Pie de rey PREISSER (uncertainty +/−0.01 mm with a confidence interval of >95%) was used to determine the cup height. The fabric was placed on a flat surface with the molded cup area as uniformly shaped as possible, and the difference between the tip of the molded fabric and the flat surface was determined. The molded fabrics were washed in a Siemens IQ 1433 washing machine once at 60C+/−4C for 90 minutes with a 6 kg load and dried flat at room temperature. The color of the as produced and molded fabric was measured using a KONICA MINOLTA SPECTROPHOTOMETER 2600d with illuminant/observer D65/10 deg. The "L", "a", "b" results are reported as the average of 3 measurements. The fabric discoloration was determined by the change in "b" values, as reported in CIELAB units. A less negative b value is a result which correlates to more yellowing of the article. The results are described below.

| Warp Knit Fabrics | Molding Temperature (° C.) | Tmin (° C.) | Tmax (° C.) | Molding Time (sec) | Cup Height After Molding (mm) | Cup Height After 60 C Laundry Wash and Flat Dry (mm) | Initial Fabric L Value | Initial Fabric a Value | Initial Fabric b Value | Molded Fabric L Value | Molded Fabric a Value | Molded Fabric b Value |
|---|---|---|---|---|---|---|---|---|---|---|---|---|
| Fabric 1 | 160 | 162 | 165 | 60 | 24.50 | 21.61 | 94.71 | 3.79 | −18.59 | 92.02 | 4.05 | −17.82 |
|  | 160 | 161 | 163 | 60 | 21.90 | 21.25 | 94.71 | 3.79 | −18.59 | 94.12 | 3.81 | −18.09 |
|  | 160 | 156 | 161 | 120 | 23.58 | 25.76 | 94.71 | 3.79 | −18.59 | 93.59 | 3.65 | −17.20 |
|  | 160 | 157 | 160 | 120 | 25.88 | 25.95 | 94.71 | 3.79 | −18.59 | 94.35 | 3.67 | −17.44 |
|  | 205 | 206 | 211 | 60 | 29.16 | 32.23 | 94.71 | 3.79 | −18.59 | 93.19 | 1.91 | −8.90 |
|  | 205 | 205 | 207 | 60 | 33.09 | 33.33 | 94.71 | 3.79 | −18.59 | 92.95 | 1.82 | −8.44 |
|  | 205 | 203 | 205 | 120 | 34.40 | 33.85 | 94.71 | 3.79 | −18.59 | 91.67 | 1.10 | −3.68 |
|  | 205 | 202 | 207 | 120 | 35.38 | 31.72 | 94.71 | 3.79 | −18.59 | 91.77 | 1.24 | −4.21 |
| Fabric 2 | 160 | 159 | 163 | 60 | 18.49 | 16.74 | 95.39 | 4.12 | −19.31 | 94.93 | 3.92 | −18.68 |
|  | 160 | 160 | 163 | 60 | 20.54 | 15.89 | 95.39 | 4.12 | −19.31 | 94.19 | 3.85 | −18.56 |
|  | 160 | 155 | 158 | 120 | 18.55 | 17.78 | 95.39 | 4.12 | −19.31 | 93.56 | 3.70 | −17.68 |
|  | 160 | 159 | 161 | 120 | 26.82 | 19.06 | 95.39 | 4.12 | −19.31 | 94.37 | 3.71 | −18.02 |
|  | 205 | 209 | 211 | 60 | 29.51 | 33.91 | 95.39 | 4.12 | −19.31 | 93.58 | 2.34 | −11.47 |
|  | 205 | 203 | 205 | 60 | 28.55 | 32.25 | 95.39 | 4.12 | −19.31 | 93.11 | 1.92 | −8.67 |
|  | 205 | 203 | 207 | 120 | 34.70 | 34.13 | 95.39 | 4.12 | −19.31 | 91.72 | 0.94 | −2.51 |
|  | 205 | 200 | 205 | 120 | 34.38 | 36.43 | 95.39 | 4.12 | −19.31 | 92.65 | 1.03 | −3.24 |
| Fabric 3 | 160 | 162 | 163 | 60 | 23.70 | 16.11 | 94.79 | 3.71 | −18.23 | 94.76 | 3.63 | −17.55 |
|  | 160 | 160 | 163 | 60 | 21.64 | 17.83 | 94.79 | 3.71 | −18.23 | 94.78 | 3.65 | −17.78 |
|  | 160 | 158 | 161 | 120 | 22.55 | 19.69 | 94.79 | 3.71 | −18.23 | 94.18 | 3.56 | −17.47 |
|  | 160 | 159 | 162 | 120 | 20.89 | 18.77 | 94.79 | 3.71 | −18.23 | 94.68 | 3.54 | −17.23 |
|  | 205 | 209 | 211 | 60 | 24.44 | 27.21 | 94.79 | 3.71 | −18.23 | 93.05 | 2.23 | −10.10 |
|  | 205 | 207 | 209 | 60 | 24.52 | 27.16 | 94.79 | 3.71 | −18.23 | 91.77 | 2.68 | −10.85 |
|  | 205 | 207 | 213 | 120 | 28.27 | 29.30 | 94.79 | 3.71 | −18.23 | 90.80 | 0.82 | −0.65 |
|  | 205 | 204 | 211 | 120 | 27.95 | 29.66 | 94.79 | 3.71 | −18.23 | 90.70 | 0.86 | −0.01 |

Example 31

Molded Circular Knit Fabrics

Three circular knit fabrics (circular knit fabrics 1, 2 and 3) were produced from three different elastic fibers and 36 cell cotton for circular knit fabrics 1 and 2 and 40 cc/1 cotton for Circular Knit Fabric 3. A Fukuhura open width machine was employed with the following parameters: structure: single jersey plated, needle gauge 24 G, cylinder 34 inches, and 90 feeders. Circular knit fabrics 1 and 2 comprised 42 denier elastic ethylene/α-olefin interpolymer fibers. Circular knit fabric 1 comprised fibers made in a manner similar to fibers Y3 of Example 29 while circular knit fabric 2 comprised fibers made in a manner similar to fibers Y2 of Example 29. Circular knit fabric 3 comprised 30 denier spandex fibers.

The three fabrics were analyzed by ASTM D 3776-96 to determine fabric weight. Stretch analyses were performed using a modified Marks and Spencer P15A test method where the fabric was subjected to two consecutive load cycles until 36N was reached, and unloading at constant speed in the equipment "Universal tester INSTRON 5564. The three fabrics were analyzed by AATCC 20A-2005 based on moisture regain weight to determine the fiber composition of fabric. The moisture regain of cotton is 8.0% and of ethylene/α-olefin interpolymer is 0% (based on ASTM D1909-1996 (2001)). The results are described below.

|  | Circular knit fabric 1 | Circular knit fabric 2 | Circular knit fabric 3 |
|---|---|---|---|
| Weight (g/m²) | 180 | 160 | 170 |
| Cross Direction Maximum Deformation 2nd Cycle (%) | 251.1 | 184.4 | 256.1 |
| Cross Direction Load at 40% 2nd Cycle (cN) | 27.4 | 25.0 | 18.8 |
| Cross Direction Residual Elongation (%) | 80.7 | 35.7 | 76.7 |
| Machine Direction Maximum Deformation 2nd Cycle (%) | 122.8 | 186.8 | 113.0 |
| Machine Direction Load at 40% 2nd Cycle (cN) | 87.0 | 33.7 | 91.8 |
| Machine Direction Residual Elongation (%) | 21.6 | 31.3 | 20.8 |
| Cotton (%) | 90.4 | 92.1 |  |
| Elastic Fiber (%) | 9.6 | 7.9 |  |

Samples of the three circular knit fabrics of this example were molded at 140, 160, 195, and 205° C. for 30, 60, and 120 seconds using a bullet mold (male only), a Crouzet time set gauge and a Honeywell heat set gauge. Considering the fabric as a plane, once the mold is fully inserted into the fabric bottom-up, it made a circumference of 100 mm diameter and the distance of the fabric plane to the top of the male mold (its depth at use) is 70 mm. The fabric temperature during molding was measured using an IR Minithermometer "Fluke 62" with a temperature range −30° C. to 500° C. and a precision+ 1.5% available from Fluke Corporation. The temperature measurement ranges are reported.

Various properties of the fabric samples were measured including cup height (before and after washing) and fabric discoloration (before washing). A caliper A-23 Pie de rey PREISSER (uncertainty +/−0.01 mm with a confidence interval of >95%) was used to determine the cup height. The fabric was placed on a flat surface with the molded cup area as uniformly shaped as possible, and the difference between the tip of the molded fabric and the flat surface was determined. The molded fabrics were washed in a Siemens IQ 1433 washing machine once at 60C+/−4C for 90 minutes with a 6 kg load and dried flat at room temperature. The color of the as produced and molded fabric was measured using a KONICA MINOLTA SPECTROPHOTOMETER 2600d with illuminant/observer D65/10 deg. The "L", "a", "b" results are reported as the average of 3 measurements. The fabric discoloration was determined by the change in "b" values, as reported in CIELAB units. A less negative b value is a result which correlates to more yellowing of the article. The results are described below.

| Circular Knit Fabrics | Molding Temperature (°C.) | Tmin (°C.) | Tmax (°C.) | Molding Time (sec) | Cup Height after Molding (mm) | Cup Height After 60 C Laundry Wash and Air Dry Flat (mm) | Initial Fabric L Value (ave) | Initial Fabric a Value (ave) | Initial Fabric b Value (ave) | Molded Fabric L Value | Molded Fabric a Value | Molded Fabric b Value | ΔL | Δa | Δb |
|---|---|---|---|---|---|---|---|---|---|---|---|---|---|---|---|
| Circular knit fabric 1 | 140 | 138 | 141 | 30 | 26.26 | 33.55 | 97.27 | 3.42 | −14.62 | 94.98 | 3.32 | −14.52 | −2.29 | −0.10 | 0.10 |
| | 140 | 137 | 140 | 30 | 24.93 | 24.30 | 97.27 | 3.42 | −14.62 | 96.43 | 3.18 | −14.32 | −0.84 | −0.24 | 0.30 |
| | 140 | 136 | 139 | 60 | 27.96 | 32.12 | 97.27 | 3.42 | −14.62 | 95.48 | 3.33 | −14.24 | −1.79 | −0.09 | 0.38 |
| | 140 | 138 | 142 | 60 | 27.12 | 32.73 | 97.27 | 3.42 | −14.62 | 94.65 | 3.37 | −14.43 | −2.62 | −0.05 | 0.19 |
| | 140 | 136 | 141 | 120 | 27.13 | 30.72 | 97.27 | 3.42 | −14.62 | 96.60 | 3.28 | −14.27 | −0.67 | −0.14 | 0.35 |
| | 140 | 137 | 141 | 120 | 31.55 | 29.55 | 97.27 | 3.42 | −14.62 | 94.04 | 3.47 | −14.18 | −3.23 | 0.05 | 0.44 |
| | 160 | 156 | 160 | 30 | 23.91 | 25.49 | 97.27 | 3.42 | −14.62 | 96.75 | 3.38 | −14.05 | −0.52 | −0.04 | 0.57 |
| | 160 | 156 | 160 | 30 | 24.95 | 30.49 | 97.27 | 3.42 | −14.62 | 95.90 | 3.38 | −13.87 | −1.37 | −0.04 | 0.75 |
| | 160 | 157 | 160 | 30 | 24.63 | 27.36 | 97.27 | 3.42 | −14.62 | 97.30 | 3.03 | −13.60 | 0.03 | −0.39 | 1.02 |
| | 160 | 157 | 160 | 30 | 28.16 | 30.56 | 97.27 | 3.42 | −14.62 | 96.13 | 3.36 | −13.86 | −1.14 | −0.06 | 0.76 |
| | 160 | 155 | 158 | 60 | 26.70 | 24.75 | 97.27 | 3.42 | −14.62 | 95.22 | 3.23 | −13.46 | −2.05 | −0.19 | 1.16 |
| | 160 | 152 | 157 | 60 | 27.57 | 23.72 | 97.27 | 3.42 | −14.62 | 95.55 | 3.29 | −13.40 | −1.72 | −0.13 | 1.22 |
| | 160 | — | — | 120 | 29.66 | — | 97.27 | 3.42 | −14.62 | — | — | — | — | — | — |
| | 160 | 151 | 154 | 120 | 30.54 | 27.85 | 97.27 | 3.42 | −14.62 | 95.37 | 3.20 | −12.81 | −1.90 | −0.22 | 1.81 |
| | 190 | 182 | 186 | 30 | 31.95 | 33.58 | 97.27 | 3.42 | −14.62 | 95.97 | 3.10 | −12.44 | −1.30 | −0.32 | 2.18 |
| | 190 | 181 | 183 | 30 | 31.14 | 26.09 | 97.27 | 3.42 | −14.62 | 95.46 | 3.22 | −12.32 | −1.81 | −0.20 | 2.30 |
| | 190 | 186 | 188 | 60 | 31.21 | 30.18 | 97.27 | 3.42 | −14.62 | 89.77 | 3.36 | −11.71 | −7.50 | −0.06 | 2.91 |
| | 190 | 187 | 193 | 60 | 30.86 | 25.96 | 97.27 | 3.42 | −14.62 | 92.17 | 3.27 | −12.20 | −5.10 | −0.15 | 2.42 |
| | 190 | 186 | 189 | 120 | 34.40 | — | 97.27 | 3.42 | −14.62 | 96.13 | 2.81 | −9.40 | −1.14 | −0.61 | 5.22 |
| | 190 | 184 | 187 | 120 | 35.38 | 28.96 | 97.27 | 3.42 | −14.62 | 91.24 | 3.09 | −9.82 | −6.03 | −0.33 | 4.80 |
| | 205 | 197 | 203 | 30 | 27.07 | 24.33 | 97.27 | 3.42 | −14.62 | 96.72 | 2.95 | −11.33 | −0.55 | −0.47 | 3.29 |
| | 205 | 202 | 206 | 30 | 27.32 | 26.33 | 97.27 | 3.42 | −14.62 | 95.73 | 3.08 | −11.77 | −1.54 | −0.34 | 2.85 |
| | 205 | 203 | 206 | 60 | 26.75 | 30.09 | 97.27 | 3.42 | −14.62 | 96.07 | 2.85 | −10.20 | −1.20 | −0.57 | 4.42 |
| | 205 | 200 | 202 | 60 | 28.60 | 26.30 | 97.27 | 3.42 | −14.62 | 95.10 | 2.90 | −9.33 | −2.17 | −0.52 | 5.29 |
| | 205 | 202 | 203 | 120 | 29.58 | 36.31 | 97.27 | 3.42 | −14.62 | 95.18 | 2.83 | −8.59 | −2.09 | −0.59 | 6.03 |
| | 205 | 196 | 202 | 120 | 28.82 | 26.73 | 97.27 | 3.42 | −14.62 | 91.70 | 2.92 | −8.60 | −5.57 | −0.50 | 6.02 |
| Circular knit fabric 2 | 140 | 137 | 141 | 60 | 33.48 | 33.59 | 97.49 | 3.46 | −14.88 | 96.89 | 3.19 | −14.57 | −0.60 | −0.27 | 0.31 |
| | 140 | 136 | 140 | 60 | 31.93 | 29.76 | 97.49 | 3.46 | −14.88 | 95.55 | 3.35 | −14.57 | −1.94 | −0.11 | 0.31 |
| | 140 | 135 | 139 | 120 | 34.27 | 34.27 | 97.49 | 3.46 | −14.88 | 96.20 | 3.10 | −14.17 | −1.29 | −0.36 | 0.71 |
| | 140 | 137 | 140 | 120 | 41.41 | 31.92 | 97.49 | 3.46 | −14.88 | 96.28 | 3.09 | −14.34 | −1.21 | −0.37 | 0.54 |
| | 160 | 154 | 158 | 30 | 30.45 | 26.65 | 97.49 | 3.46 | −14.88 | 96.67 | 2.99 | −13.77 | −0.82 | −0.47 | 1.11 |
| | 160 | 154 | 159 | 30 | 32.09 | 30.28 | 97.49 | 3.46 | −14.88 | 96.51 | 3.05 | −13.97 | −0.98 | −0.41 | 0.91 |
| | 160 | 151 | 153 | 60 | 31.52 | — | 97.49 | 3.46 | −14.88 | 94.10 | 3.22 | −14.08 | −3.39 | −0.24 | 0.80 |
| | 160 | 152 | 157 | 60 | 34.76 | 32.48 | 97.49 | 3.46 | −14.88 | 96.38 | 3.10 | −13.99 | −1.11 | −0.36 | 0.89 |
| | 160 | 152 | 157 | 120 | 35.81 | 33.43 | 97.49 | 3.46 | −14.88 | 96.17 | 2.97 | −13.32 | −1.32 | −0.49 | 1.56 |
| | 160 | 155 | 158 | 120 | 35.95 | 30.44 | 97.49 | 3.46 | −14.88 | 96.21 | 3.06 | −13.50 | −1.28 | −0.40 | 1.38 |
| | 190 | 182 | 186 | 30 | 37.94 | 34.24 | 97.49 | 3.46 | −14.88 | 93.39 | 3.39 | −12.81 | −4.10 | −0.07 | 2.07 |
| | 190 | 182 | 187 | 30 | 38.19 | 33.16 | 97.49 | 3.46 | −14.88 | 96.16 | 3.01 | −12.91 | −1.33 | −0.45 | 1.97 |
| | 190 | 180 | 187 | 60 | 33.66 | 29.07 | 97.49 | 3.46 | −14.88 | 96.11 | 3.02 | −12.09 | −1.38 | −0.44 | 2.79 |
| | 190 | 182 | 190 | 60 | 36.54 | 27.89 | 97.49 | 3.46 | −14.88 | 95.98 | 2.89 | −11.62 | −1.51 | −0.57 | 3.26 |
| | 190 | 178 | 184 | 120 | 47.17 | 29.32 | 97.49 | 3.46 | −14.88 | 94.77 | 2.86 | −10.50 | −2.72 | −0.60 | 4.38 |
| | 190 | 183 | 186 | 120 | 45.31 | 34.15 | 97.49 | 3.46 | −14.88 | 93.98 | 2.71 | −9.55 | −3.51 | −0.75 | 5.33 |
| | 205 | 198 | 199 | 30 | 39.36 | 30.78 | 97.49 | 3.46 | −14.88 | 96.10 | 3.04 | −11.69 | −1.39 | −0.42 | 3.19 |
| | 205 | 198 | 200 | 30 | 38.92 | 29.02 | 97.49 | 3.46 | −14.88 | 95.66 | 3.07 | −11.70 | −1.83 | −0.39 | 3.18 |
| | 205 | 198 | 202 | 60 | 42.93 | 33.69 | 97.49 | 3.46 | −14.88 | 94.62 | 2.72 | −9.70 | −2.87 | −0.74 | 5.18 |
| Circular knit fabric 3 | 140 | 140 | 145 | 30 | 19.23 | FLAT | 97.42 | 3.62 | −14.69 | 97.41 | 3.50 | −14.38 | −0.01 | −0.12 | 0.31 |
| | 140 | 140 | 143 | 30 | 23.65 | FLAT | 97.42 | 3.62 | −14.69 | 97.16 | 3.48 | −14.26 | −0.26 | −0.14 | 0.43 |
| | 140 | 142 | 144 | 60 | 22.35 | FLAT | 97.42 | 3.62 | −14.69 | 97.18 | 3.46 | −14.21 | −0.24 | −0.16 | 0.48 |
| | 140 | 138 | 143 | 60 | 23.61 | FLAT | 97.42 | 3.62 | −14.69 | 96.87 | 3.49 | −14.31 | −0.55 | −0.13 | 0.38 |
| | 140 | 139 | 141 | 120 | 25.09 | FLAT | 97.42 | 3.62 | −14.69 | 96.67 | 3.49 | −14.02 | −0.75 | −0.13 | 0.67 |
| | 140 | 137 | 141 | 120 | 26.87 | FLAT | 97.42 | 3.62 | −14.69 | 94.91 | 3.58 | −13.82 | −2.51 | −0.04 | 0.87 |
| | 160 | 157 | 161 | 30 | 20.70 | FLAT | 97.42 | 3.62 | −14.69 | 95.89 | 3.49 | −14.01 | −1.53 | −0.13 | 0.68 |
| | 160 | 155 | 159 | 30 | 20.03 | FLAT | 97.42 | 3.62 | −14.69 | 97.25 | 3.47 | −14.06 | −0.17 | −0.15 | 0.63 |
| | 160 | 155 | 159 | 60 | 25.72 | 19.52 | 97.42 | 3.62 | −14.69 | 96.09 | 3.51 | −13.59 | −1.33 | −0.11 | 1.10 |
| | 160 | 158 | 161 | 60 | 26.10 | 24.59 | 97.42 | 3.62 | −14.69 | 96.94 | 3.45 | −13.84 | −0.48 | −0.17 | 0.85 |
| | 160 | 155 | 157 | 120 | 27.46 | 33.06 | 97.42 | 3.62 | −14.69 | 95.20 | 3.46 | −13.21 | −2.22 | −0.16 | 1.48 |
| | 160 | 155 | 157 | 120 | — | — | 97.42 | 3.62 | −14.69 | 96.85 | 3.07 | −12.99 | −0.57 | −0.55 | 1.70 |
| | 160 | 159 | 161 | 120 | 27.69 | 28.48 | 97.42 | 3.62 | −14.69 | 96.99 | 3.35 | −13.40 | −0.43 | −0.27 | 1.29 |
| | 195 | 187 | 191 | 30 | 39.72 | 35.52 | 97.42 | 3.62 | −14.69 | 95.19 | 3.30 | −12.81 | −2.23 | −0.32 | 1.88 |
| | 195 | 187 | 192 | 30 | 39.38 | 34.31 | 97.42 | 3.62 | −14.69 | 96.31 | 3.36 | −13.35 | −1.11 | −0.26 | 1.34 |
| | 195 | 184 | 188 | 60 | 55.46 | 39.96 | 97.42 | 3.62 | −14.69 | 94.40 | 3.17 | −12.32 | −3.02 | −0.45 | 2.37 |

-continued

| Circular Knit Fabrics | Molding Temperature (° C.) | Tmin (° C.) | Tmax (° C.) | Molding Time (sec) | Cup Height after Molding (mm) | Cup Height After 60 C Laundry Wash and Air Dry Flat (mm) | Initial Fabric L Value (ave) | Initial Fabric a Value (ave) | Initial Fabric b Value (ave) | Molded Fabric L Value | Molded Fabric a Value | Molded Fabric b Value | ΔL | Δa | Δb |
|---|---|---|---|---|---|---|---|---|---|---|---|---|---|---|---|
| | 195 | 187 | 190 | 60 | 54.43 | 37.24 | 97.42 | 3.62 | −14.69 | 94.34 | 2.98 | −11.13 | −3.08 | −0.64 | 3.56 |
| | 195 | 191 | 194 | 120 | 57.74 | 32.56 | 97.42 | 3.62 | −14.69 | 94.48 | 2.96 | −11.13 | −2.94 | −0.66 | 3.56 |
| | 195 | 184 | 192 | 120 | 55.96 | 36.07 | 97.42 | 3.62 | −14.69 | 94.88 | 2.97 | −10.96 | −2.54 | −0.65 | 3.73 |
| | 205 | 199 | 200 | 30 | 49.29 | 38.87 | 97.42 | 3.62 | −14.69 | 94.23 | 3.15 | −12.07 | −3.19 | −0.47 | 2.62 |
| | 205 | — | — | 30 | 50.02 | 42.55 | 97.42 | 3.62 | −14.69 | 95.24 | 3.23 | −12.52 | −2.18 | −0.39 | 2.17 |
| | 205 | 202 | 205 | 60 | 50.55 | 39.24 | 97.42 | 3.62 | −14.69 | 94.76 | 2.99 | −11.03 | −2.66 | −0.63 | 3.66 |
| | 205 | 204 | 207 | 120 | 57.54 | 41.60 | 97.42 | 3.62 | −14.69 | 92.26 | 2.68 | −8.90 | −5.16 | −0.94 | 5.79 |
| | 205 | 197 | 203 | 120 | 50.94 | 42.44 | 97.42 | 3.62 | −14.69 | 93.86 | 2.61 | −8.58 | −3.56 | −1.01 | 6.11 |

We claim:

1. A molded knit fabric comprising:
elastic fibers wherein the elastic fibers comprise the reaction product of at least one ethylene polymer and at least one cross-linking agent and the knit fabric has less than about 5% shrinkage after wash as measured in accordance with AATCC 135.

2. The molded knit fabric comprising elastic fibers of claim 1 wherein the polymer is crosslinked such that it has a gel content up to about 65 weight percent.

3. The molded knit fabric comprising elastic fibers of claim 1 wherein the polymer is crosslinked such that it has gel content up to about 50 weight percent.

4. The molded knit fabric of claim 1 wherein the elastic fiber is characterized by a stretch of at least 10 percent measured according to ASTM D3107.

5. The molded knit fabric of claim 1 wherein the ethylene polymer is an ethylene/α-olefin interpolymer characterized by one or more of the following characteristics prior to crosslinking:

(a) has a Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.59(d) - 2422.2(d)^2, \text{ or}$$

(b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peaks then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$$Re > 1481 - 1629(d); \text{ or}$$

(d) has a molecular fraction which elutes between 40° C. and 130° C. when fractionated using TREF characterized in that the fraction has a molar comonomer content of at least 5 percent higher than that of a comparable random ethylene interpolymer fraction eluting between the same temperatures, wherein said comparable random ethylene interpolymer has the same comonomer(s) and a melt index, density, and molar comonomer content (based on the whole polymer) within 10 percent of that of the ethylene/α-olefin interpolymer; or (e) is characterized by a storage modulus at 25° C. G'(25° C.), and a storage modulus at 100° C., G(100° C.), wherein the ratio of G'(25° C.) to G'(100° C.) is from about 1:1 to about 10:1; or (f) at least one molecular fraction which elutes between 40C. and 130° C. when fractionated using TREF, characterized in that the fraction has a block index of at least 0.5 and up to about 1 and a molecular weight distribution, Mw/Mn, greater than about 1.3 or (g) an average block index greater than zero and up to about 1.0 and a molecular weight distribution, Mw/Mn, greater than about 1.3.

6. The molded knit fabric of claim 1 wherein the ethylene polymer is a homogeneously branched ethylene polymer.

7. The molded knit fabric of claim 1 wherein said elastic fibers comprise from about 2 to about 30 weight percent of the fabric.

8. The molded knit fabric of claim 1 wherein said molded knit fabric is a bra cup.

9. The molded knit fabric of claim 1 wherein said fabric further comprises a material selected from the group consisting of rayon, viscose, polyesters polyamide, polypropylene, other synthetic fibers, and mixtures thereof.

10. The molded knit fabric of claim 1 wherein said fabric further comprises another material selected from the group consisting of cellulose, cotton, flax, ramie, hemp, wool, silk, linen, bamboo, tencel, mohair, other natural fibers, and mixtures thereof.

11. The molded knit fabric of claim 1 wherein the fabric has less shrinkage after wash according to AATCC 135 IVAi than a comparable fabric of elastic fibers with a higher amount of crosslinking.

12. The molded knit fabric of claim 1, which comprises comprising another elastic fiber composed of a polymer selected from the group consisting of polybutylene terephthalate, spandex, poly(ethylene terephthalate), poly(trimethylene terephthalate), polyamide, polyester, and mixtures thereof.

13. A garment comprising the molded knit fabric of claim 1.

14. The molded knit fabric of claim 5 wherein the ethylene/α-olefin interpolymer is blended with another polymer.

15. The molded knit fabric of claim 6 wherein the homogeneously branched ethylene polymer is blended with another polymer.

16. The molded knit fabric of claim 5 wherein the ethylene/α-olefin interpolymer is characterized by a density of from about 0.865 to about 0.92 g/cm3 (ASTM D 792) and an uncrosslinked melt index of from about 0.1 to about 10 g/10 minutes.

17. The molded knit fabric of claim 1 wherein a majority of the fibers have a denier of from about 1 denier to about 180 denier.

18. The molded knit fabric of claim 1 wherein the fabric is a warp knit, or a weft knit.

19. The molded knit fabric of claim 18 wherein the fabric is a warp knit selected from the group consisting of tricot and raschel.

20. The molded knit fabric of claim 18 wherein the fabric is a weft knit selected from the group consisting of circular and flat.

21. A molded knit fabric comprising:
a controlled growth knit fabric comprising crosslinked elastic fibers of an ethylene polymer selected from the group consisting of an ethylene/α-olefin interpolymer, a homogeneously branched ethylene polymer, and combinations thereof.

22. The molded knit fabric of claim 21 having wherein dimensional stability of from about −7% to about +7% in the lengthwise or widthwise direction according to AATCC135 IVAi before any molding.

23. The molded knit fabric of claim 21 having a dimensional stability of from about −5% to about +5% in the widthwise direction according to AATCC135 IVAi before any molding.

24. A molded knit fabric comprising: crosslinked elastic fibers of an ethylene polymer, the molded knit fabric having a b value within 4 CIELAB units of the b value of the fabric before molding.

25. The molded knit article of claim 24 wherein the ethylene polymer is selected from the group consisting of an ethylene/α-olefin multiblock interpolymer, a homogeneously branched ethylene polymer, and combinations thereof.

* * * * *